United States Patent
Jaime et al.

(10) Patent No.: US 10,586,571 B2
(45) Date of Patent: Mar. 10, 2020

(54) MEDIA CLIP CREATION AND DISTRIBUTION SYSTEMS, APPARATUS, AND METHODS

(71) Applicant: Clipcast Technologies LLC, San Diego, CA (US)

(72) Inventors: Manuel Jaime, San Diego, CA (US); Oliver Michaelis, San Diego, CA (US)

(73) Assignee: Clipcast Technologies LLC, San Diego, CA (US)

( * ) Notice: Subject to any disclaimer, the term of this patent is extended or adjusted under 35 U.S.C. 154(b) by 0 days.

(21) Appl. No.: 16/456,481

(22) Filed: Jun. 28, 2019

(65) Prior Publication Data

US 2019/0318763 A1 Oct. 17, 2019

Related U.S. Application Data

(60) Division of application No. 15/713,664, filed on Sep. 24, 2017, now Pat. No. 10,347,290, which is a
(Continued)

(51) Int. Cl.
*H04N 5/93* (2006.01)
*G11B 27/031* (2006.01)
(Continued)

(52) U.S. Cl.
CPC .......... *G11B 27/031* (2013.01); *G06F 3/0481* (2013.01); *G11B 27/034* (2013.01);
(Continued)

(58) Field of Classification Search
CPC ..... G11B 27/034; G11B 27/34; G11B 27/105; G11B 27/031; G11B 27/11; H04N 21/4223; H04N 21/2743; H04N 21/2396; H04N 21/854; H04N 21/2353; H04N 21/4334; H04N 21/47205; H04N 21/41407; H04N 9/8211; H04N 9/8205; H04N 5/772; H04M 1/72522; H04M 1/72558; H04M 2250/52; G06F 3/0481; H04L 67/38; H04W 4/185
(Continued)

(56) References Cited

U.S. PATENT DOCUMENTS 6,795,638 B1 9/2004 Skelley, Jr.
7,886,327 B2 2/2011 Stevens
(Continued)

FOREIGN PATENT DOCUMENTS

WO WO 97/24874 7/1997

*Primary Examiner* — Robert Chevalier
(74) *Attorney, Agent, or Firm* — Thibault Patent Group

(57) ABSTRACT

Various embodiments for creating media clips are disclosed. In one example, a method is performed by a server for managing the creation and distribution of media clips, where the server associates a content capture device with an event, the content capture device for recording at least a portion of the event, receives a tag notification from a content tagging device via a network interface, generates a media clip creation command to the content capture device via the network interface, sends the media clip creation command to the content capture device, and receives a media clip created by the content capture device in response to receiving the media clip creation command.

1 Claim, 19 Drawing Sheets

Related U.S. Application Data division of application No. 15/072,149, filed on Mar. 16, 2016, now Pat. No. 9,786,324, which is a continuation-in-part of application No. 14/961,292, filed on Dec. 7, 2015, now Pat. No. 9,583,146, which is a division of application No. 14/659,296, filed on Mar. 16, 2015, now Pat. No. 9,208,822.

(60) Provisional application No. 61/954,267, filed on Mar. 17, 2014.

(51) Int. Cl.

| | | |
|---|---|---|
| *G11B 27/34* | (2006.01) | |
| *H04N 21/235* | (2011.01) | |
| *H04N 21/239* | (2011.01) | |
| *H04N 21/854* | (2011.01) | |
| *H04N 21/472* | (2011.01) | |
| *H04N 5/77* | (2006.01) | |
| *H04N 9/82* | (2006.01) | |
| *H04M 1/725* | (2006.01) | |
| *G06F 3/0481* | (2013.01) | |
| *H04N 21/2743* | (2011.01) | |
| *H04N 21/414* | (2011.01) | |
| *H04N 21/4223* | (2011.01) | |
| *H04N 21/433* | (2011.01) | |
| *G11B 27/10* | (2006.01) | |
| *G11B 27/034* | (2006.01) | |
| *G11B 27/11* | (2006.01) | |
| *H04W 4/18* | (2009.01) | |
| *H04L 29/06* | (2006.01) | |

(52) U.S. Cl.

CPC ............ *G11B 27/105* (2013.01); *G11B 27/11* (2013.01); *G11B 27/34* (2013.01); *H04M 1/72522* (2013.01); *H04N 5/772* (2013.01); *H04N 9/8205* (2013.01); *H04N 9/8211* (2013.01); *H04N 21/2353* (2013.01); *H04N 21/2396* (2013.01); *H04N 21/2743* (2013.01); *H04N 21/41407* (2013.01); *H04N 21/4223* (2013.01); *H04N 21/4334* (2013.01); *H04N 21/47205* (2013.01); *H04N 21/854* (2013.01); *H04L 67/38* (2013.01); *H04M 1/72558* (2013.01); *H04M 2250/52* (2013.01); *H04W 4/185* (2013.01)

(58) Field of Classification Search

USPC .................. 386/278, 282, 281, 239, 248

See application file for complete search history.

(56) References Cited

U.S. PATENT DOCUMENTS

| | | |
|---|---|---|
| 7,925,770 B1 | 4/2011 | Hamel |
| 7,975,062 B2 | 7/2011 | Krikorian et al. |
| 8,244,105 B2 | 8/2012 | Verna |
| 8,799,969 B2 | 8/2014 | Krikorian et al. |
| 8,855,471 B2 | 10/2014 | Stone |
| 9,148,675 B2 | 9/2015 | Ives |
| 9,918,035 B2 | 3/2018 | Schein |
| 2008/0060001 A1 | 3/2008 | Logan et al. |
| 2010/0287473 A1 | 11/2010 | Recesso et al. |
| 2012/0189273 A1 | 7/2012 | Folgner et al. |
| 2013/0145292 A1* | 6/2013 | Cohen .................. G06Q 10/00 715/760 |
| 2013/0191752 A1 | 7/2013 | Lapierre et al. |
| 2013/0272673 A1 | 10/2013 | Swearingen et al. |
| 2013/0305156 A1 | 11/2013 | Hohteri et al. |
| 2014/0229579 A1 | 8/2014 | Johnson |

* cited by examiner

MEDIA CLIP CREATION AND DISTRIBUTION SYSTEMS, APPARATUS, AND METHODS

CROSS-REFERENCE TO RELATED APPLICATION

This application is a divisional of U.S. patent application Ser. No. 15/713,664, filed on Sep. 24, 2017, which is a divisional of U.S. patent application Ser. No. 15/072,149, filed on Mar. 16, 2016, which is a continuation-in-part of U.S. patent application Ser. No. 14/961,292 filed on Dec. 7, 2015, which is a divisional of U.S. patent application Ser. No. 14/659,296 filed on Mar. 16, 2015, which claims the benefit under 35 U.S.C. 119(e) of U.S. provisional patent application No. 61/954,267, filed on Mar. 17, 2014, the entire contents of each incorporated by reference herein.

BACKGROUND

Field of Use

The present application relates generally to digital recording, processing and distribution.

Description of the Related Art

Smartphones and the Internet have revolutionized the way we communicate with each other. Today, it is commonplace for individuals to use their smartphones to record digital images and video, and share them with others via social media sites like Facebook, YouTube, Instagram, Twitter, etc. However, such "media sharing" is not without its drawbacks.

Capturing live events via digital video recordings typically results in long, uninteresting videos. For example, a kid's soccer game may be recorded by a parent hoping to capture a goal scored by the parent's child. This may yield several long videos where no goal is scored, or a recording of such a goal preceded by several minutes of uninteresting footage. These video recordings tend to be large in size, making them slow to upload and distribute to others. They also consume large amounts of valuable bandwidth when distributed via wireless networks. Finally, they are difficult to organize and present to others in a way that makes them uniformly interesting and enjoyable to large numbers of individual observers.

Users may manually edit these long videos in an attempt to reduce their size and focus on interesting aspects contained in the videos. However, most programs that allow for such editing are difficult and time-consuming to learn and use. The edited videos are then typically manually uploaded to websites such as Facebook, YouTube, Instagram, and others.

SUMMARY

The embodiments described herein relate to apparatus, methods and systems for creating and distributing media clips. In one embodiment, a server is described for managing the creation and distribution of media clips, comprising, a network interface for sending and receiving digital information over a network, a memory, and a processor coupled to the network interface and the memory, for executing processor-executable instructions that cause the server to associate a content capture device with an event, the content capture device for recording at least a portion of the event, receive a tag notification from a content tagging device via the network interface, in response to receiving the tag notification, generate a media clip creation command to the content capture device via the network interface, send the media clip creation command to the content capture device, and receive a media clip created by the content capture device in response to receiving the media clip creation command.

In another embodiment, a method for creating media clips is described, the method comprising associating a content capture device with an event, the content capture device for recording at least a portion of the event, receiving a tag notification from a content tagging device via a network interface, in response to receiving the tag notification, generate a media clip creation command to the content capture device via the network interface, sending the media clip creation command to the content capture device, and receiving a media clip created by the content capture device in response to receiving the media clip creation command.

BRIEF DESCRIPTION OF THE DRAWINGS

The features, advantages, and objects of the various embodiments will become more apparent from the detailed description as set forth below, when taken in conjunction with the drawings in which like referenced characters identify correspondingly throughout, and wherein.

DETAILED DESCRIPTION

Figure 1:
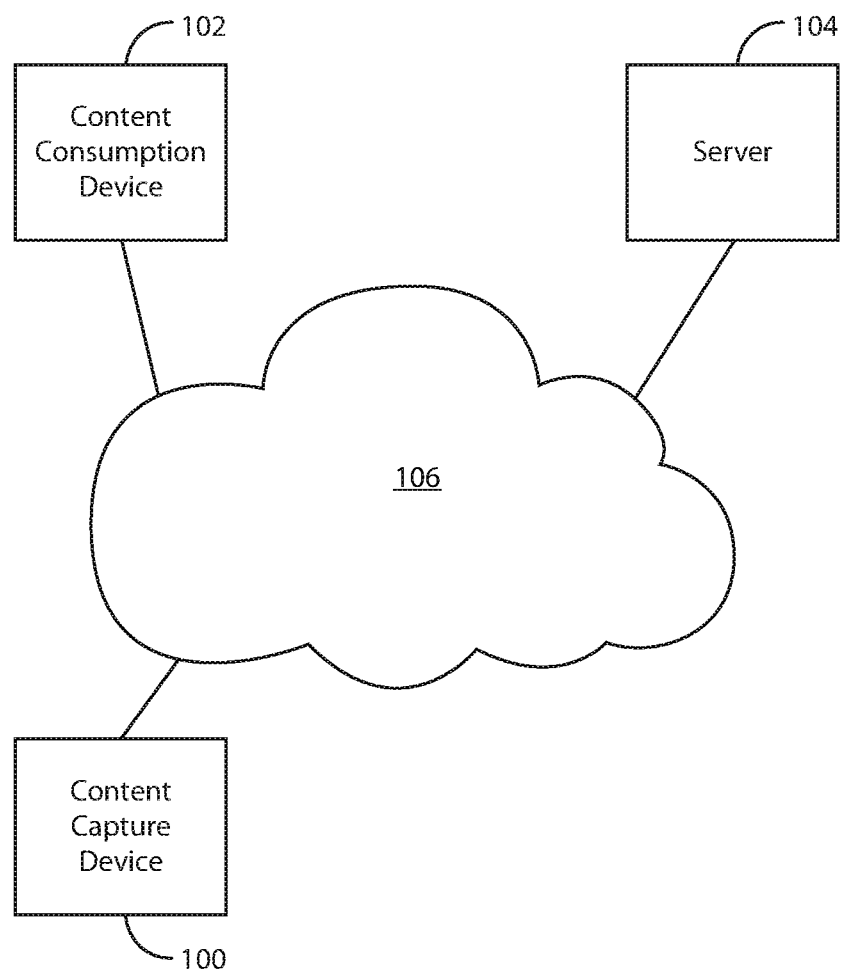
FIG. 1 illustrates one embodiment of a system for creating and distributing media clips where media clips are created locally on a content capture device and made available to others via a server.

The present application describes various embodiments of media clip creation and distribution systems, apparatus and methods. Media clips, as that term is used herein, refer to relatively short audio, video, or audio/video recordings containing appealing or interesting subject matter. The term "video", "video clip", "video recording" and the like, as used herein, refer to a video recording that may or may not include sound. The embodiments described below allow users to easily create such media clips and share them with others online or through messaging or social media mechanisms.

Media clips may be created from pre-existing video or audio recordings (sometimes referred to herein as "primary media recordings"), or created "on-the-fly" as observable events are recorded by "content capture devices", such as smartphones or tablet computers having video recording capabilities, dedicated video cameras, dedicated audio recorders, etc. In one embodiment, users of such content capture devices may be presented with one or more pre-defined "activity indicators" or "icons", representative of an appealing or interesting activity that may occur during an event, such as a sporting event, a play, a concert, a party, etc. When an activity occurs during an event associated with one of the activity indicators, the user may select an activity indicator that matches the activity. Selecting an activity indicator when an interesting activity occurs may be referred to as "tagging" the activity, which identifies a point in time when the activity occurs. The time that an activity indicator was selected, as well as other pertinent information, such as an identification of the selected activity indicator, may be referred to herein as "activity identification information" or simply, "tagging information".

For example, in one embodiment, an individual using a smartphone may record long portions of a soccer game. During recording, or during playback of the recording later, the smartphone may display one or more activity indicators indicative of activities that might occur in a soccer game, such as a "goal" activity indicator, a "corner kick" activity indicator, a "save" activity indicator, and a "pass" activity indicator. When one of these activities occurs during the game, or during playback of a recording of the game, a user may select one of the activity indicators that most closely matches the activity that occurred, or is about to occur. In one embodiment, in response to user selection of an activity indicator, a media clip is created, showing the activity that occurred. The media clip may be indexed, associated, or annotated, with tagging information such as metadata, tags, keys, and/or other information so that it may be easily discoverable by others online. Various embodiments using these principles are discussed below.

In one embodiment, media clips are created by content capture devices alone and provided to a server for distribution to others. Sometimes such content capture devices may be referred to herein as "content capture and tagging devices" to reflect both content capture and tagging capabilities and the two may be used interchangeably. In another embodiment, media clips are created by a server in response to media recordings and tagging information provided by content capture and tagging devices. In yet another embodiment, media clips are created by a server in response to media recordings provided by content capture devices and tagging information provided by content tagging devices. Each of these embodiments is explained in detail below. Numerous variations of each embodiment are also described in detail below. It should be understood that although the functions necessary to create media clips are described in particular ways (e.g., by a content capture device, by a server in communication with a single content capture and tagging device, or by a server in communication with one or more content capture devices and one or more tagging devices), the functionality described in each embodiment could be distributed between and/or among devices/entities other than each particular embodiment describes. For example, in any of the embodiments described herein, creation of media clips could be accomplished by a content capture device, tagging device, or a server, or a combination of these.

FIG. 1 illustrates one embodiment of a system for creating and distributing media clips where media clips are created locally on a content capture and tagging device 100 and made available to others via server 104. Shown in FIG. 1 is content capture and tagging device 100, content consumption device 102, server 104, and one or more wide-area networks 106. In this embodiment, media clips are created by content capture and tagging device 100 from content, i.e., observable live events, recorded or "captured" by content capture and tagging device 100. The media clips created by content capture and tagging device are distributed to others via network 106 and server 104 or, in another embodiment, via peer-to-peer distribution. Although only one content capture and tagging device 100 and one content consumption device is shown in FIG. 1, it should be understood that the system is generally capable of supporting any number of such devices which may be associated with the same or different events.

Content capture and tagging device 100 typically comprises a smartphone having audio and/or video recording capability normally used to generate and store audio and video recordings. In other embodiments, content capture and tagging device 100 may comprise a tablet computer, a laptop computer, a wearable device such as a smart watch or other wearable able to record audio and/or visual information, a personal digital assistant, a dedicated video or audio recording device, a drone or other robotic device having audio/video capabilities, or other device having audio/video recording capabilities. In this embodiment, content capture and tagging device 100 creates activity identification information, used to create media clips featuring appealing, meaningful, interesting, useful, pertinent, or funny activities that may occur during recording of an event. The media clips may then be uploaded to server 104, along with the activity identification information, for search and distribution to content consumption devices 102. In other embodiments, content capture and tagging device 100 provides "primary" media recordings to server 104 for server 104 to create media clips based on tagging information received from other content capture and tagging devices and/or "tagging devices", described later herein.

Content consumption device 102 refers to any digital computing device capable of presenting media clips to users and also having communication capability with server 104 via network 306 to access such clips. Such communication capability includes both real-time and other time-delayed mechanisms to transfer data between content consumption device 102 and server 104. Content consumption device 102 may comprise a smartphone, tablet computer, portable computer, PC, digital TV, wearable device, etc.

Figure 2:
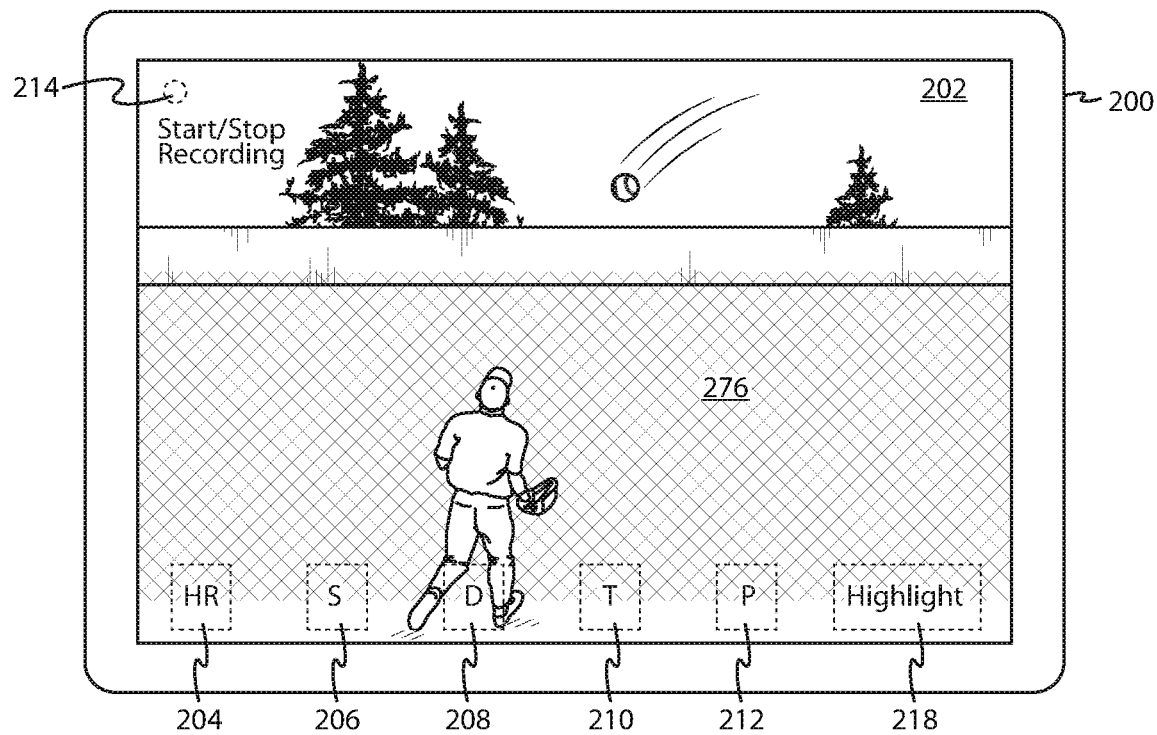
FIG. 2 is a plan view of one embodiment of the content capture device shown in FIG. 1, featuring a user interface.

In one embodiment, content capture devices and/or content consumption devices may communicate directly with a server without having to use network 106. For example, server 104 may be located in a sports bar where patrons may view a basketball game. As the basketball game is being recorded by the server, patrons may tag certain activities that occur during the game and provide them wirelessly, for example via a local, wireless router, to server 104. Server 104 may then create media clips and then provide them directly to each patron who tagged an activity, and/or to other patrons as well. In another, related embodiment, a local server, such as a proxy server, may be present within a local area, in local communication with multiple content capture devices and tagging devices via a local network using, for example, Wi-Fi, and in communication with server 104 via a high speed connection over a wide-band network such as the Internet. The local server may be configured to manage uploads of media content and tagging information, while in communication with server 104 in the background to enable near real-time processing FIG. 2 is a plan view of one embodiment of content capture and tagging device 100, featuring user interface 404. User interface 404 comprises any combination of hardware and/or firmware for presenting information to, and receiving information from, users of content capture and tagging device 100, such as a touch-screen display commonly found on today's smartphones, tablets, and other personal computing and/or communication devices. Alternatively, user interface 404 could comprise a combination of one or more display devices, knobs, buttons, switches, etc. In FIG. 2, user interface 404 is shown displaying a portion of a baseball game as it is being recorded by a native video recording function resident on content capture and tagging device 100. In this example, a player has hit a home run, and the user records the ball clearing an outfield fence as an outfielder watches. The homerun is recorded as an audio/video file by content capture and tagging device 100 while simultaneously being displayed to the user via user interface 404 for viewing as the recording takes place. User interface 404 may also be used to view the recording at a later time.

When a user wishes to record all or a portion of a live event, such as a sporting event, concert, or social event, the user may launch a media clip creation software application resident on content capture and tagging device 100 that causes content capture device 100 to activate video and audio recording functions resident within content capture device 100. While recording the event, or while reviewing the recorded event after the fact on content capture device 100, the media clip creation application also allows the user to "tag" points of interest that may occur during an event, using activity indicators, shown in this example as translucent icons in FIG. 2 as activity indicators 204, 206, 208, 210, 212, and 218.

In another embodiment, a single, "generic" activity indicator is presented via user interface 404 for selection by a user to identify any point of interest that may occur during an event. The generic activity indicator could comprise a designated portion of a user interface, such as a display, an icon displayed on the user interface, or a pre-designated button, key, switch, or other physical interface on content capture and tagging device 100. The generic activity indicator may also comprise a separate input device from content capture and tagging device 100 capable of providing either generic or specific tagging information (e.g., "generic" meaning an activity of some kind occurred vs. "specific" meaning a certain type of activity, such as "a basket was just scored" in a basketball game) to content capture and tagging device 100 through some connectivity function. Further, the generic activity indicator may also employ automatic detection of a relevant moment during the event by analyzing and interpreting environmental data such as temperature, light, biometric data, acceleration, velocity, or generally, motion of people or objects, such as any type of ball used in various sporting events. When such a generic activity indicator is triggered by any device described above in response to observing an interesting activity, an indication is provided to a processor inside content capture content capture and tagging device 100 for the processor to create a media clip that includes the observed activity.

When the media clip creation application is first launched, it may query the user to provide information pertaining to an event that is about to occur. In one embodiment, the user provides information requested by the media clip creation application via user interface 404. Information may be provided using a multiple-choice format, drop-down menu format, a free-text format, or other formats. The information may comprise items such as event type, event location, date of the event, start time of the event, environmental conditions such as temperature, weather, day-/nighttime, and/or other information. For example, an event type may comprise a "Sporting Event", with sub-categories of "Personal Sport", such as skiing, snowboarding, bicycling, surfing, diving, etc., "Baseball Game", "Soccer Game", "Football Game", "Hockey Game", "Monster Truck", "Moto-cross", etc. Each sporting event type may be sub-classified, such as "professional", "college", "amateur", "kids", etc. to the sporting event type. Other events may include "Birthday Party", "Party", "Wedding", "Reception", "Concert", "Vacation", "Graduation", "Road Trip", or virtually any type of event that a user may wish to record.

In another embodiment, event information may be provided by server 104 to the user before the event, during the event, or after the event has concluded for confirmation by the user that an event is about to occur, is occurring, or has occurred. For example, a user may use the media clip creation application to log onto an account stored by server 104 just before he or she is about to record an event, during which the user's location is provided to server 104. Server 104, in response, may determine that a baseball game is about to occur, perhaps based on a schedule of games provided by the user to server 104 at some previous time. Server 104 determines that the user is at a location where one of the games is scheduled to occur, and may transmit a query to the user asking whether the user is at one of the baseball games. If the user responds affirmatively, a series of activity indicators related to baseball may be presented on user interface 404.

Alternatively, server 104 may present a number of event types and, in response, the media clip creation application displays one or more predefined activity indicators representative of activities that are likely to occur during a selected event, or information associated with activities, such as whether an activity is considered a "highlight", whether an activity includes a favorite player or a user's family member, etc. Other tagging devices such as wearables used in conjunction with the event may also be configured with an event/activity-specific configuration.

Further information may be requested from the user, such as a location where the event takes place (e.g., name, address, landmark, GPS or other location technology, etc.), one or more team names in a sporting event, name(s) of a favorite player(s) or the name(s) of anyone that may be involved in the event, such as a child's name in the case of a pee-wee football game, bride and groom names for a wedding, band member names for a concert, family names in the case of "Vacation", etc. Some of this information may be used to identify media clips created by the media clip creation application, as described in more detail below.

Still further information may be requested from the user, such as an "event code" that uniquely identifies the event about to occur to server 104. The event code may be used to associate media clips created by the media clip creation application with the event, event location, date, and/or start time of the event for retrieval by content consumption device 102 after media clips have been created and provided to server 104. In another embodiment, the event code is generated by server 104 in response to determining that a first content capture and tagging device 100 is about to witness an event before any other content capture and tagging device. In another embodiment, server 104 assigns unique event codes to a number of events that will occur in the future, provided by an administrator of server 104, for example. Thus, each professional football game in an upcoming season may have a unique event code assigned to it by server 104, for example. The event code is used to identify and associate tagging information, primary media recordings in the form of audio and/or video recordings, and media clips related to the same event, event location, date and/or start time of the event, as will be described later herein.

Referring now back to FIG. 2, in one embodiment, activity indicators 204, 206, 208, 210, 212, and 218 are overlaid in a semi-transparent manner over an electronic representation of the baseball game as it is recorded and displayed on user interface 404. In other embodiments, the activity indicators may be hidden from view until the user touches a predetermined portion of user interface 404, by gesturing, swiping, speaking, or by some other technique. Each activity indicator in FIG. 2 represents a potential point of interest or activity that may occur during a baseball game or information associated with such point of interest or activity, such as whether an activity is considered a "highlight", whether an activity includes a favorite player or a user's family member, etc. The activity indicators are generally predefined and tailored to each type of event. For example, with respect to a dance recital, activity indicators may include a "pirouette", "solo dance", "group dance", and/or other activity indicators representative of an activity that may occur during a dance recital. In a concert setting, predefined activity indicators may include a "drum solo", an "encore", a "lead guitar solo", or other activity indicators representative of activities that may occur during a concert. For some event types such as e.g. personal sports such activity indicators may be configured for explicit triggering by a user, or for automatic detection of a relevant moment based on activity-specific environmental conditions, or any combination thereof. For example, an activity indicator may be configured to detect a strobe flashing or pyrotechnics exploding, certain predefined sounds, etc.

It should be understood that although only five event indicators are shown in FIG. 2, a greater or fewer number and/or type of indicators could be displayed in other embodiments, and that the example shown in FIG. 2 is merely one embodiment of a number and/or type of activity indicators that could be used while recording all or portions of a baseball game. For example, in one embodiment, a single activity indicator may be used, representative of any activity of interest to the user or others. Such a single activity indicator may have a visual representation on the user interface, or may be based on a dedicated input type such as a gesture, double click, or similar discernable user input.

The activity indicators shown in FIG. 2 include a "home run" activity indicator 204, a "strikeout" activity indicator 206, a "double play" activity indicator 208, a "triple" activity indicator 210, a "player" activity indicator 212, and a "highlight" activity indicator 218. Each activity indicator represents a potential point of interest in a baseball game, e.g., when a strikeout occurs, when a double play occurs, or when a triple is hit. The "Player" activity indicator 212 may be used to identify when one or more favorite players perform an act of interest to the user, such as when a favorite player fields a ball, gets a hit, steals a base, etc.). The "player" activity indicator 212 and the "highlight" activity indicator 218 may be used to tag activities by themselves, or they may be used in combination with other activity indicators. For example, if a favorite player hits a grand slam homerun, the user might select the "homerun" activity indicator 104, the "highlight" activity indicator 218, or the "player" activity indicator 212. In another embodiment, the user may select all three of these activity indicators after the grand slam has been hit.

When one or more activity indicator is selected by a user, the media clip creation application notes which activity indicator(s) has/have been selected, and, typically, the time that the selection occurred, sometimes referred to herein as an "activity indicator selection time". This information may be used to create a media clip of the activity at a later time. For example, the media clip creation application may create a media clip immediately after an activity indicator is selected while the user is still recording. In another embodiment, one or more media clips are created after the user has finished recording, using activity indicator selection times stored by content capture and tagging device 100. The activity indicator selection time is generally the time of day, normally available to content capture and tagging device 100, or provided by server 104, or by one or more other wireless networks. In case content capture and tagging device 100 is not within range of a wireless network and therefore not able to receive accurate timing information, content capture device may assign an elapsed time from the start of the primary media recording to each activity tagged by selection of an activity indicator, then replace the elapsed times with "time of day" times when content capture and tagging device 100 re-enters coverage. In another embodiment, when content capture and tagging device 100 is within range of a wireless network, it may synchronize to a server clock, then maintain this clock if content capture and tagging device 100 moves out of range with the wireless network.

In another embodiment, content capture and tagging device 100 may not have an ability to receive time of day information, for example, in an application where content capture and tagging device 100 comprises a video camera. In this case, activity indicator selection times may be determined by filming a "clapboard" displaying the current time of day and a code correlated to the event as the video camera begins recording. Alternatively, the activity indicator selection times may be determined by filming a digital device such as a smartphone displaying the current time. Then, activity indicator selection times may be assigned to tagged activities based on an elapsed time from when filming began.

Referring back to FIG. 2, a user may be begin video recording a batter as he steps up to the plate by pressing start/stop icon 214 displayed on user interface 404 or a button or switch as part of content capture device 100. Several pitches later, the batter may hit a home run. After the homerun has been hit, the user may touch homerun activity indicator 204 to indicate that a home run has just occurred. This may also automatically stop further recording by content capture device 100. In other embodiments, recording does not stop until the user touches start/stop icon 214 or some other dedicated icon, switch, or button.

In one embodiment, a "Score" activity indicator may be presented instead of the "home run" 204 activity indicator. The 'score" activity may be selected when either team scores a run or, more generally, obtains points. In this embodiment, after a user selects the "score" activity indicator, the user may be prompted to enter additional information pertaining to the points, such as a score type (e.g., homerun, grand slam, touchdown, field goal, game, set, match, goal, free-kick goal, overhead kick goal, 3 point shot, etc.), a number of points scored, an identification of the team that scored the points, an identification of a player who scored the points, an identification of other players who assisted in scoring the points, etc. Further, the user may be asked to select other activity indicators associated with the scoring, such as "highlight" activity indicator 218 by the user, and/or "player" activity indicator 212. The resultant media clip may be further identifiable based on this additional information.

The activity indicators may be used in combination with each other in some embodiments. For example, if a user's favorite baseball player hits a triple, the user may select "triple" activity indicator 210 and then the "player" activity indicator 212, either simultaneously or within a short, predetermined time period from each other, such as one second. The "highlight" activity indicator 218 could also be selected as a third indicator for the same activity. A resultant media clip showing the triple could be referenced, then, by three criteria: by the type of activity that occurred (e.g., "hit", "triple", etc.), by player name, and by "that the clip is considered to be a highlight. It should be understood that the first activity indicator selected is generally used to determine the activity indicator selection time and that subsequent activity indicator selections are considered secondary or ancillary.

In response to the activity indicator(s) being selected by the user, the media clip creation application may store a time when one of the activity indicators was selected, either as an "absolute" time (e.g., time of day), a time relative to when the recording began, an elapsed time from a scheduled start time of an event, or some other time that references when an activity indicator was selected. This time information may be used by the media clip creation application to create a media clip of the activity. For example, the media clip creation application may create a media clip having a duration long enough to show a pitch and a batter hitting the ball over the fence, but short enough to exclude pitches that occurred prior to the home run. The media clip may comprise audio and/or video footage of the event before, during, and/or after the activity occurs. For example, after home run activity indicator 204 is selected by the user, a media clip may be created, comprising 7 seconds of audio/video information recorded by content capture device 100 prior to the time that home run activity indicator 204 was selected, and 10 seconds of audio/video information recorded after home run activity indicator 204 was selected. These "pre-activity" and "post-activity" times are generally predefined time offsets from when an activity indicator was selected, each predefined to encompass the activity itself while eliminating non-relevant or uninteresting content, such as the pitches that occurred prior to the home run. Such time offset pre-definitions may be based on criteria including but not limited to the type of activity, the type of event, the performance level of the teams or individuals performing the activity, a user's typical tagging behavior, the type of tagging device used, or the type of venue.

Each activity indicator may have its own time duration or "time window" associated with it, pre-assigned in accordance with an expected or typical time duration of each associated activity. For example, while the home run activity indicator may be predefined to create media clips each having a time duration of 17 seconds with a "pre-activity time" of 7 seconds and a "post-activity time" of 10 seconds, a "double play" activity indicator 208 may be pre-assigned a "pre-event time" of 6 seconds and only 1 second of "post-activity time". Alternatively, the "double play" activity indicator 208 may have a time window of 7 seconds pre-assigned to it, and a reference point of where the time window should begin, such as 6 seconds prior to when the "double play" activity indicator was selected.

The resultant media clip may be stored in a memory of content capture device 100 with a name comprising an identification of the activity selected by the user to create the media clip, such as homerun001.mpg. The media clip may also comprise an identification of the date and/or time the activity occurred (or the start time of the media clip). The media clip may also be stored in a memory of content capture and tagging device 100 whereby the name may comprise a reference URL used in a data base, or may contain a media header including fields comprised of the identification information.

In one embodiment, media clips are created after a "primary" media recording, or primary media file, of an event has been created and stored in a memory of content capture device 100. A "primary" media recording may be defined as a recording of an event produced by content capture device 100 as the event takes place. For example, a video recording of a portion of a soccer game, captured by content capture device 100, containing content from the time that a user initiates a recording until the user stops the recording, such as the time between when the user touches start/stop icon 214 to begin recording and the time the user touches start/stop icon 214 again, terminating the recording. Typically, primary media recordings last more than 15 seconds and may further include audio/video content that is extraneous or simply uninteresting to either the user recording the event, or to others. Primary media recordings may be created by a native audio and/or video recording application resident on content capture and tagging device 100 as standard audio or video files that may be stored and viewed on content capture and tagging device 100, or they may be created by the media clip creation application using existing hardware resident on content capture and tagging device 100.

In one embodiment, users may record an event by creating one or more primary media recordings, then review the primary media recordings using the media clip creation application and activity indicators to indicate when activities of interest occur. For example, a smartphone video recording application may record a video of an event using standard video recording capabilities commonly found on today's smartphones. After the video has been created and stored in memory, it may be retrieved from memory by the media clip creation application and played back to the user via user interface 404, at which time the activity indicators may be presented. The user may select one or more of the activity indicators as activities occur during playback of the video recording. In one embodiment, each time that an activity indicator is selected, the media clip creation application stores a time at which the selection occurred, for use in identifying portions of the primary media recording to use when creating a media clip.

In another embodiment, media clips are created while the event is being recorded by content capture device 100. In this embodiment, the media clip creation application may wait until the predefined post-event time has elapsed after selection of the activity indicator, and then create the media clip from digital information already received, but before the "primary" media clip has been created.

Figure 3:
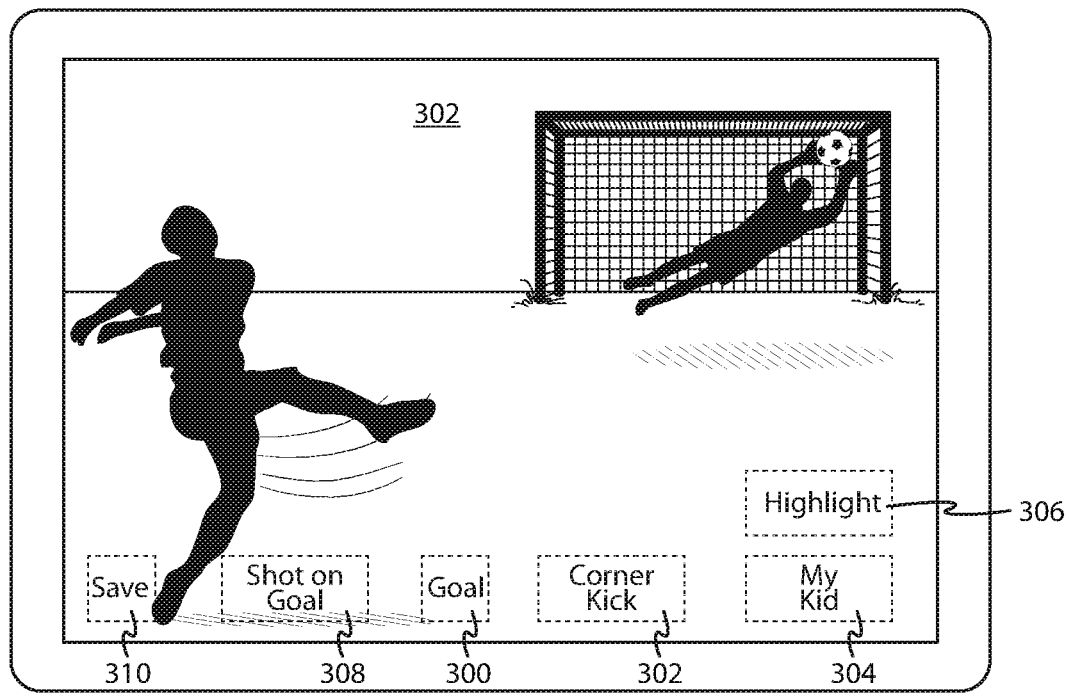
FIG. 3 the content capture device of FIGS. 1 and 2 using a set of predefined activity indicators relating to activities that may occur during a soccer game.

FIG. 3 illustrates content capture and tagging device 100 of FIG. 1, this time using a set of predefined activity indicators relating to activities that may occur during a soccer game. User interface 404 shows a goal being scored as a soccer game is being recorded. In this embodiment, activity indicators related to soccer are displayed via user interface 404, overlaid in a semi-transparent manner over the video presentation of the game as it is being recorded, also via user interface 404. In this example, activity indicators comprise a "goal" activity indicator 300, a "corner kick" activity indicator 302, a "my child" activity indicator 304, a "Highlight" activity indicator 306, a "shot on goal" activity indicator 308, and "save by goalie (or player) activity indicator 310". As a user records the soccer game, one or more of the activity indicators may be selected to indicate points of interest in the game. For example, as the game is being recorded the user may select "goal" activity indicator 300 when a goal is scored by either team, as well as the "highlight" activity indicator 306. If a goal is scored by the user's child, the user may, alternatively or in addition, select the "my child" activity indicator 304, indicative of an activity that occurred involving the user's child.

Other events may each have a different set of predefined activity indicators associated with them, representing points of interest that may occur during these other events. For example, one or more predefined activity indicators relating to a birthday may include "Happy Birthday Song", "Blowing out the Cake Candles", Opening a Present", "Playing a Game", etc. One or more predefined activity indicators relating to a wedding and/or wedding reception may include "Bridal Procession", "Ring Exchange", "You May Kiss the Bride", "Garter Toss", "Bouquet Toss", "Father-Bride Dance", etc. One or more predefined activity indicators relating to a concert may include "Guitar Solo", "Encore", "Favorite Songs", and/or an activity indicator associated with a favorite musician, similar to player activity indicator 212, described above.

As media clips of the soccer game are created by the media clip creation application, they may be associated with activity identification information, such as one or more of an event code, an event type, an activity type associated with each activity indicator, a time and date that the activity or event occurred or a time that an activity indicator was selected by a user, one or more team names, one or more names of persons appearing in the activity, the name of the user recording the event, etc. In one embodiment, activity identification information is incorporated into the media clip files names when they are created. For example, a file name could be assigned to a media clip as follows:

"sports_professional_baseball_Petco_November_12_2014_14:46:03_double_Padres_SethSmith001.avi"

representing a first media clip where player Seth Smith, playing for the San Diego Padres professional baseball team, hit a double in Petco Park on Nov. 12, 2014 at 2:46:03 pm. Using such a file name, the activity represented by the media clip can be searched and provided to others using search criteria. File names could comprise more, or less, information than the example shown above. For example, the same double hit by Seth Smith could be assigned a file name entitled, "double_Padres_11-12-2014.avi". In another embodiment, such activity identification information may be provided to server 104 in association with each media clip, and the media clip stored in a database therein using either the file name or the activity identification information used as a reference by the database to locate the media clip for future viewing. In a further embodiment, the activity information may be stored in the media clip header fields or any proprietary extensions thereof. Further examples of associating activity identification information with media clips is described later herein.

Referring back to FIG. 1, after media clips are created by content capture device 100, they are uploaded to server 104 generally via wide-area network 106. Wide-area network 106 comprises one or more communication networks, such as the Internet, cellular communication systems, satellite communication systems, fiber optic networks, and/or a combination of these. Server 104 comprises a digital computing device executing machine-readable instructions stored in a memory that, when executed, cause server 104 to receive media clips from content capture and tagging devices 100, store the clips in one or more databases or memories, and provide the media clips to content consumption devices 102 based on search criteria submitted by an operator of the content consumption devices 102. In one embodiment, content consumption devices 102 access the media clips stored by server 104 via a website provided by server 104 or a third party, a social media website, a social media application, and/or a media clip viewing application installed on content consumption device 102 that enables users to search, download, stream, and/or otherwise access media clips from server 104. In one embodiment, the media clip creation application described as being resident on content capture and tagging device 100 may reside on content consumption device 102, having additional code that allows operators of content consumption device 102 to search for and access media clips on server 104. Thus, content consumption device 102 may possess the same capabilities as a content capture and tagging device 100, and vice-versa.

In one embodiment, media clips uploaded by a user of content capture and tagging device 100 are only available to pre-authorized persons, for example, only to people who are Facebook "friends" or a Twitter "follower" of the user, and/or only to people who have been given authorization by the user to particular persons, such as family and/or friends or members of a team or attendees to an event.

Server 104 provides access to media clips based on one or more search criteria provided by content consumption device 102. Various search fields may be presented to the operator in order to find desired media clips. For example, one or more of the following search fields may be displayed by content consumption device 102: "Event Code", "Date", "Time", "Place/Venue", "Persons/Players", "Event Type", "Activity Type", "Activity Quality" (e.g. speed, athleticism), "Team Name(s)", the name of a user who provided media clips to server 104, "Highlights", etc. When sever 104 receives the search criteria, it attempts to match one or more of the search criteria to media clips previously stored in the database.

The "Place/Venue" field may accept entries such as the name of a professional sporting complex, public sporting area (such as the name of a park, arena, golf course, tennis club, skating rink, sport resort, etc.), restaurant, church, beach, vacation spot, etc. This field may also accept GPS coordinates or other geographical coordinates, a street address, and/or other information identifying a place where an event takes place.

The "Person/Player" field generally relates to the name of a person, such as a professional athlete, or any person who may be associated with a media clip. For example, a parent may have uploaded several media clips of the parent's child, named Fred Smith, playing in a kid's soccer game. Some of the media clips were created as a result of the parent selecting the "My Child" activity indicator 304, whereupon, in one embodiment, media clips were created with file names comprising the child's name (an option to enter names into the application for activity indicators such as "my child" may be provided during a setup phase of the application). A friend of Fred Smith may want to view media clips of the soccer game, so the friend may enter "Fred Smith" and "Poway soccer field" as search criteria to find media clips relating to Fred Smith playing soccer at the Poway soccer field.

The "Event Type" field may accept broad event names, such as "sports", or sub-categories of sports, such "football", "baseball", "basketball", "skiing", "snowboarding", "moto cross", etc., and even sub-sub categories such as "college football", "kid's soccer", "board park", "freeriding", etc. Other types of events may include "wedding", "reception", "party", "concert", "vacation", "graduation", etc.

The "Activity Type" may allow a user to enter a specified type of activity, such as "goal", "touchdown", "assist", "solo", "bridal precession", "throw", "catch", "joke", etc.

The "Team Names" field may allow users to enter one or more team names of interest to an operator. In one embodiment, operators may type the name of each team into a free-form field. In an embodiment involving organized sports, server 104 may provide a list of organized games occurring that day, or other day in the future or past. For example, on any given Sunday in November, as many as 16 organized football games may be played. Server 104 may provide the names of the teams playing against each other to content consumption device 102 upon request from an operator, or updated automatically on an ongoing basis.

The "Highlights" field may comprise simply a checkbox, or yes/no indicator, indicating a desire by a user to view only media clips containing highlights of a chosen event, as tagged by users that provided the media clips.

When at least one of the search criteria received by server 104 matches at least a portion of activity identification information associated with at least one media clip, server 104 may provide an indication of availability of the clip(s) to the user that provided the search criteria, such as one or more links, lists, and/or icons representative of the media clip(s) having at least a partial match to the search criteria. The user may then view the media clip(s) associated with the links, lists, or icons provided by server 104 or download them to the user's personal digital media device, such as content capture and tagging device 100 or content consumption device 102.

Server 104 may present the retrieved media clip(s) in a unique and pleasing way to operators. For example, when the search criteria from an operator includes "Panthers" and "Oct. 2, 2014, and a zip code of 92129, server 104 may use this criteria to search for media clips related to at least some of the criteria. Server 104 may identify 7 media clips relating to a little league baseball game played on Oct. 2, 2014, between a team named the "Panthers" and a team named the "Hawks" and present the media clips as clickable icons, arranged in a number of interesting and useful ways. The identified media clips may have been uploaded by a single user, or two or more users, each operating their own content capture and tagging device 100 and each providing at least one of the media clips to server 104.

In one example, server 104 could present a title having the team names, for example "Panthers vs. Hawks", and then a sub-heading, for example, "Scoring Clips" with two columns of clips, one column representing clips representative of the Panthers scoring, and the other column containing media clips representative of the Hawks scoring. Server 104 may use the activity identification information associated with each media clip to determine whether a clip represents a scoring event and which team scored, thereby enabling server 104 to present the media clips to a user based on team scoring events, for example.

In another example, server 104 may present media clips as a function of time (e.g., presenting a timeline with all media clips associated with an event, or just "highlights" of the event, or just "highlights" of one of the teams, or all events from one of the teams, etc.). In another example, server 104 could present the media clips to operators on the basis of a name, for example, the name of a child who may have participated in a pee wee football game. In this case, server 104 may present only media clips having activity identification information matching the child's name. Further, server 104 may present media clips arranged by activity (e.g., a list or column of all soccer goals, soccer goals arranged by which team scored the goals, etc.), "highlights", etc.

Server 104 may present media clips to operators as described above based on requests from the operators, either directly or through some intermediary device or application, such as a browser, a playback application, a smart television, etc. For example, server 104 may provide an option for operators to select how to present media clips, and the options may be related to the type of event being requested. For example, if a user requested media clips from "Bob and Debbie's Wedding" on Sep. 20, 2013, server 104 may identify numerous media clips matching that criteria. In response, server 104 may provide the user with options to view the identified media clips on a timeline, view by subject matter (e.g., media clips featuring the groom and/or the groom's family, the bride and/or the bride's family, or both bride and groom), and/or by "highlights" of the wedding/reception such as "ring exchange", "bridal precession", "I now pronounce you man and wife", "cake cutting", etc. In other embodiments, server 104 may present an option to view media clips in a tiered fashion, i.e., first by an event or activity, then by tag type. In another embodiment, server 104 may present an option for a user to request media clips based on an activity over time, such as "all ski runs between December 1 and Mar. 1, 2014 at Snowmass".

Figure 4:
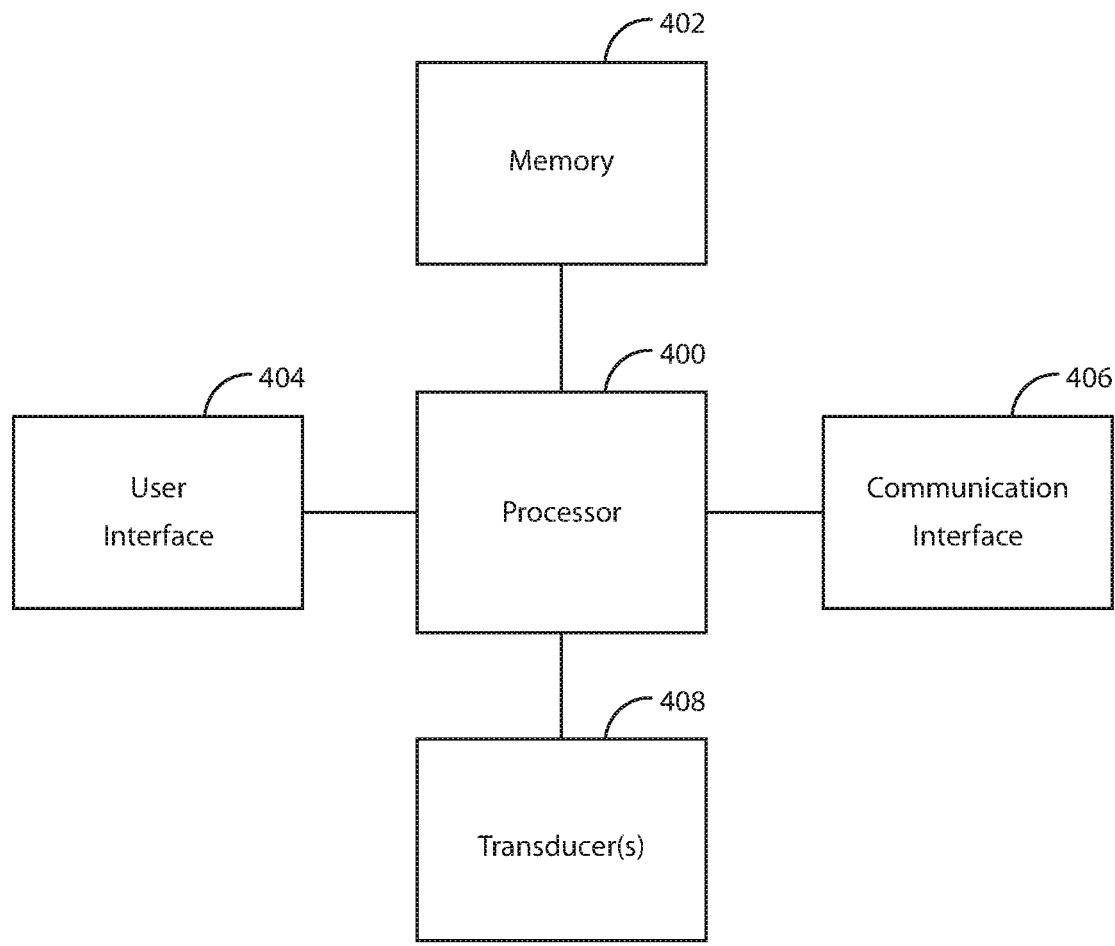
FIG. 4 illustrates one embodiment of a functional block diagram of the content capture device shown in FIGS. 1, 2, and 3.

FIG. 4 illustrates one embodiment of a functional block diagram of content capture and tagging device 100. Shown are processor 400, memory 402, user interface 404, communication interface 406, and one or more transducers 408 for converting audio and visual information into digitized audio and/or video data, e.g., primary media recordings. It should be understood that in some embodiments, the functionalities shown in FIG. 4 may be distributed between two or more devices. For example, the one or more transducers 408 may be part of a first device, such as a camcorder, while the other functional blocks may be found on a second device, such as a computer or a smartphone. The camcorder may capture video footage and then provide the footage to the smartphone via a wired or wireless connection, for creation of media clips or for forwarding the video footage to server 104.

Processor 400 comprises a general-purpose microprocessor or microcontroller well known in the art, or it may comprise a custom or semi-custom ASIC. Examples of such processors may be found in modern smartphones, tablet computers, laptop computers, dedicated digital cameras, dedicated sound recording equipment, etc. Processor 400 is typically selected based on a variety of requirements, such as space, power consumption, battery size (if any), processing speed/power, and/or other requirements. Processor 400 executes machine-readable instructions (for example, executable, object, or machine-language code), stored in one or more non-transitory memories 402. The memory(s) 402 comprises one or more electronic memories such as RAM, ROM, and flash, electro-mechanical storage devices such as magnetic hard drives, optical storage devices, or any other single or combination of storage devices suitable for storing the machine-readable instructions, primary media recordings, media clips, and data necessary for recording events and creating the media clips, such as sets of predefined activity indicators for each type of event and activity identification information such as user-provided team names, players/people names, event location, etc.

User interface 404 comprises circuitry and/or related hardware/software/firmware necessary to present electronic video and/or audio information to a user as the user records an event, to display activity indicators to the user, and to receive input from a user, such as setup information used by the media clip creation application, activity indicator selections, audio/video recording instructions (e.g., start, stop, pause, etc.). In this embodiment, user interface 404 comprises a touch-screen device. In other embodiments, user interface 404 may comprise distinct hardware components, one for presenting information to users and the other for receiving input from users. An example of the former includes a video display screen and/or amplifier/speaker combination, while an example of the latter includes one or more buttons, knobs, switches, etc.

Communication interface 406 comprises circuitry necessary for content capture and tagging device 100 to at least transmit information wirelessly from content capture and tagging device 100 to server 104, using one or more known communication techniques. Communication interface 406 may comprise one or more of an Ethernet interface jack/circuitry or wireless communication circuitry (e.g., for sending information via Wi-Fi, cellular data, Bluetooth, etc.) well known in the art. In some embodiments, communication interface 406 additionally comprises circuitry for receiving wireless communication signals as well. Often, custom ASICs are used to provide both transmission and reception capabilities, for example ASICs commonly used in cellular handsets, Wi-Fi enabled digital cameras, etc. Such communication across interface 406 may be performed based on real-time, best-effort delivery, lowest-cost delivery, manually triggered transmissions, etc.

Transducer(s) 408 comprise one or more of a combination of hardware/software/firmware for converting audio or visual event information into digital signals for processing by processor 400 for creation of primary media recordings. Such transducers 408 may comprise digital camera circuitry (for example, a lens and processing circuitry to generate digital representations of visual information captured by the lens), and/or audio recording circuitry (such as a microphone, amplifying circuitry, filtering circuitry, etc.). Such circuitry is commonly found on modern smartphones, digital cameras, tablet computers, etc.

Figure 5:
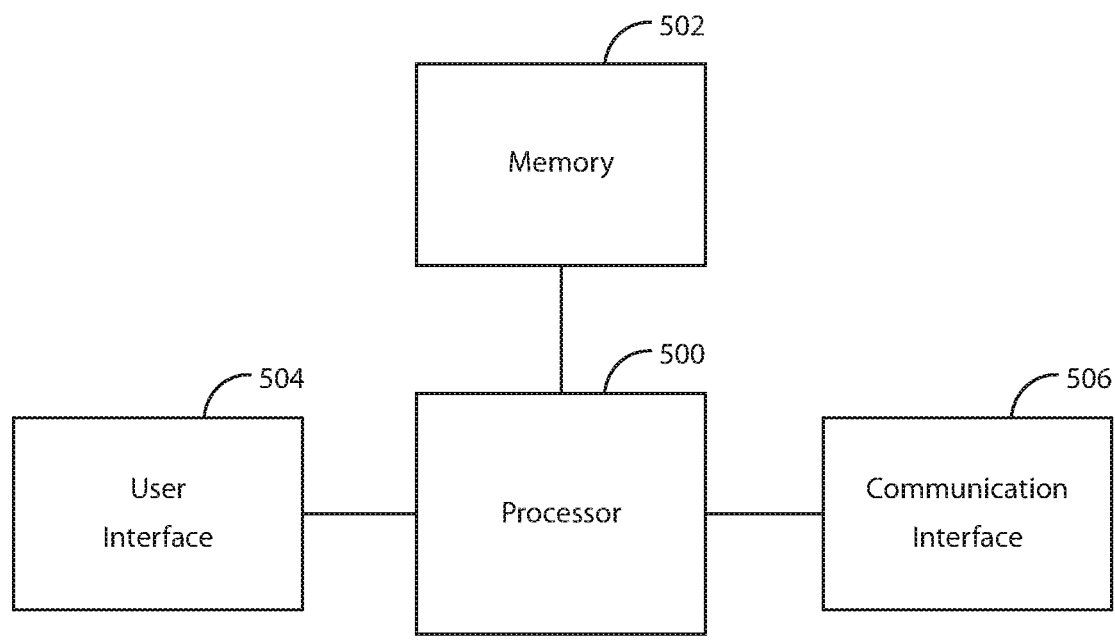
FIG. 5 illustrates one embodiment of a functional block diagram of the server shown in FIG. 1.

FIG. 5 illustrates one embodiment of a functional block diagram of server 104. Shown are processor 500, memory 502, user interface 504, and communication interface 506.

Processor 500 comprises a general-purpose microprocessor or microcontroller well known in the art, or it may comprise a custom or semi-custom ASIC. Processor 500 is typically selected based on a variety of requirements, such as processing speed/power, cost, etc. Processor 500 executes machine-readable instructions (for example, executable, object, or machine-language code), stored in one or more memories 502. The memory(s) 502 comprises one or more electronic memories such as RAM, ROM, and flash, electro-mechanical storage devices such as magnetic hard drives, optical storage devices, or any other single or combination of storage devices suitable for storing the media clips and related activity identification information provided by content capture device 100, and machine-readable instructions for providing an interface for users to upload media clips, for receiving media clip requests and related search criteria from operators, for comparing the search criteria to the media clips, and for presenting matching media clips to requesting operators. The memory(s) 502 are generally capable of storing many thousands, or even millions of media clips and associated activity identification information uploaded by users and may be stored in the memory(s) 502 as one or more databases having indexing capabilities, or association capabilities, to store and later identify and retrieve media clips of interest to operators. For example, the database(s) may comprise a relational database or database that stores data in a deterministic fashion. The media clips may be indexed, or associated, with activity identification information and/or event identification information, described later herein, in order to located clips using key word searches.

User interface 504 comprises circuitry and/or related hardware/software/firmware necessary for technical personal to monitor and maintain server 104. Such monitoring/maintenance may comprise running diagnostic tests, updating software, reviewing media clips, or other functions related to typical server operation and maintenance. User interface 504 may comprise a keyboard and/or pointing device and/or a touch screen for receiving input form technical personal and a display for presenting information to such personal.

Communication interface 506 comprises circuitry necessary for content capture and tagging device 100 to receive primary media recordings and/or media clips from content capture and tagging device 100, for receiving media clip requests and related search criteria, and for providing media clips to consumption devices 102 in response to the requests. Such circuitry comprises one or more of a T1/T3 interface circuitry, Ethernet circuitry, and/or wireless communication circuitry, generally providing a data channel between server 104 and network 306, where information may then be sent/received to a variety and number of content capture devices and/or content consumption devices. Each type of communication circuitry is well known in the art.

Figure 6A:
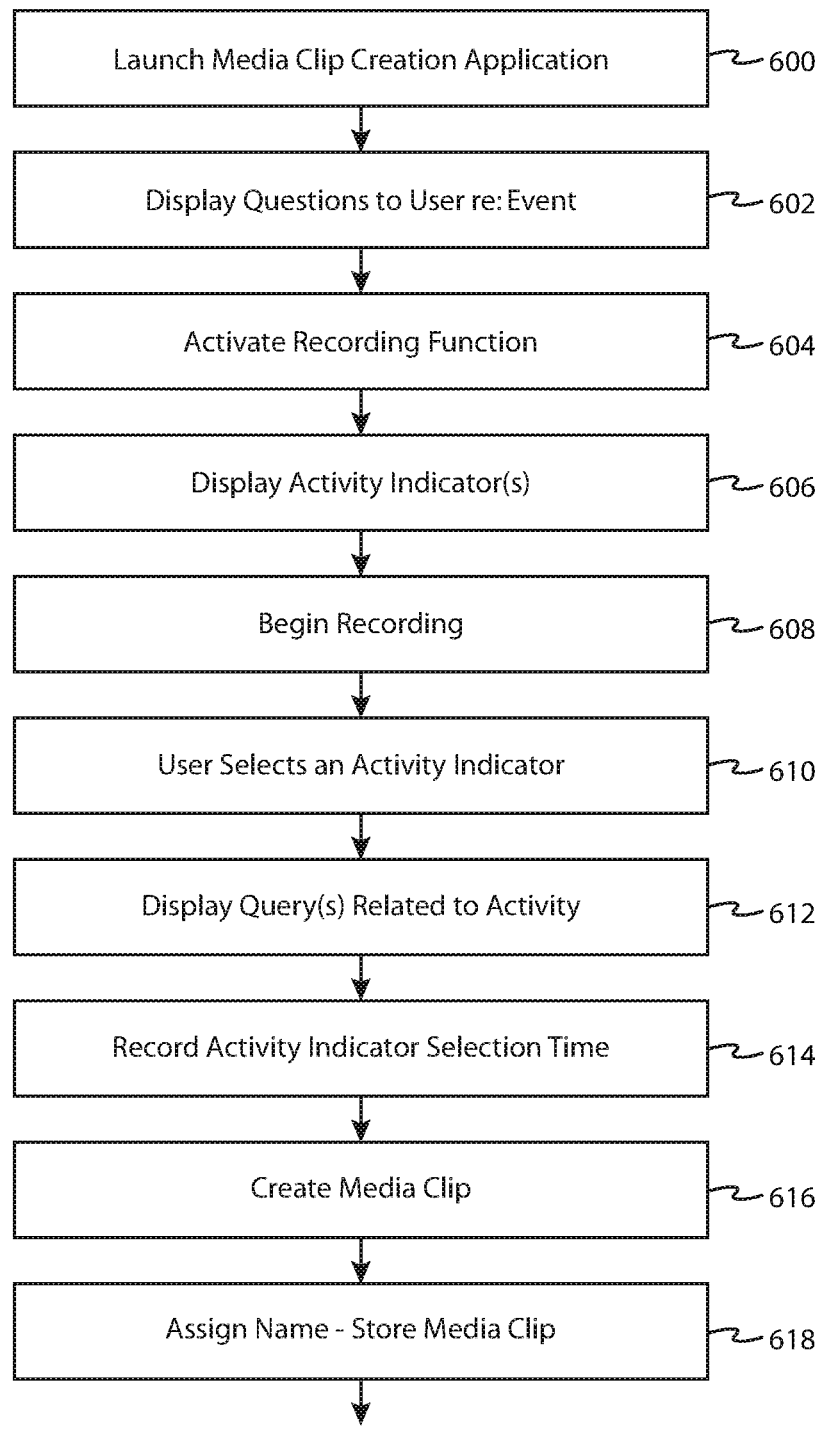
FIGS. 6a and 6b are flow diagrams illustrating one embodiment of a method for creating media clips by the content capture device of FIGS. 1, 2, and 3, and distributing the media clips by the server shown in FIG. 1.
Figure 6B:
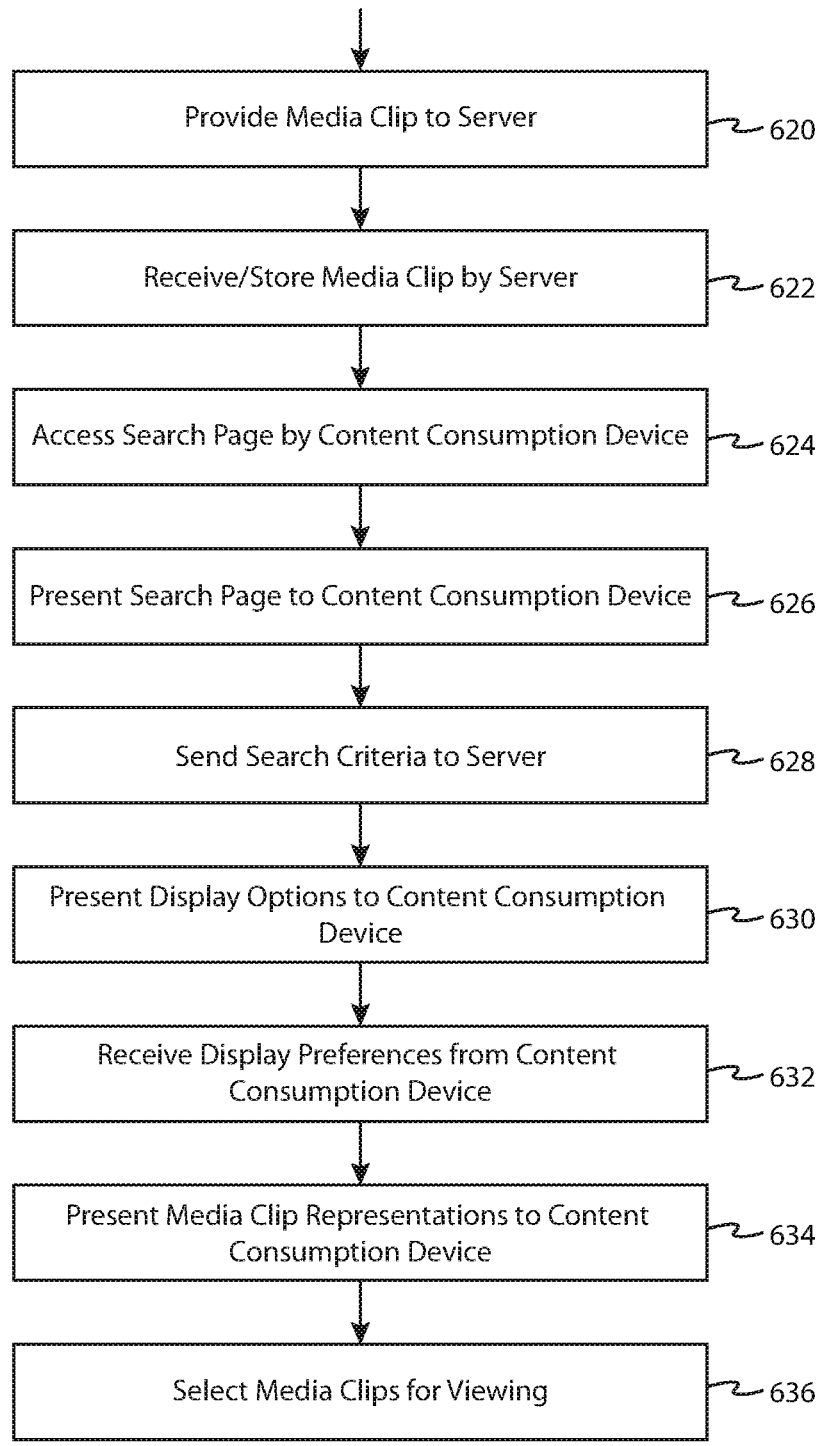

FIG. 6 is a flow diagram illustrating one embodiment of a method for creating media clips by content capture and tagging device 100, and disturbing the media clips using server 104. The method is implemented by processor 400 within content capture device 100, in communication with server 104, which in turn implements another portion of the method by processor 500, each processor executing respective machine-readable instructions stored by memory 402, memory 502, respectively. It should be understood that in some embodiments, not all of the steps shown in FIG. 6 are performed and that the order in which the steps are performed may be different in other embodiments. It should be further understood that some minor method steps have been omitted for purposes of clarity.

At block 600, a user of content capture and tagging device 100 launches a media clip creation application resident on 100 via user interface 404 for allowing the user to create media clips relating to an event about to take place. For example, the user may touch an icon displayed on user interface 404 relating to the media clip creation application. In another embodiment, the media clip creation application further allows the user to search for and view media clips created by content creation device 100 or by others. User interface 404 provides a signal to processor 400 for processor 400 to execute machine-readable code stored in memory 402 related to the media clip creation application ("media clip creation application code"). In one embodiment, the media clip creation application is tailored to a particular type of event, such as "sporting event", "wedding', "reception", "party", "graduation", "kids soccer game", "professional football game", etc. by only including activity indicators associated with one of these types of events. In another embodiment, the media clip creation application comprises activity indicators associated with multiple events, and the user is given an option to select an event prior to recording the event.

At block 602, in one embodiment, processor 400 causes user interface to display a series of questions to the user regarding various attributes relating to an event that the user is about to record ("event identification information"). The questions may request one or more of the following, for example: event type, event code, date, current time, venue name, venue address, venue city, venue state, one or more team names, the user's name or User ID (e.g., a unique identifier assigned by the media clip creation application and/or server 104 and/or the user, which may be based on login credentials, an application ID or mobile credentials (e.g. IMEI), one or more names of persons of interest that may be recorded during the event (such as a child's name playing in a pee wee football game about to take place, name of a lead guitarist in a concert about to take place, the names of the user's immediate family members as the family visits a famous landmark, etc.), an indication of whether the event is considered "private" or "public", used to determine accessibility to recordings and media clips, etc. Each of the answers provided by the user is entered via user interface 404 and sent to processor 400, where they are stored in the memory 402. In one embodiment, this information may be provided well before an event occurs, such as in an example of a soccer team manager who enters a games schedule for an upcoming season with all/most of the required information such as opponent team names, dates, playing field, etc. This information may be entered into content capture and tagging device 100 or on another device in communication with server 104, such as a computer or a tablet. In this way, the information is available to multiple users before each game is played, either automatically after server 104 determines a location of each user, or by providing a list of games to each user for user selection.

In one embodiment, server 104 may infer that content creation and tagging device 100 is at a particular event, based on information such as the location of content creation and tagging device 100, the current date, and/or current time. In this case, when server 104 receives the location of content creation device 100, processor 400 may determine that content creation device 100 is at a professional sporting venue, and that the current date and time closely match a scheduled game about to occur, or in progress. In this case, server 104 may transmit a query to content creation device 100, asking a user of content creation device 100 to confirm that the user is at the game, or server 104 may present a list of possible events for the user to choose from. In one embodiment, processor 400 searches memory 402 to determine if an event code has previously been created for the event from another user and, if so, provides the event code to content creation device 100. Content capture and tagging device 100 associates media clips created by content capture and tagging device 100 with the event code if the user confirms that he or she is at the event inferred by server 104. If the user is presented with two or more event choices, server 104 may search for an event code associated with the event selected by the user after receive of the user's selection. If one is found, server 104 transmits it to content creation device 100 for subsequent use. Server 104 may create an event code associated with the event if an event code has not yet been created by another content capture and tagging device 100.

The media clip creation application may further ask the user to identify an event type which most closely describes an event that the user is about to record. For example, user interface 404 could display a list of events for the user to select, such as a list comprising "Sporting Event", "Wedding", "Reception", "Party", "Concert", "Vacation", and "Graduation". Some of the event types may comprise sub-events. For example, if the user selects "Sporting Event", processor 400 may cause user interface 404 to display certain types of sporting events for the user to select, such as "Football Game", "Baseball Game", "Soccer Game", etc. As a result of selecting one of the sub-events, processor 400 may further cause user interface 404 to query the user whether the selected sporting event is a "Professional", "Amateur", "Kids", or other qualifier. In any case, the event type selection is provided to processor 400 via user interface 404.

The media clip creation application may still further ask the user to select one or more predefined activity indicators, from a number of available activity indicators stored in memory 402. As mentioned above, the activity indicators comprise activities that may occur during a selected event type. For example, if the event type selected is "Football Game", then the activity types associated with a football game may include "Touchdown", "Field Goal", "First Down", "Kickoff", "Punt Return", or other activities that may occur during a football game. The activity indicators may also include indicators of a "Favorite Player" or "My Kid", as described above. The user may be permitted to enter a name of the user's favorite player or the name of the user's child that will be featured in the event about to take place. Subsequently, "Favorite Player" or "My Kid" may be replaced by the name entered by the user.

The user may be allowed to alter certain attributes of one or more of the activity indicators at this time. For example, one or more of the activity indicators may have one or more pre-assigned, default time attributes associated with each of them, stored either in memory 402 of content capture and tagging device 100, or memory 502 of server 104. These time attributes may be used by processor 400 to create media clips. In general, a "media clip time duration" and/or "media clip start/stop attributes" are pre-assigned to the activity indicators in an attempt to fully capture the activity associated with each particular activity indicator. Some activity indicators may have different default time attributes than other activity indicators to allow for differences in execution of various activities, or the time attributes may be the same among activity indicators. In one embodiment, when a user wishes to change one or more time attributes, content capture device 100 sends a request to server 104, requesting that one or more time attributes pertaining to one or more activity indicators be modified, along with the proposed, modified time attributes. Server 104 may store the changed time attributes associated with the identified activity indicator(s), and send an acknowledgment to content capture device 100 that the change was successful.

In one embodiment, server 104 may store sets of time attributes for selection by users during the set-up process. For example, three sets of time attributes could be defined: short, medium, and long set. Each activity indicator could be assigned a predefined time attributes based on user selection of one of the sets. For example, a "homerun" activity indicator could be assigned a clip length of 5 seconds if the "short" set was selected, a clip length of 10 seconds if the "medium" set was selected, and a clip length of 15 seconds if the "long" set was selected. Other activity indicators associated with each event could be similarly adjusted. Server 104 may provide the user with a selection of the sets, and the time attributes associated with each activity indicator adjusted accordingly.

In another embodiment, a user's tagging behavior may be tracked by server 104 to adjust tag attributes based on patterns detected in a user's tagging behavior. For example, in some embodiments described later herein, tagging information is aggregated among multiple users to determine an average, or mean, time that an activity occurred. If a particular user's tagging information is consistently several seconds behind other users information, server 104 could automatically adjust the user's tagging information to bring it more in conformity with other users.

A media clip time duration may comprise a predetermined duration, such as 10 seconds, intended to encompass activities that occur before, during, and/or after an activity occurs. Media clip start/stop attributes may comprise a relative pre-activity time, and/or a relative/post-activity time, relative to when an activity indicator was selected by a user, in order to specify how much footage from a primary media recording that occurs before and after an activity to include in a media clip. In general, if a time duration attribute is used, only a pre-activity time or a post-activity time is necessary to create media clips by processor 400. If a time duration is not used, generally a pre-activity time and a post-activity time is required to define a media clip. Other attributes may be used for use by processor 400 to create media clips of selected duration and targeted to capturing activities that occur before, after, or before and after selection of an activity indicator by the user, such as a time duration and percentage, where the percentage indicates which percentage of a media clip occurs prior to, or after, the time that an activity indicator is selected. In another embodiment, only a time duration is used, and pre and post times fixed at a predetermined value, such as 50%, meaning that all media clips created will comprise a duration equal to the time duration, having half of the clip showing content that occurred before selection of the activity indicator, and half of the clip showing content that occurred after selection of the activity indicator.

For example, while recording a soccer game, the user may select a "Goal" activity indicator immediately after a goal is scored. A time duration of 20 seconds may have been pre-assigned to the Goal activity indicator, either by default or as a result of user manipulation during setup of the media clip creation application and a relative pre-activity time attribute set to −5 seconds, indicating that processor 400 should create a media clip beginning 5 seconds prior to the time that the user selected the "Goal" activity indicator, and lasting for 15 seconds after the "Goal" activity indicator was selected. Of course, these values are merely illustrative and other time periods and/or time application attributes may be used in other examples. In this way, media clips may be created that contain content that has occurred prior to user selection of an activity indicator In another example, a time duration of 10 seconds may be pre-assigned to an activity indicator and a pre-activity time of 0 seconds from the time of user selection of the activity indicator. This particular combination of time duration and pre-activity time may be used when it is known or likely that the activity will occur, such as just before a field goal is kicked, just before a kickoff, just before a free kick in soccer, just before birthday candles are blown out, etc. For example, just before a field goal in a football game, the user may select a "Field Goal" activity indicator on user interface 404. In response, processor 400 creates a "field goal" media clip, comprising a video clip lasting ten seconds in duration, beginning at the time when the "Field Goal" activity indicator was selected by the user and lasting for 10 seconds.

In any case, the pre-assigned, default time attributes may be modified in some embodiments by the user at block 602 via user interface 404. For example, the user may increase or decrease a media clip time duration attribute associated with one or more activity indicators, or modify one or more pre-activity and/or post-activity times. When the activity indicator attributes are changed, the changes are generally stored in association with their respective activity indictors in memory 402. In another embodiment, a user may manage his or her time attributes via another device, such as a computer or a tablet, by logging into a user account managed by server 104 where these attributes could be displayed to a user and be modified.

The media clip creation application may still further ask the user to enter the names of any persons that the user may want to associate with an event. For example, before a dinner party, the user may enter the names of some or all of the attendees.

In any of the above examples, the information entered by the user is received by processor 400 from user interface 404 and stored in memory 402.

In one embodiment, the quantity and/or the type of activity indicators associated with the selected event may be modified by the user. For example, not all of the activity indicators available for a particular event may be of interest to the user and, thus, the user may be permitted to delete such activity indicators or prevent them from being displayed to the user during use of the media clip creation application via user interface 404. In one embodiment, the user may be able to add one or more custom activity indicators, such as "Halftime", or "Fight", for example, for a sporting event. Similarly, the user may be able to add an activity indicator such as "Excellent" for indicating a point of interest during the event that the user may find to be pleasing. In this embodiment, the user may add one or more custom activity indicators using a free-form text box or a pre-defined drop-down list presented by processor 400 via user interface 404. The custom activity indicators entered by the user are received by processor 400 and displayed to the user during recording, as described below. The custom activity indicator(s) created by the user may also be assigned custom timing attributes, such as a "time duration" and/or "pre-activity" and/or "post-activity" time attributes that allow the processor to create media clips relative to when an activity indicator is selected in accordance with the time duration and time attributes. Processor 400 may suggest default values for such time attributes via user interface 404.

At block 604, processor 400 causes a recording function of content capture device 100 to become activated. For example, processor 400 may cause a camera and/or a microphone to begin capturing visual and/or audio information and providing a digitized representation of the visual and/or audio information to user interface 404 for presentation to the user during recording. The recording function may be activated using machine-readable instructions dedicated to such recording capabilities (such as pre-existing code resident in 100 to create still pictures, video, and/or audio recording), or it could reside in the machine-readable instructions comprising the media clip creation application.

At block 606, in one embodiment, processor 400 causes user interface 404 to display the one or more activity indicators associated with the selected event or sub-event, less any event indicators that the user may have chosen not to use, and/or including any custom activity indicators that the user may have added from block 604. In another embodiment, the activity indicators are not displayed at this step. Rather, a "display/hide" indicator is presented to the user via user interface 404, such as a small icon that, when touched by the user, then causes the activity indicators to be shown. Such a display/hide indicator may be useful to avoid cluttering user display during recording.

At block 608, the user begins recording the event, typically by touching a "Record" icon displayed on user interface 404 or by other means, such as pressing a button on content capture and tagging device 100, issuing a voice command, or utilizing a separate remote control device communicating with content capture and tagging device 100. In response, processor 400 begins storing digital information from the camera and/or microphone into a temporary digital file that grows in size as the recording progresses. When recording is complete, these temporary file is stored in memory 402 as a primary media recording.

At block 610, an activity occurs while content capture and tagging device 100 is recording the event, corresponding to at least one of the activity indicators that are displayed on user interface 404 (or temporarily hidden from view). In another embodiment, media clips are created after the user has finished recording the event, whereby activity indicators are presented to the user as primary media recordings are reviewed by the user. In any case, in response to the activity occurring, the user selects one of the activity indicators corresponding to the activity. For example, if a soccer goal was scored, the user may select a "Goal" activity indicator displayed on user interface 404. If birthday cake was just blown out (or about to be blown out), the user may select "Candle Blowing" activity indicator displaced on user interface 404. In general, the activity indicators may be selected by the user at any time, for example before, during, or after an actual activity occurs. Thus, if the user is recording video of a football game, and the football is on the one yard line, the user may have selected "Touchdown" just before the ball is snapped, believing it to be inevitable that the a touchdown is scored during the play.

More than one activity indicator may be selected in association with an activity. In the just described example of a touchdown being scored, for example, a "Favorite Player" activity indicator may be selected, either in addition or alternative to, the "Touchdown" activity indicator, providing further information of the activity to processor 400, e.g. an association of the touchdown with a favorite player of the user. In another example, the user may select "Touchdown", "Favorite Player", and "Highlight" activity indicators, identifying that a touchdown occurred involving the user's favorite player, and that the user considered the play to be a "highlight" of the game for the user. Thus, two or more activity indicators may be associated with a single activity.

At block 612, processor 400 may cause one or more queries to be displayed on user interface 404 in response to receiving the one or more activity indicator selections from the user at block 610, requesting additional information of the activity that just occurred. For example, in response to the user selecting a "score" activity indicator (e.g., touchdown, field goal, home run, goal, etc.), processor 400 may present a query to the user asking which team scored, for example, by displaying a multiple-choice selection of each team. In another example, processor 400 may cause user interface 404 to display a list of names of people that the user entered at block 602 that might be associated with the score. The user may select one or more of the names on the list who scored. In yet another example, the user may be asked to tag the activity as being "public" or "private", which may limit availability of a resultant media clip to only family and friends, or make the resultant media clip available to others as well. In any event, the additional information is entered via user interface 404 and provided to processor 400, where it is stored in memory 402 in association with an identification of the "score" activity indicator selected by the user. Such information may be referred to as activity identification information.

At block 614, in one embodiment, an "activity indicator selection time" is recorded by processor 400 associated with a time when processor 400 received a selection of one of the activity indicators by the user. The activity indicator selection time operates as a "time stamp" of approximately when an activity has occurred. The activity indicator selection time can be taken from any reference point. For example, the activity indicator selection time could comprise a time of day, an elapsed time from when a particular recording began, an elapsed time from when an actual or expected start time of the event, a time provided by server 104, etc. In an embodiment where media clips are created during review of primary media recordings, the activity indicator selection time may comprise the elapsed time from the start of the primary media recording, may be determined using a combination of the elapsed time with an actual time of when the recording began, or it may be determined by retrieving time-stamp information provided within the primary media recording during creation by processor 400. The activity indicator selection time is stored by processor 400 in association with the information from block 612, e.g., the activity identification information.

At block 616, processor 400 creates a media clip as content capture device 100 continues to capture content, e.g., records an event. In another embodiment, the media clip is created after the user stops recording the event, during playback of a primary media recording previously created and stored in memory 402. The primary media recording refers to a digital audio/video file created and stored in memory 402 corresponding to the time between when the user began recording the event until the user stopped recording. In this embodiment, processor 400 causes the activity indicators to be displayed while the primary media recording is being reviewed, and creates a media clip from the primary media recording to include a portion of the primary media recording at a time when the user selects one of the activity indicators. In any case, in one embodiment, processor 400 then stores the media clip and the associated activity identification information memory 402. As described previously, the activity identification information comprises information identifying one or more activity indicators that were selected, the time that the activity indicator(s) was/were selected (or received by processor 400), and potentially other information, such as the information described above at block 602, e.g., event identification information, an identification of a team that scored points in a game, the name or names of persons associated with an activity, an indication that an activity was a "highlight" or "favorite", a qualifier for the activity, e.g. difficult versus lucky, etc.

In one embodiment, the media clip includes audio and/or video content of an activity that occurred before, after, or both before and after, the time that an activity indicator was selected by the user. For example, a "Field Goal" activity indicator may be selected by a user recording a football game when the offensive team has lined up at the line of scrimmage just before the field goal attempt. Processor 400 receives an indication that the "field goal" activity indicator was selected from user interface 404, and a video clip may be created comprising, for example, 4 seconds of audio/video information recorded by content capture device 100 prior to the time that the "Field Goal" activity indicator was selected, and 3 seconds of audio/video information after the "Field Goal" activity indicator was selected. The media clip duration and start time is determined by processor 400 by retrieving predetermined timing information associated with the selected activity indicator from memory 402. In this example, the timing information comprises a time duration of 7 seconds and a start time of 4 seconds prior to user selection of the "Field Goal" activity indicator. In this embodiment, e.g., as the event is being recorded, processor 400 waits to create the media clip until at least 3 seconds has elapsed from the time that the "Field Goal" activity indicator was selected. In an embodiment where the media clip is created from a primary media recording stored in memory 402, the media clip may be created immediately after the "Field Goal" activity indicator was received by processor 400.

Of course, multiple media clips may be created during a single recording, e.g., the time between when the user begins recording until the time that the user stops recording. As indicated above, the media clips may be created "on-the-fly" or after the user stops recording.

In one embodiment, during media clip creation by processor 400, processor 400 inserts a "tag", "meta-tag", metadata, or "metadata keys" into the media clip comprising the activity identification information. For example, a popular audio and video editing software application known as "FFmpeg" allows users to add "metadata keys" to certain types of video encoding formats, such as MOV, QuickTime, MP4, etc. The metadata keys include information that identifies a "title", "author", "artist", "episode ID", "year" and so on. This technique could be used by processor 400 to insert the activity identification information to the media clip directly so as to identify the media clip as a particular activity, as well as pertinent details regarding the activity, such as when the activity occurred, a time duration of the media clip, start/stop times of the media clip, names of persons or teams associated with the activity, etc.

At block 618, in one embodiment, processor 400 assigns a file name to the media clip created as described above, using some or all of the activity identification information stored in memory 402 associated with the selected activity indicator. In another embodiment, the file name may be generic, and associated with activity identification information pertaining to the activity.

The file name may be as simple as an identification of an activity associated with the activity indicator selected that caused creation of the media clip along with a unique number. For example, while recording music from a concert, a user may select a "Guitar Solo" activity indicator presented on user interface 404 a number of times throughout the concert each time that a solo is performed by a guitar player. Each time that the "Guitar Solo" activity indicator is selected, a media clip is created and stored in memory 402, with a file name such as "Music_Concert_GuitarSolo_XXX.mp3", where "XXX" represents a three-digit number that is incremented each time that a new guitar solo media clip is created.

In other embodiments, the file name may comprise much more information, such as any of the information the record created by processor 400 at blocks 602 and 616. Thus, files names such as:

"Kids_Soccer_07-04-2012_SanDiego_Michael_
Highlight_Goal_Hawks_003.avi"

The above file name comprises activity indication information that identifies the media clip as associated with a children's soccer game played on Jul. 4, 2012 in San Diego, featuring the user's child, "Michael". The information further indicates that the media clip is considered to be a "highlight" of the game, that a goal was scored (perhaps by Michael) by a team named the "Hawks", and that this is the third media clip created during the game. Thus, each media clip may have multiple types of meta-information on the activity that may be used to search and display media clips of interest. In another embodiment the activity meta-information is stored in a separate file or data base record and the file names merely serves as a reference to the content and may be of any form.

At block 620, at some time after one or more media clips are created and stored, the user may provide the media clip(s) to server 104 for distribution to others. A website may be provided by server 104 (or by another server) that allows users to log onto respective user accounts previously set up by each user and stored by server 104. The media clips may then be uploaded to server 104 via communication interface 406 and network 306 using well-known network communication protocols and techniques.

At block 622, the media clip(s) is/are received by server 104 and stored in memory 502. In one embodiment, the media clip(s) is/are stored in association with the user who uploaded the clip(s) in addition to the activity identification information corresponding to the activity. In this way, access to each user's clips may be limited to only the user and others who have permission from the user to access the media clip(s). In another embodiment, media clips are stored in association with at least some of the activity identification information. In another embodiment, in addition to the foregoing, the clip(s) is/are stored in memory 502 for general availability to others in association with activity identification information. Storing media clips in association with the activity identification information allows server 104 to locate media clips by keywords provided by persons interested in an event and/or activities associated with the event. In a further embodiment, the clips are stored in association with a curated playlist based on input from one or multiple users.

At block 624, at some later time, an operator of content consumption device 102 may wish to view some or all of the media clips uploaded by the user or by other users. For example, the operator may have watched the same sporting event as the user, and want to access video clips relating to scoring, highlights, or other points of interest of the sporting event. In another example, the operator may have attended the same wedding ceremony as the user, the same graduation, the same party, etc. and wish to view media clips associated with these events and created by others.

To access media clips, the operator may access a web site provided by server 104 or another server that allows the operator to search for media clips of interest. In another embodiment, the operator may launch a media clip viewing application resident on content consumption device 102 or the same media clip creation application residing on content capture and tagging device 100, in this embodiment, additionally capable of searching for and displaying media clips. The operator may only be permitted to access media clips belonging to friends or family members, after receiving the necessary permission(s) to do so, as is known in the art. In other embodiments, the operator may be allowed to search all media clips stored by memory 502, or only a subset of media clips stored in memory 502.

At block 626, the operator may be presented with a search page on content consumption device 102, where the operator may enter search criteria for media clips of interest. For example, a number of input-fields may be displayed, each enabling the operator to enter one or more search criteria, such as an event code, event type (e.g., baseball game, party, wedding, graduation, kid's sports, professional sports, etc.), a location where the event took place (e.g., a city, a park, an address, GPS coordinates, a business name, restaurant, church, etc.), a date range (e.g., clips created or uploaded within the past day, 7 days, month, etc.), the name of a person who may have appeared in a media clip, a team name, and/or other information to identify media clips of interest. Such input fields may comprise free text entry or selection from a pre-defined list of options, such as a drop-down list, a barrel, a coverflow widget, or other multiple choice selection mechanism. Server 104 may provide a selection of activities associated with various event types after the user enters an event type of interest. The user may select one or more of these activities to search for media clips containing the selected activities.

At block 628, the search criteria from the operator is sent by content consumption device 102 to server 104 via network 106, using known communication protocols and/or techniques. In response, processor 500 searches memory 502 for media clips associated with activity identification information matching one or more of the search criteria provide by the operator.

At block 630, server 104 may present one or more display options for the operator to view media clips when they are returned by server 104 as a result of receiving the search criteria, above. The display options may include presentation of media clips to the operator in one or more formats, such as one or more "Game-Based" formats", one or more "Team-Based" formats, one or more "Timeline" formats, one or more "Contiguous" formats, one or more "Player-Based" formats, or other formats available for selection by the operator, as described below. Each of these formats may require additional information from the operator, such as a team name, player name, activity type (representing activities of interest to the operator, such as scoring activities or highlights), a time or time period (e.g., "fourth quarter", "first period", "innings 7-9", etc.). Server 104 may present media clips in one of several available formats as a default format if the operator does not select a display option.

For example, processor 500 may present sporting event media clips to the operator in a "Game-Based" format, whereby media clips matching at least some of the search criteria received at block 628 are presented to the operator in two columns, each column comprising media clips associated with one of two teams who played a game against each other. For example, each column may present a series of still images, thumbnail videos, hyperlinks, etc., representing media clips related to one or the other team, possibly arranged chronologically from top to bottom. In another example, only certain media clips are shown in each column, such as media clips associated with scoring or labeled as a highlight by a user who created the media clip.

Processor 500 may alternatively present media clips in a "Team-Based" display, whereby sporting event media clips of only one of two or more teams are presented to the operator. For example, in a baseball game between Team1 and Team2, processor 500 may present a series of still images, thumbnail videos, hyperlinks, etc. of media clips that involve scoring, highlights, or all media clips associated with Team1, for example. The selection of which team to present may be provided to the operator at block 630.

Processor 500 may present media clips in a "Player-Based" display, whereby sporting event media clips associated with a selected player in a game are presented to the operator. For example, in a basketball game between TeamX and TeamY, processor 500 may present a series of still images, thumbnail videos, hyperlinks, etc. of media clips associated with player "X", playing on TeamX. In one embodiment, only media clips associated with scoring or highlights are presented.

Processor 500 may present media clips in a "Timeline" display, whereby media clips are presented to the operator chronologically as an event occurred. For example, a timeline may be presented, indicating a time when activities took place during an event, and a corresponding media clip associated with each activity, represented by a series of still images, thumbnail videos, hyperlinks, etc. The operator may provide an indication of the types of activities to show on the timeline, such as "only scoring activities", "only highlights", "only a selected team", "only a selected player or players", etc.

Processor 500 may present media clips in a "Contiguous" display, whereby media clips associated with the search criteria are combined into a single, contiguous media clip presentation. Such presentation may be achieved via combining multiple clips into a new single media stream, or to play back a series of clips consecutively. For example, an operator may search for all media clips labeled as a "highlight" that are associated with a party that the operator attended at a particular place on a particular date, and further indicate that the operator would like to view any resultant media clips as a "contiguous" format (e.g., a "highlight reel"). In response, processor 500 searches memory 502 for media clips matching the criteria provided by the operator and combining the media clips matching the criteria (e.g., "party", "date", "place", "highlights") to produce a single media clip comprising all of the media clips matching the criteria. The media clips are typically arranged in chronological order, but may alternatively be arranged randomly, or based on some other metric, such as a "popularity" metric assigned by processor 500 to media clips as they are viewed individually by others. The contiguous media clip is then presented to the operator. More than one contiguous media clips may be requested by the operator in regard to a particular event. So, for example, the same operator may additionally request media clips from the same party as described above, viewed in a contiguous format comprising only media clips containing himself.

At block 632, processor 500 may receive a display preference from the operator from the selection of one of the display options presented to the user at block 630, the display preference indicating a preferred presentation of media clips to the user.

At block 634, processor 500 presents media clips matching the operator's search criteria provided at block 628 and in a manner as indicated by the operator's selected display preference, as described above, by displaying still images, icons, thumbnail videos, hyperlinks, or some other way to indicate the availability of a media clips. Other information regarding the associated media clips may be displayed as well, such as the time the activity took place, a type of goal that was scored, an individual's name associated an activity, etc., as obtained from information associated with or found in each of the media clips.

At block 636, the operator may select one or more of the still images, icons, thumbnail videos, hyperlinks for viewing or listening. In response, a media clip associated with the selection may be streamed, downloaded, or otherwise provided to content consumption device 102 for storage and/or viewing by the operator. The operator may be permitted to mark specific clips as favorites, either directly in the above mentioned list presentation or while watching a clip. Such list of favorites is stored by processor 400 and may further be forwarded to server 104.

Figure 7A:
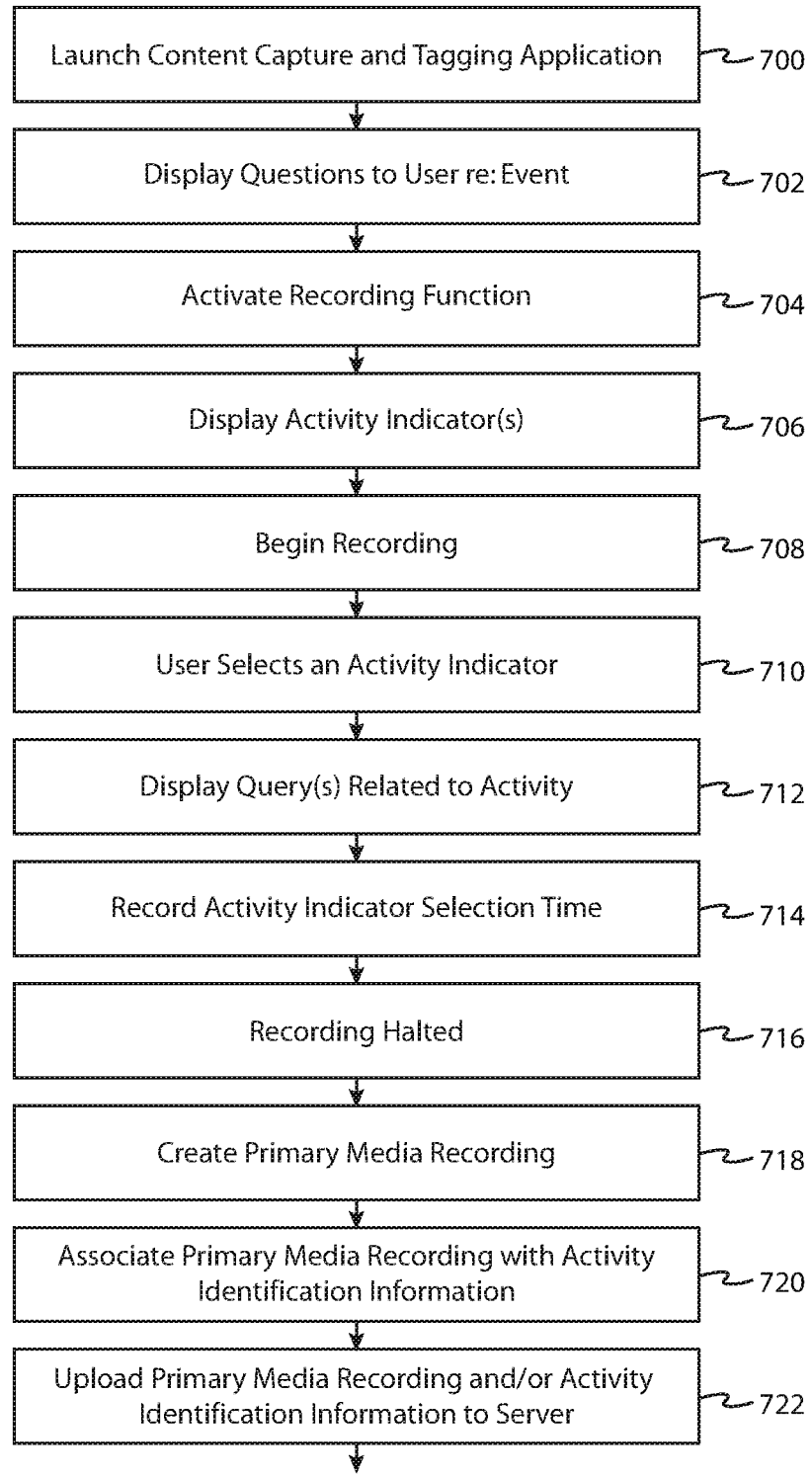
FIGS. 7A and 7B are flow diagrams illustrating another embodiment of a method for creating media clips, by the server shown in FIG. 1.
Figure 7B:
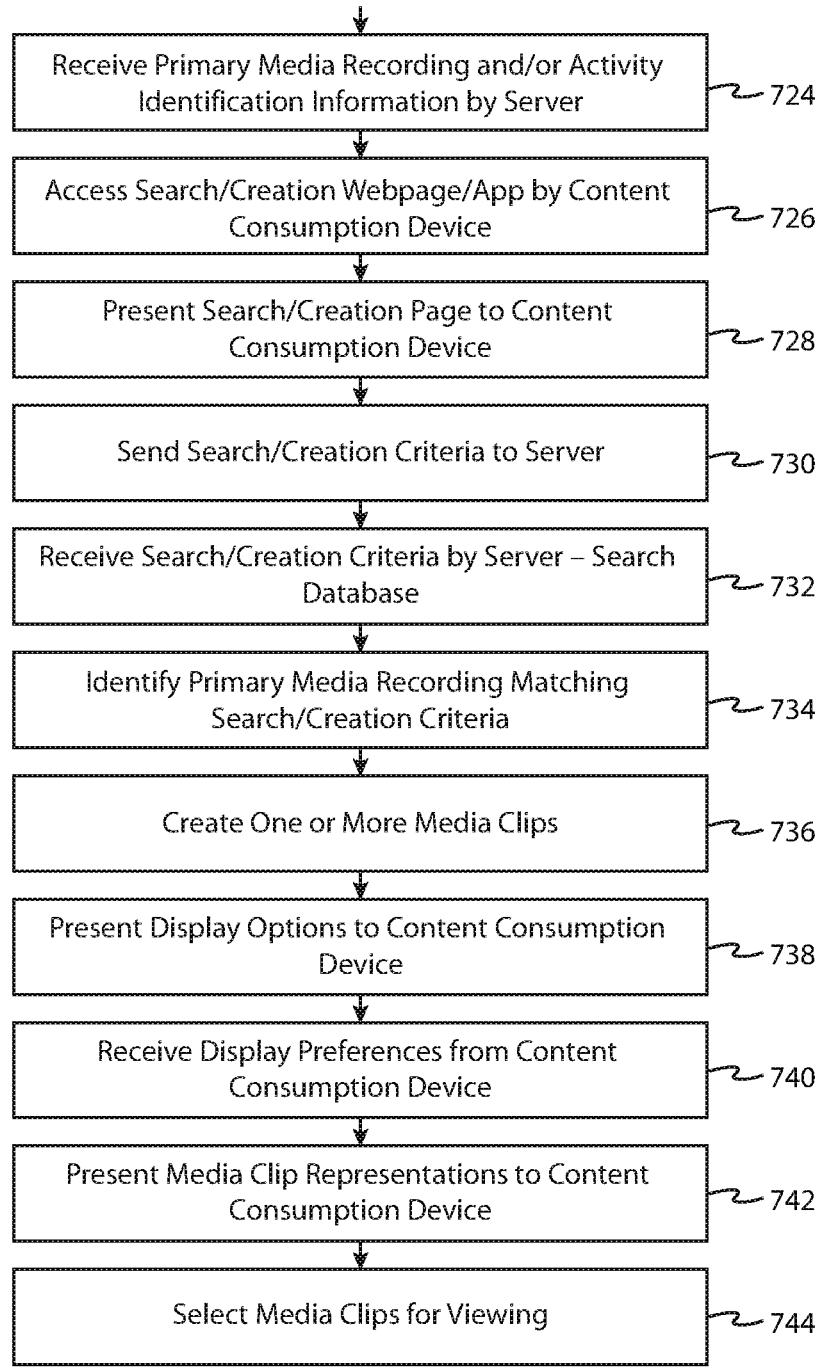

FIG. 7 is flow diagram illustrating another embodiment of a method for creating media clips, this time by server 104, rather than by content capture and tagging device 100 as described in the method of FIG. 6. The method is implemented by processor 400 within content capture and tagging device 100 and processor 500 within server 104, each processor executing respective machine-readable instructions stored by memory 402 and memory 502, respectively. It should be understood that in some embodiments, not all of the steps shown in FIG. 7 are performed and that the order in which the steps are performed may be different in other embodiments. It should be further understood that some minor method steps have been omitted for purposes of clarity.

At block 700, a user of content capture and tagging device 100 launches a content capture and tagging application resident on 100 via user interface 404 for allowing the user to create primary media recordings based on content (audio and/or visual events) recorded by content capture and tagging device 100, and for providing activity identification information related to activities that occur during the primary media recordings. For example, the user may touch an icon displayed on user interface 404 to launch the application. In response, user interface 404 provides a signal to processor 400 for processor 400 to execute machine-readable instructions stored in memory 402 related to the content capture and tagging application. In one embodiment, the content capture and tagging application is tailored to a particular type of event, such as "sporting event", "wedding', "reception", "party", "graduation", "kids soccer game", "professional football game", etc. by only including activity indicators associated with each type of event. In another embodiment, the content capture and tagging application comprises activity indicators associated with multiple events, and the user is given an option to select an event prior to recording.

At block 702, in one embodiment, processor 400 causes user interface to display a series of questions to the user regarding various attributes relating to an event that the user is about to record, and/or various attributes relating to one or more activity indicators, as described above with respect to block 602 of the embodiment of FIG. 6. In one embodiment, a request to change time attributes associated with one or more activity indicators is provided to server 104, and server 104 may store the changed time attributes in memory 502 in association with each respective activity indicator, then provide an acknowledgement to content tagging device 102. In one embodiment, the changed time attributes replace default time attributes stored in memory 502 and may be used to create media clips for other users. In another embodiment, the changed time attributes provided by content capture device 100 are used only to create media clips for the user who provided the changed time attributes. In this way, each user of server 104 may customize time attributes associated with common activity indicators to create media clips of customized duration and pre/post times.

At block 704, processor 400 causes a recording function of 100 to become activated, as described above with respect to block 604 of the embodiment of FIG. 6.

At block 706, in one embodiment, processor 400 causes user interface 404 to display one or more activity indicators associated with the selected event, less any activity indicators that the user may have deleted or caused to be hidden, and/or including any custom activity indicators that the user may have added from block 702.

At block 708, the user begins recording the event, typically by touching a "Record" icon displayed on user interface 404 or by other means, such as pressing a button on content capture and tagging device 100, or using some remote control mechanism communicating with device 100. In response, processor 400 begins storing digital information from the camera and/or microphone into a temporary digital file that grows in size as the recording progresses.

At block 710, an activity occurs while content capture device 100 is recording the event, corresponding to at least one of one or more activity indicators that may be displayed on user interface 404 (or temporarily hidden from view). In response to the activity, the user selects one of the activity indicators corresponding to the activity, as described above with respect to block 610 of the embodiment of FIG. 6. In another embodiment, activity indicators are presented to and selected by the user while primary media recordings are reviewed after the user has finished recording. An indication of selection of the activity indicator is provide to processor 500, identifying which one of the activity indicators was selected if more than one activity indicator is available for selection.

At block 712, processor 400 may cause one or more queries to be displayed on user interface 404 in response to receiving the one or more activity indicator selections from the user at block 610, requesting additional information of the activity that just occurred as described above with respect to block 612 of the embodiment of FIG. 6.

At block 714, in one embodiment, an activity indicator selection time is recorded by processor 400 in association with a time when processor 400 received a selection of one of the activity indicators by the user, as described above with respect to block 614 of the embodiment of FIG. 6. Processor 500 creates activity identification information, comprising at least the selection time. In other embodiments, the activity identification information further comprises an activity type associated with the activity indicator selected by the user. Other information may be included as well, such as the information obtained at block 712.

At block 716, at some later time, recording is halted by the user by touching/pressing a "stop" indicator displayed on user interface 404 or a mechanical switch or button located on capture and tagging device 100, or via another remote control mechanism communicating with content capture and tagging device 100.

At block 718, in response to the user halting recording, processor 400 creates a primary media recording using the digitized audio/video information captured during the recording process and stores it in memory 402. The primary media recording is typically in conformance with one or more well-known digital audio or video formats, such as AVI, MPG, WMV, MOV, FLV, WAV, AIFF, MP3, M4A, WMA, etc.

At block 720, processor 400 associates activity identification information with the primary media recording, corresponding to one or more activities recorded in the primary media clip. The activity identification information may include, for example, an event code, event type, activity name or identification associated with an activity indicator selected by the user, a date and/or time that the activity occurred, the activity indicator selection time, a location where the activity occurred, one or more team names associated with the activity, environmental information such as temperature, motion, day/night conditions, wind, rain, etc. or other information that may be associated with an activity, as described in blocks 702, 712, and/or 714.

In one embodiment, the activity identification information is associated with the primary media recording by creating a separate data file containing the activity identification information and forming an association between the data file and the primary media recording. This association may be created using one of a number of known techniques, such as naming the data file and the primary media recording the same file name (excluding the file extension), storing the data file and the primary media recording in the same folder, assigning a unique code in the file name of both the data file and the primary media, use of a database to associate both primary media and the activity information, etc.

In another embodiment, a separate data file is not created. Rather, the primary media recording itself is appended to include the activity identification information, such as by annotating or "tagging" the primary video file with "metadata keys". For example, a popular audio and video editing software application known as "FFmpeg" allows users to add "metadata keys" to certain types of video encoding formats, such as MOV, QuickTime, MP4, etc. The metadata keys include information that identifies a "title", "author", "artist", "episode ID", "year" and so on. This technique could be used to append the activity information to the primary media recording directly so as to identify one or more activities present in the primary media recording, a time that the activity(ies) occurred, a time length associated with each activity and/or start/stop times, and/or other information associated with each activity.

In another embodiment, the primary media recording is assigned a file name comprising the activity identification information, as described above in block 616 of FIG. 6.

At block 722, the user may upload the primary media recording and activity identification information to server 104 for server 104 to create one or more media clips automatically based on the activity identification information associated with the primary media recording, and/or in response to requests from others. A website may be provided by server 104 (or another web server) that allows the user to log onto an account previously set up by the user and stored by server 104. The primary media recording and associated activity identification information may then be uploaded to server 104 via communication interface 406 and network 106 using well-known network communication protocols and techniques.

Primary media recordings and activity identification information do not have to be provided to server 104 at the same time. For example, a user of content capture and tagging device 100 may cause activity information to be uploaded to server 104 as it is triggered on user interface 404, but the corresponding primary media recording uploaded to server 104 at a later time, triggering clip generation at that point. In another example, a user of content capture device 100 may create a primary media recording of a portion of an event without tagging any activities that occur during the event. The primary media recording may then be provided to server 104. Thereafter, the user may review the primary media recording and select one or more activity indicators as the primary media recording is being presented. After selection of one or more activity indicators, activity identification information is generated by processor 400 in association with each activity indicator selected by the user, and then it may be provided to server 104 for server 104 to create media clips based on the activity identification information.

In the just-described example, when a user selects an activity indicator during review of a primary media recording, the activity indicator selection time is typically stored as an elapsed time from when the primary media recording began. Server 104 uses the elapsed time to determine a point in time during the primary media recording when the activity occurred.

At block 724, the primary media recording and associated activity identification information is received by server 104 and stored in memory 502. In one embodiment, the primary media recording and associated activity identification information is stored in association with the user who uploaded the file. In this way, access to each user's files may be limited to only the user and others who have permission from the user to access the primary media recording and media clips created by server 104 therefrom.

Media clips are created by processor 500 using the primary media recording and associated activity identification information. Generally, one media clip is created for each activity indicator that was selected by the user. For example, if the user selected three different activity indicators during recording of an event, producing a primary media recording 15 minutes in duration, processor 500 creates three media clips, each media clip created from the primary media recording near the activity indicator selection time of each of the three sets of received activity identification information. Each media clip has a time duration and start/end time in accordance with time attributes provided by the activity identification information. In another embodiment, time attributes associated with each activity indicator are stored in memory 502, and processor 500 uses these time attributes to create the media clips from the primary media recording at times specified by the time attributes. The media clips may be stored in association with at least some of the activity identification information used to create each media clip and/or in association with a user who provided the primary media recording and/or in association with a respective primary media recording that was used to create each media clip.

At block 726, at some later time, an operator of content consumption device 102 may wish to view activities that may have been recorded by others, such as another person who attended the same birthday party as the user who uploaded the primary media recordings to server 104. Generally, permission may be granted to others to view media clips created from media content captured and provided to server 104 by a first user.

To request media clips from server 104, the operator may access a web site provided by server 104 or another server that allows the operator to search for media clips created from content provided by the operator or other users. In another embodiment, the operator may launch a media clip viewing application resident on content consumption device 102, or the same media clip creation application residing on content capture device 100 having additional capabilities of searching and displaying media clips.

The operator may only be permitted to request media clips from primary media recordings belonging to friends or family members, after receiving the necessary permission(s) to do so, as is known in the art. In other embodiments, all primary video files, or just a sub-set of all files, stored in memory 502 may be used to create media clips.

At block 728, the operator may be presented with a search page, where the operator may enter search criteria for media clips of interest, as described above at block 626 of FIG. 6.

At block 730, the search criteria from the operator is received by server 104 via network interface 306 and communication interface 506, using known communication protocols and/or techniques. In response, processor 500 searches memory 502 for primary media recordings associated with activity identification information matching one or more of the search criteria provide by the operator.

In one embodiment, at block 732, server 104 finds the primary media recording uploaded by the user at block 722, which is associated with at least some of the search criteria provided by the operator.

At block 734, in one embodiment, server 104 creates one or more media clips from the primary media recording, based on the search criteria from the operator. For example, if the operator was authorized to search primary media recordings uploaded by 20 friends, and the operator entered search criteria of "Baseball Game", "Kids", "Apr. 12, 2013", "Sharks vs. Jets", and "highlights", processor 500 searches the accounts of the 20 friends for any primary media recordings comprising at least some of the search criteria. In one embodiment, processor 500 only uses primary media recordings associated with all of the search criteria, while in other embodiments, only a minimum number of search criteria have to be met in order for processor 500 to use a particular primary media recording.

In this embodiment, once at least one primary media recording has been identified, processor 500 uses the search criteria to create the media clips. For example, if processor 500 identified one primary media recording meeting all of the search criteria, processor 500 creates one or more media clips of portions of the primary media recording(s) based on the activity identification information associated with the primary media recording(s) and the search criteria provided by the operator. For example, if the operator requested media clips of only highlights of an event, processor 500 would create one or more media clips of activities designated as a highlight by the user who provided the primary media recording(s), using the activity identification information associated with the primary media recording(s).

A single primary media recording may result in several media clips being generated from it by processor 500. For example, a single, primary media recording could have six touchdowns and three field goals recorded and each tagged as a "scoring" activity, which would result in nine media clips being created by processor 500 in response to a request from an operator searching for media clips relating to a football game and wanting media clips of only the scoring plays. As described previously, more than one activity indicator could be selected when an activity occurs. In this case, any media clip that is generated from activity identification information related to more than one activity indicator is stored in association with each activity indicator that was selected.

Each media clip is created by copying a portion of the primary media recording in accordance with the activity identification information associated with each primary media recording. In some embodiments, the portion of the primary media that is copied to generate the clips can also be modified or reformatted to be readily reproduced in a variety of devices using a variety of transport mechanisms. The portion may be specified by a start time and a media clip time duration, an end time and a media clip time duration, a start and end time, or some other timing information that specifies the portion of the primary media recording containing a particular activity. In some embodiments, this information is not associated with primary media recordings, but rather stored in memory 502 as predefined information. For example, all media clips involving touchdowns could be defined as having a duration of fifteen seconds, beginning 7.5 seconds before a "touchdown" or "score" activity indicator was selected by a user and ending 7.5 seconds after the "touchdown" or "score" activity indicator was selected. Other activities could have similar, predefined time information associated with each activity. In some embodiments, the time information may be modified by a user, operator, or system administrator as well.

In any case, in this embodiment, processor 500 creates one or more media clips from one or more primary media recordings stored in memory 502, based on the search criteria and time information associated with the primary media recordings and/or predefined time information stored in memory 502. The media clips may then be stored in memory 502 in association with the operator and/or activity identification information and/or search criteria and/or event identification information for identification and retrieval by other operators.

At block 736, server 104 may present one or more display options for the operator to view the media clips created by processor 500. The display options may include presentation of media clips to the operator in one or more formats, as described above at block 630 of FIG. 6, such as one or more "Game-Based" formats", one or more "Team-Based" formats, one or more "Timeline" formats, one or more "Contiguous" formats, one or more "Player-Based" formats, or other formats available for selection by the operator.

At block 738, processor 500 receives a display preference from content consumption device 102 after selection of one of the display options by the user at block 736, the display preference indicating a preferred presentation of media clips to the user.

At block 740, processor 500 presents media clips matching the operator's search criteria received at block 730 and in a manner as indicated by the operator's selected display preference, as described above, by displaying still images, icons, thumbnail videos, hyperlinks, or some other way to indicate the availability of a media clips. Other information regarding the associated media clips may be displayed as well, such as the time the activity took place, a type of goal that was scored, an individual's name associated an activity, etc., as obtained from information associated with or found in each of the media clips.

At block 742, the operator may select one or more of the still images, icons, thumbnail videos, hyperlinks for viewing or listening. In response, a media clip associated with the selection is streamed, downloaded, or otherwise provided to content consumption device 102.

Figure 8:
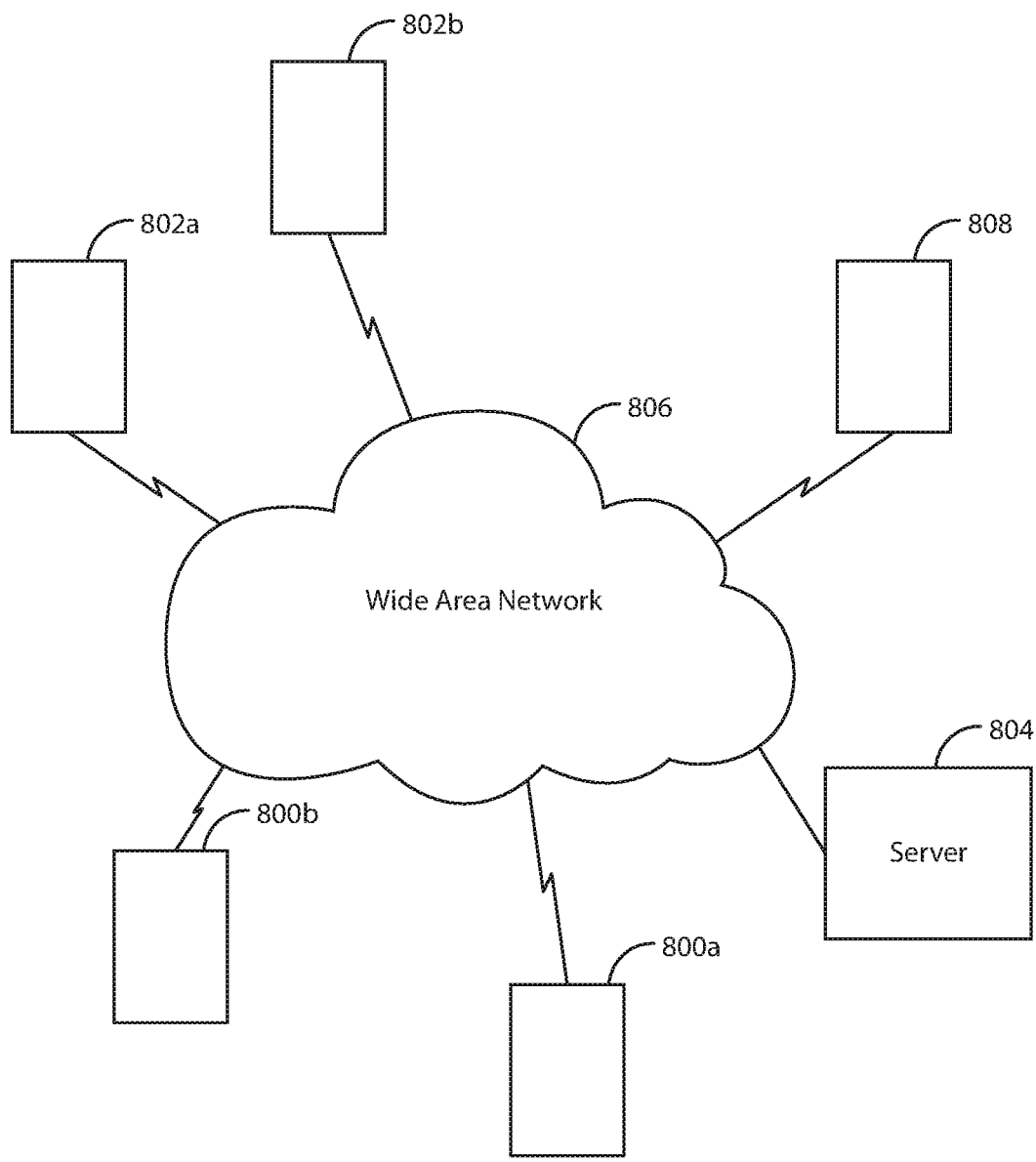
FIG. 8 is an illustration of a system for creating media clips using one or more of the content capture devices shown in FIGS. 1, 2, and 3 and one or more content tagging devices.

FIG. 8 is an illustration of a system for creating media clips using one or more content capture devices 800a and 800b and/or one or more content tagging devices 802a and 802b. In this embodiment, content from an observable event is captured by content capture devices 800a and 800b that record the event and upload the content in the form of primary media recordings to server 804, while content tagging devices 802a and 802b generate tagging information (activity identification information) as predefined activities occur during the event. The system is useful for providing, for example, video clips of activities that occur during an event from different angles and vantage points. For example, during parade, a first user standing right along the parade route may record the parade as it progresses in front of the first user, using content capture device 800a, while a second user may record the parade from a seat in some bleachers along the parade route, using content capture device 800b. Both users may provide primary media recordings of the event, i.e., the parade, to server 104. Meanwhile, a first user of content tagging device 802a, seated far back from the parade, could provide an indication to content tagging device 802a when a certain activity occurred during the parade, such as when a favorite marching band walks by, in order to later watch a close-up of the marching band via a media clip created by the primary media recording from the first user, at a time indicated by tagging information provided by the user of tagging device 102a. Meanwhile, a user of content tagging device 802b may watch the same parade on television, and provide tagging information to server 804 to create media clips at the time the user selected an activity indicator using content tagging device 102b. Server 804 uses the primary media recordings provided by the users of content capture devices 800a and 800b the tagging information provided by the users of content tagging devices 802a and 802b, to create media clips. The media clips are generally stored in association with each user who provided tagging information to server 804.

It should be understood that although FIG. 8 shows only two content capture devices and two content tagging devices, a greater, or fewer, number of content capture devices could be used to provide content to server 804, while a greater, or fewer, number of content tagging devices could be used to provide activity identification information for use by server 804 to create media clips. For example, in one embodiment, a single content capture device 800a could be used to provide content, e.g., primary media recordings, to server 804 and a single content tagging device used to provide activity identification information to server 804. In another embodiment, five content capture devices 800 could be used to provide content of an event to server 804, while a single content tagging device 802 used to provide activity identification information. Virtually any combination of content capture devices and content tagging devices may be used to create media clips of activities occurring during an observable event.

Each content capture device 800 comprises an electronic device capable of recording events, generating primary media recordings (and in some embodiments, media clips), and providing the primary media recordings to server 804 over one or more local or wide-area networks 806. Content capture devices 800a and 800b are similar to content capture and tagging device 100, described earlier, comprising devices such as smartphones, tablet computers, portable computers, network-capable cameras or audio recorders, network-capable camera-equipped drones, smart watches or other wearable "smart" devices, or dedicated devices to record live events and activities that may occur during such events. Some of the content capture devices could alternatively comprise a computer, camera, or audio recorder that is not network-capable, but having a removable memory for insertion into such a network-capable device. Multiple types of content capture devices could be used in the system of FIG. 8 to record and provide content, in the form of primary media recordings for example, to server 804. Each type of content capture device generally comprises the same or similar circuitry as content capture and tagging device 100, functionally depicted in FIG. 4, comprising a processor, memory, user interface, network or other connectivity interface, and one or more transducers for recording observable events by generating digitized audio and/or video data representative of the events. It should be understood that in some embodiments, content tagging devices 800 may additionally comprise a capability of generating tagging information as well.

The content tagging devices 802 each comprise an electronic device capable of receiving input from users and, in response, generating activity identification information, and providing the activity identification information to server 804. Content tagging devices do not require a capability of recording audio and visual information, although many types may possess this capability. Examples of content tagging devices may include smartphones, tablet computers, portable computers, wearable devices such as smart watches, motion-detection bands or pendants, etc. Multiple types of content tagging devices could be used in the system of FIG. 8 to provide activity identification information to server 804 for use in creating and distributing media clips of the same observable event, as will be explained in greater detail below. Each content tagging device generally comprises the same or similar circuitry as content capture and tagging device 100, functionally depicted in FIG. 4, comprising a processor, memory, user interface, and a network interface. However, content tagging device 802 may or may not comprise one or more transducers to record events as they occur, or even a user interface, as in the case of a wearable device.

As just mentioned, content tagging devices may lack a user interface for the purpose of tagging an activity. For example, a content tagging device could comprise a wearable device such as a personal activity monitor worn on the wrist that measures steps taken, heartrate, body temperature, acceleration, and/or other information. Currently, such activity monitors include those retailed by Jawbone of San Francisco, Microsoft Corporation of Redmond, Wash., Garmin of Schaffhausen, Switzerland, as well as several others. An activity may be tagged when a user's heartrate exceeds a default or user-selectable, predetermined heartrate threshold, indicating that an exciting activity is taking place. In another embodiment, an activity may be tagged by a user tapping or shaking his or her wrist, where an accelerometer within the wearable device detects sudden accelerations as a result of these actions. In one embodiment, the number of taps or shakes, and/or the time between taps or shakes, may identify a predetermined media clip duration or particular types of activities. For example, when a user taps his wearable device once, it may indicate a desire by the user for server 804 to create a media clip lasting 5 seconds, while tapping the user's wearable device twice may indicate a desire for a longer media clip, such as 10 seconds. The number of shakes or taps associated with media clip durations may be stored in memory 402 inside the wearable device. Additionally, the wearable device may determine that the user is performing certain activities automatically, based on acceleration, temperature, and heartrate, such as determining when a surfer is paddling, standing, or riding a wave. For example, the wearable device may determine that a user is paddling by detecting the temperature changing from a relatively cold water temperature to a relatively warm air temperature repeatedly, detecting acceleration of the user's arm in an arcing manner, and/or detecting an increased heartrate, indicating that the user is paddling. Similarly, the acceleration profile inherent to catching a wave and finishing the ride can be used to determine the start- and end-times of a ride. Each one of these activities could be defined as an activity that the user may wish to define as a tagging activity. Furthermore, such wearable devices used to auto-detect activities may be configured with different profiles and thresholds for activity detection based on the activity type and the user's ability level. For example, one or more tagging profiles may be defined and offered in an application loaded onto a smartphone. Each tagging profile may comprise one or more pre-determined parameters used to determine a certain type of activity, each tagging profile tailored to a particular type of sporting activity. For example, a surfing profile may be loaded onto a wearable from a smartphone that defines one or more activity indicators defined by particular combinations of movement, acceleration, temperature, heartbeat, or other parameters as an activity for tagging. Other profiles might define certain combinations of similar parameters for use in cycling, baseball, volleyball, motocross, or virtually any sport. Each profile may be downloaded onto a wearable prior to a user engaging in a related sport, and when the user performs an activity matching one of the predefined activity indicators, tagging information is created and stored in a memory for later retrieval by another device.

In another embodiment using a combination of wearables and content capture devices with two or more users, active tagging (such as tapping the wearable), or auto-detection of an activity may relate to the same user's or other user's content capture device. In one example of two surfers each carrying a wearable and a content capture device, the auto-detection of a ride may apply to the motion and the content capture device of user 1. Once user 1 taps his wearable the auto-detection data of the user 2's device is used to identify the start and end-times applicable to primary content captured by user 1 recording the activity performed by user 2 and vice versa.

Some content tagging devices, such as wearables, are not capable of communicating directly with wide area network 806. Thus, in some embodiments, these kinds of tagging devices store tagging information until they are either within range of a network-capable device, such as a smartphone, tablet or computer, where the tagging information may be offloaded via wireless or wired communication links.

In another embodiment, a sensor or transducer could be disposed on or within a ball, such as an accelerometer or an RFID chip placed within a basketball, football, soccer ball, etc., to provide information for a server, content tagging device, and/or content capture device to automatically determine when an interesting or exciting activity has taken place. The sensor may determine the ball's position, velocity and/or acceleration during an event and provide this information to one of the aforementioned devices for analysis. Such information can be used to automatically generate tagging information based on predetermined parameters. For example, an indoor soccer field may comprise a series of RFID sensors disposed within the surface of the playing field, where a soccer ball has been outfitted with an RFID chip. As players move the ball over the playing surface, the RFID sensors determine the position and velocity of the ball. When the ball is determined to be at one end of the field or the other and is determined to be moving rapidly, it may be assumed that the ball is "in play" near one of the goals. If an RFID sensor within or near the goal detects the presence of the ball, this may be an indication that a goal has been scored. This assumption may be corroborated using acceleration information from an accelerometer/transmitter combination within the soccer ball, indicating a sudden, intense acceleration towards the goal, followed by a relatively gradual deceleration as the ball hits the net of the goal. Based on these observations, a tagging information is automatically generated by the server or the mobile device proximate to the event that determines the position, velocity and/or acceleration of the ball and/or players/participants of the event.

In a related embodiment, one or more cameras may be used to automatically create tagging information, either alone or in combination with, for example, the sensors described above. In this embodiment, one or more cameras may comprise processing circuitry and processor executable instructions that enable the cameras to evaluate the position of a ball and/or players/participants to generate automatic tagging information. In another embodiment, the video from the cameras are transmitted to a server for processing and tag generation. For example, a digital video camera could be mounted to a ceiling of a sports complex overlooking an indoor basketball court. From this vantage point, the camera can "see" the basketball during a game, generally at any time. The camera (or server) can visually determine that a basket has been scored when the ball is positioned over a hoop and falls through the hoop, and may additionally corroborate the basket by visually determining that the players are all generally moving towards the other basket after the apparent basket, indicating that possession has changed hands as a result of the basket. This same concept, of visually determining activities during events, can be used in many other types of events to auto-generate tagging information.

In any case, activity identification information is generated by each tagging device when an indication of an activity is provided to processor 400. The activity identification information may comprise, simply, an activity indicator selection time in an embodiment where a single, generic activity indicator is used.

Figure 9A:
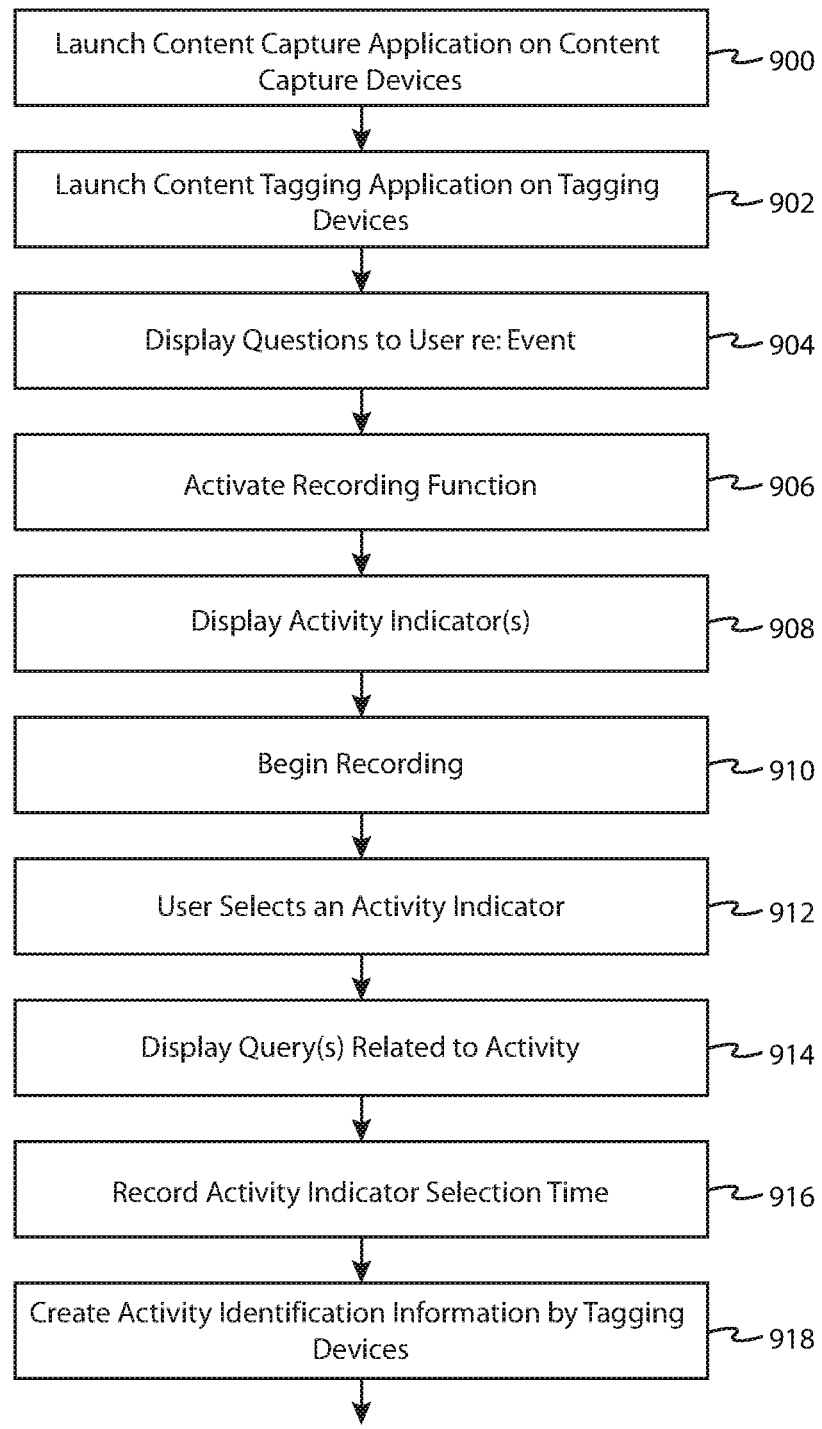
FIGS. 9A and 9B are flow diagrams illustrating one embodiment of a method for creating media clips by a server shown in FIG. 8, using content provided by one or more of the content capture devices shown in FIG. 8 and activity identification information provided by one or more content tagging devices shown in FIG. 8.
Figure 9B:
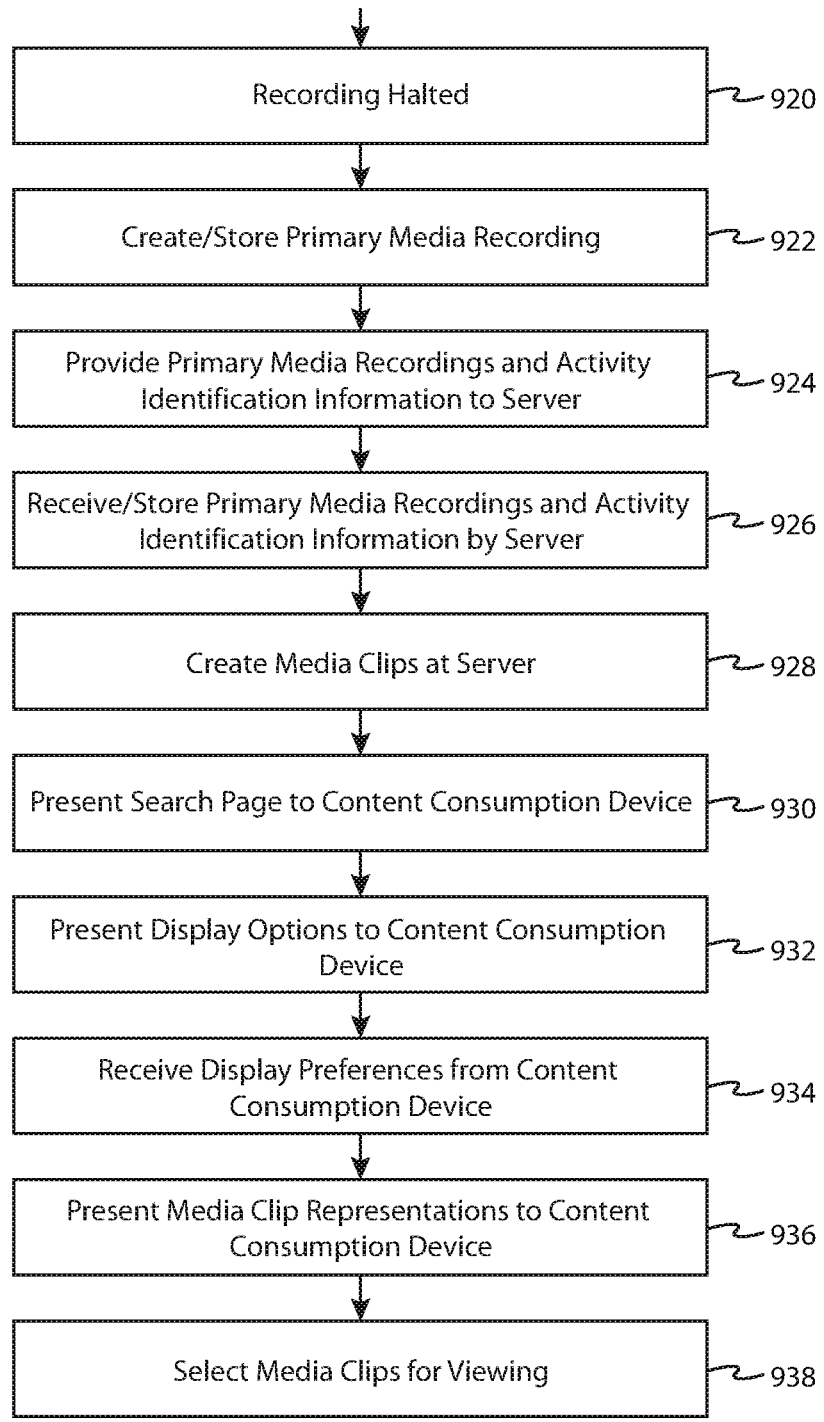

FIG. 9 is flow diagram illustrating one embodiment of a method for creating media clips by server 804, using primary media recordings provided by one or more content capture devices 800 and activity identification information provided by one or more content tagging devices 802. In this example, two content capture devices are used and two content tagging devices are used in conjunction with server 804 to create media clips of a professional soccer game. It should be understood that while the method of FIG. 9 describes creation of media clips associated with a professional soccer game, the concepts disclosed hereunder may be applied to other events, such as other sporting events, concerts, weddings, parties, etc.

In this example, content capture device 800a comprises a Wi-Fi enabled video recorder, and is affixed to a nonmovable object, such as a pole, tripod, or stadium, positioned to view an entire soccer field. Content capture device 800a may be used to generate lengthy video recordings (e.g., primary video files) of entire quarters, or even an entire soccer game. Content capture device 800b, in this example, comprises a smartphone operated by a fan seated inside a stadium where the soccer game takes place, seated near one of the goals. Each of the content tagging devices in this example comprises a smartphone operated by respective users observing the soccer game, one of the users also seated inside the stadium, and the other watching the soccer game from home on TV. A single content consumption device 808 is shown, also comprising a smartphone, used to request media clips from server 804 and have the media clips arranged in a format potentially specified by a user of content consumption device 808. The method is implemented by a processor, such as processor 400, within each content capture device, each content tagging device, and content consumption device 808, and a processor, such as processor 500, within server 804, each processor executing respective machine-instructions stored by a respective memory 402 or 502. It should be understood that in some embodiments, not all of the steps shown in FIG. 9 are performed and that the order in which the steps are performed may be different in other embodiments. It should be further understood that some minor method steps have been omitted for purposes of clarity.

At block 900, the first user of content capture device 800a launches a content capture application resident on content capture device 800a via user interface 404, and the second user launches the same or similar content capture application on content capture device 800b, each application for allowing each respective user to create primary media recordings of content of the soccer game recorded by each content capture device. Details of this block are similar or the same as the description for block 700 of FIG. 7, above. The content capture application resident on both content capture devices may be limited to only generating primary media recordings and providing the files to server 804, or it may comprise other features, such as the ability to generate tagging information, generate media clips, as described in the method of FIG. 6, and/or the ability to search for and present media clips created by server 804, as described with respect to the method performed by content consumption device 102 in FIG. 7. The content capture application may comprise a video and/or audio recording function commonly found on today's smartphones, or it may comprise an application specifically tailored to recording audio and/or visual information and providing the primary media recordings to server 804. In the former, primary audio and/or video clips may be provided to server 804 after the recordings have been completed, while in the latter, the primary media recordings may be provided to server 804 in a streaming manner as content is captured by the content capture application, or they may be provided to server 804 at some point after they have been created. In one embodiment, launching the tagging application causes a content capture device to initiate communications with server 804 in order, for example, to log onto a user's account maintained by server 804.

At block 902, the user of content tagging device 802a launches a tagging application resident on content tagging device 802a via user interface 404, while another user launches the same or similar tagging application on content tagging device 802b, each tagging application for providing activity identification information related to activities that occur during the soccer game, and providing the activity identification information to server 804. The tagging application resident on the content tagging devices may comprise the media clip creation application described above, or it may be a different application having tagging capabilities. In the former, the media clip tagging application could comprise instructions that allow users to create activity identification information without recording an event or viewing media associated with an event. In either case, the tagging application comprises instructions that allow a user to create activity identification information by selecting one or more predefined activity indictors or, in one embodiment, by simply providing a "generic" indication to processor 400 of a user's desire to tag an activity occurring during an event, e.g., an activity indicator that is not associated with one particular type of activity, or an existing button, key, or other hardware interface of the content tagging device. In one embodiment, launching the tagging application causes a content tagging device to initiate communications with server 804 in order, for example, to log onto a user's account maintained by server 804.

At block 904, in one embodiment, at least one of the users operating the content capture devices and/or the content tagging devices may be presented with a series of questions regarding various attributes relating to the event that the users are about to record or tag, and/or activity indicators related to the event type, similar to the questions described above with respect to block 702 of FIG. 7, referencing block 602 of FIG. 6. In another embodiment, these questions may be presented later, for example after the soccer game has finished and before primary media recordings and/or activity identification information is provided to server 804.

The questions typically relate to the a type of event, date, time, place, team names, player names, kid's names, etc. for use in creating and identifying media clips generated later by server 804. In one embodiment, a user and/or server 804 may create a unique "event code" for purposes of associating primary media recordings of an event with activity identification information generated as a result of viewing the same event, so that media clips may be generated based on the event. Typically, when an event code is used to identify an event, it is transmitted in association with each primary media file provided to server 804 by content capture devices and each transmission of activity identification information from tagging devices in order for server 804 to associate primary media files with tagging information related to the same event.

In one embodiment, an event code is created the first time that a user of either a content capture device or a content tagging device communicates with server 804 in regard to an event, in this case, the soccer game. In this example, an event code of 123ABC is assigned to the soccer game by server 804 and associated with the location of the soccer game (e.g., stadium name, city, address, etc.), the teams involved, the date/time of the game, etc. Thereafter, as other users initiate communications with server 804 (e.g., during set-up) server 804 provides the event code to respective content capture devices and content tagging devices when server 804 determines that a user is attending the same event, typically by determining a location of a user, and the current date and time that a communication is received. In other embodiments, server 804 compares information provided by users, such as team names, venue information, etc. to the information provided by the first user that caused creation of the event code, or to pre-existing event information stored in memory 502. When server 804 determines that at least some of the information received from other users matches the information provided by the first user, server 804 may alert these users that an event code already exists for a particular event and additionally provide information pertaining to the event, such as a location, team names, etc., and ask that these users confirm whether or not the same event is going to be recorded or tagged. When users confirm the same event, server 804 may provide the event code to the users' content capture devices or content tagging devices so that any primary media recordings or activity identification information created by these devices may include the event code in subsequent transmissions to server 804, thereby associating any primary media recordings or activity identification information with the event. All of this information could also reside in an event database in communication with server 804 that triggers the event related information to content or tagging devices based on login, location, etc.

When server 804 confirms that a user of either content capture devices or content tagging devices is at a particular event, server 804 may transmit further attributes of the event to respective devices, such as team names, key players' names, individual or team statistics, or other information that may aid users enter information after a primary media recording has been created or after an activity indicator is selected, as explained below.

Additionally, the event code could be provided to friends or family of user to inform them that an event is being recorded or tagged, so that they may later use the event code to locate media clips associated with the event. In one embodiment, server 804 provides the event code to others by accessing contact information stored of user accounts stored in memory 502, then uses the contact information to send an email, text, or other message to these other users. In another embodiment, in addition or alternative to sever 804 sending the event codes, the content capture application and/or the tagging application causes content capture devices and/or content tagging devices, respectively, to send the event code to these other people via text, email, or other message format. In one embodiment, the other people receive the event code via standard text messaging or email applications or, in one embodiment, via a media clip viewing application resident on respective content consumption devices, which may be part of a media clip creation application, content capture application, or tagging application.

At block 906, each processor 400 in each of the content capture devices causes a recording function to become activated, as described above with respect to block 604 of the embodiment of FIG. 6.

At block 908, in one embodiment, each processor 400 within each content tagging device causes user interface 404 to display the one or more activity indicators associated with a kid's soccer game. In this embodiment, only the content tagging devices display the activity indicators, as the content capture devices are used only to record the game. In another embodiment, however, one or more of the content capture devices may be configured to display activity indicators and be capable of generating activity identification information as well as primary media recordings during the game. In one embodiment, only a single, generic activity indicator is provided to users of the content tagging devices for providing an indication of general interest of any activity occurring during the soccer game.

At block 910, each of the users begins recording the event using their respective content capture devices, typically by touching a "Record" icon displayed on user interface 404 or by other means, such as pressing a button on 100. In response, each processor 400 begins storing digital information from each of the cameras and/or microphones of each content capture device into a respective temporary digital file that grows in size as each of the recordings progress. In this example, the fixed content capture device 800*a* records each quarter in its entirety, while the other content capture device 800*b* records a greater number of videos, each having a shorter duration than the videos recorded by the fixed content capture device 800*a*. Any of this content may be streamed as it is being recorded to server 804, or stored locally and uploaded at a later time.

At block 912, an activity occurs during the soccer game that may be of interest to at least one of the users operating one of the content tagging devices. For example, in this example, a goal is scored by the "Sharks" at 1:32:08 pm by Johnny Miller with an assist from Fred Smith. In response to the activity, at least one of the users operating the content tagging devices selects a "goal" activity indicator displayed on user interface 404, as described above with respect to block 610 of the embodiment of FIG. 6. More than one activity indicator may be selected by any of the users, also described above at block 610. In another embodiment, a user of a content tagging device selects a single, generic activity indicator, such as an icon displayed on user interface 404, or an existing button, key, or other hardware interface of the content tagging device. In this example, the user operating content tagging device 802*a* selects a "goal" activity indicator 1 second after the goal occurs, while the user operating content tagging device 802*b* selects a generic activity indicator 2 seconds after the goal occurs.

It should be understood that not all users of various content tagging devices have to be in attendance of an event in order to generate activity identification information. For example, some users of content tagging devices may be watching the soccer game at home or in a bar on TV and create activity identification information based on activities observed while watching the TV. Typically, this embodiment works only for real-time viewing, unless an adjustment is made to the tag times to account for the delay in a re-broadcast.

At block 914, each processor 400 of each content tagging device may cause one or more queries to be displayed on each user interface 404, respectively, in response to receiving an indication that the "goal" activity indicator was selected, requesting additional information of the goal that was just scored, as described above with respect to block 612 of the embodiment of FIG. 6. For example, any user who selected the "goal" activity indicator may be asked to enter a team name that scored the goal, a player name that scored the goal, a player name who assisted in the goal, etc. In this example, the user of content tagging device 802*a* enters "Sharks" as the team who scored by Johnny Miller with an assist from Fred Smith. The user of content tagging device 802*b* does not enter any further information. To make entry fast and easy for users, drop-down menus or multiple-choice lists may be presented to users, based on event information provided by server 804 during the setup process described in block 904.

At block 916, in one embodiment, an activity indicator selection time is recorded by processor 400 in each content tagging device as a result of a user selecting the "goal' activity indicator as each user observes the event, described above with respect to block 614 of the embodiment of FIG. 6. The activity indicator selection time is indicative of the time that processor 400 received an indication from user interface 404 of a selection of the "goal" activity indicator. This time may be slightly different than the time that the goal was actually scored. For example, if the goal was scored at 1:32:08 pm, the user may not have selected the "goal"

activity indicator until 1:32:11 pm. In this example, content tagging device 802*a* records a goal time of 1:32:11 while content tagging device 802*b* records a goal time of 1:32:13.

In another embodiment, users of content tagging devices may review one or more primary media recordings provided by one or more content capture devices after they have been recorded, and tag activities that occur during review of the recordings. For example, a primary media recording may be provided to a social media website, such as Facebook, where operators of content tagging devices may watch the primary media recording. Such a primary media recording may display event identification information associated with the primary media recording, such as an event code. Then, an operator of a content tagging device may watch the primary media recording and tag activities as they occur during review. As a result of receiving an indication from the user of a content tagging device, processor 400 records a selection time equal to an elapsed time from when the primary media recording began. At some point during the review process, the user may enter the event code associated with the primary media recording into his or her content tagging device. The user may also be able to enter time attributes associated with any of the indications, as explained above. Processor 400 then creates activity identification information related to each tagged activity, comprising at least the event code and the activity indicator selection time. The user may then provide the activity identification information to server 804, where processor 500 associates it with the primary media recording using the event code, where one or more media clips may be created, as explained below.

At block 918, each processor 400 in each content tagging device that received a "goal" activity indicator selection by a respective user creates activity identification information and stores it in association with the selected activity indicator in a respective memory 402. The activity identification information comprises information associated with the goal, as described in blocks 914 and 916, above, such as an activity type ("goal"), event code, a date, time and place that the activity occurred, names of persons associated with the activity (in this example, Johnny Miller is listed as the person who scored the goal and Fred Smith is listed as assisting in the goal), a team name who scored the goal, whether the activity is considered a "highlight" or "favorite" by a user, an indication that the activity is associated with a user's child, an identification of the user who tagged the activity, etc. In one embodiment, the information from multiple activities tagged by a content tagging device is combined into a single activity identification information file. In this example, content tagging device 802*a* creates an activity identification information file comprising the following information: event code 123ABC, activity: goal, scored by: Johnny Miller, assisted by: Fred Smith, at 11:32:11. Content tagging device 802*b* creates an activity identification information file comprising the following information: event code: 123ABC, activity: "goal", scored at 11:32:13. Different activity indicator times can be used individually or collectively to determine parameters used to create clips.

At block 920, at some later time, recording is halted by the user operating the smartphone (e.g., content capture device 800*b*) by touching/pressing a "stop" indicator displayed on user interface 404 or a mechanical switch or button located on 100, creating a primary media recording, for example sixty seconds long, encompassing some amount of time before the goal was scored as well as some time after the goal was scored, for example to capture the reaction of the players after the goal was scored. In this example, recording is halted on the fixed content capture device 800*a* after completion of each quarter, resulting in four primary media recordings, each lasting fifteen minutes or more.

At block 922, each of the primary media recordings described above are stored in a respective memory 402. The primary media recordings are created in conformance with one or more well-known digital audio/video formats, such as MP4, MTS, AVI, MPG, WMV, MOV, FLV, WMA, WAV, AAC, MP3, etc. The primary media recordings may be assigned a file name comprising at least some identifying information, such as the event code discussed above at block 904, the date and time that the video recording was created, a time duration of the recording, and/or other information. Additionally, or alternatively, the primary media recording may be tagged to contain metatags or meta data, as described previously, comprising event identification information such as the event code assigned to the soccer game and/or other attributes, such as date, time, location, team names, recording start time, recording end time, media recording time duration, an identification of the user who recorded the activity, etc.

At block 924, each of the content capture devices and each of the content tagging devices provide their respective primary media recordings and activity identification information to server 804 via network 806. This may occur immediately after any of the media recordings/activity identification information is created, or at any time later, even hours, days, or weeks after the soccer game has ended. In this example, content capture device 800*a* provides four primary media recordings, content capture device 800*b* provides twelve primary media recordings, while content tagging devices 802*a* and 802*b* each provide activity identification information associated with a single activity, e.g., the goal that was scored.

In another embodiment, each of the content tagging devices provides their respective activity identification information to a single, predetermined content tagging device for aggregating activity indicator selection times associated with each content tagging device. For example, if five content tagging devices are used by five respective users during a sporting event, four of the five content tagging devices could provide their activity identification information to the fifth content tagging device, so that the fifth content tagging device may calculate an estimated time that each activity occurred during the sporting event. In one embodiment, each of the four content tagging devices provides their respective activity identification information to server 804 (or to an intermediate server via a local area network such as Wi-Fi, or via a broadcast or multicast message), and server 804 (or intermediate server) transmits each activity identification information to a fifth content tagging device. For example, a touchdown may have been tagged as occurring at five different times by the users, differing by four seconds, for example. The fifth device may be tasked to calculate an average, or median, time (sometimes referred to herein as an "aggregated time") that the touchdown occurred, using the four activity indictor selection times provided in the activity identification information from the four other content tagging devices. After the fifth device has calculated the aggregate time of the touchdown, it may provide the aggregated time to server 804, either directly of via the intermediate server, for use in creating a media clip based on the aggregated time. In this way, server 804 need only create one media clip when five activity indictors are selected within a short period of time from one another, typically signifying the same activity. Alternatively, all five content tagging devices may broad- or multi-cast their tagging information enabling each content capture device or intermediate server or server 804 to independently determine above aggregated time.

In another embodiment, the activity identification information provided to the fifth content tagging device by the other content tagging devices is modified with the aggregated time calculated by the fifth content tagging device. Then the modified activity identification information provided by each of the five content tagging devices is provided to server 804 by the fifth content tagging device. In another embodiment, the fifth device may provide the aggregated time or modified activity identification information from each content tagging device to content capture devices associated with the event, so that each content capture device may create media clips based on the aggregated time. Server 804, or an intermediate server, may provide an identification of each content tagging device and content capture device actively associated with an event to other content tagging devices and content capture devices in this embodiment. Content tagging devices and content capture devices may be actively associated with an event when they provide an indication to server 804 that they are observing the same event, as defined by an event code, location, team names, or some other common event attribute, described above at block 904.

In another, related embodiment, the activity indicator selection times from two or more tagging devices may be aggregated by server 804 and provided to one or more content capture devices and content capture and tagging devices for each content creation device to create one or more media clips based on the aggregated selection time from the two or more content tagging devices. Each content capture device or content capture and tagging device may then provide their respective media clips to other content capture devices, content capture and tagging devices, content tagging devices, and/or server 804. In a related embodiment, server 804 may create a media clip based on the aggregated time, as discussed below.

In yet another embodiment, primary media recordings may be provided from one content capture device to one or more content tagging devices, either directly via a peer-to-peer wireless link or through a local server via a local, Wi-Fi network, where the primary media recording may be annotated, or associated, with tagging information by each content tagging device. Then, each of the content tagging devices may provide the annotated primary media recordings, or non-annotated primary media recordings plus tagging information, to server 804 for creation of media clips based on the annotated, or associated, tagging information.

At block 926, the primary media recordings and activity identification information is received by server 804 and stored in memory 502. In one embodiment, each of the recordings and identification information is stored in association with a user account belonging to each respective user who provided either a primary media recording or activity event information. Alternatively, or in addition, the primary media recordings are stored in association with event identification information associated with each primary media recording, while activity identification information provided by content tagging devices is stored in association with the activity identification information, which may include event identification information. In one embodiment, processor 500 evaluates primary media recordings and activity identification information to determine whether they reference the same event by comparing respective event identification information associated with each. When a match is found, processor 500 stores primary media recordings in association with each matching activity identification information.

At block 928, processor 500 creates one or more media clips based on the received primary media recordings and activity identification information associated with the same soccer game, in one embodiment, by applying time attributes of any activity identification information having the same event code as any primary media recordings. In other embodiments, other information is used to associate primary media recordings with activity identification information, such as date, time, location, camera orientation and angle, team names, player's names, and/or other information provided by capture devices and content tagging devices as they provide primary media recordings and activity identification information to server 804. In one embodiment, an association between primary media recordings and tagging information is made based on motion. For example, two surfers, one having a board-mounted camera plus a motion-triggered tagging device set to trigger when catching a wave, and the other having a handheld camera. If the tagging device and the board-mounted camera of surfer 1 have a correlated trajectory, then the tagging information created by the tagging device and the footage from the board-mounted camera are correlated. Otherwise, a trigger from the second tagging device of surfer 1 (e.g. wrist shake) implies a second, hand-held camera filming surfer 2.

To create media clips, in one embodiment, processor 500 may compare the activity indicator selection time, or aggregated time, of any received activity identification information to determine whether two users of two different content tagging devices have tagged the same activity in the soccer game. In this example, the user of content tagging device 802*a* selected the "goal" activity indicator at 1:32:11 pm, while the user of content tagging device 802*b* selected the "goal" activity indicator at 1:32:13 pm. In one embodiment, if the time difference between these two times is less than a predetermined amount, such as 5 seconds, processor 500 may consider the two times to indicate the same activity, in this case the soccer goal that was scored at 1:32:08 pm. The predetermined amount of time is chosen small enough to allow for differences in user reaction time between the occurrence of an activity and when a user selects a corresponding activity indicator, while large enough to differentiate between different activities that may have occurred near each other in time. In one embodiment, processor 500 determines an estimated time that the activity occurred by taking the average, or median, of the two activity indicator selection times to produce an aggregated time for use in creating a single media clip based on the input from two content tagging devices, content tagging device 802*a* and 802*b*, as described below. In this example, the average activity indicator selection time is 1:32:12 pm.

In one embodiment, after an aggregated time has been determined for a particular activity, server 804 may later receive activity identification information related to the same activity from a third tagging device, determined by comparing the activity indicator selection time from the third tagging device to the aggregated time. If the activity indicator selection time from the third tagging device is within a predetermined time period from the aggregated time, such as two seconds, server 804 does not create another media clip, but may either do nothing, or simply copy the existing media clip and associated activity information to an account associated with a user of the third tagging device. This greatly reduces the processing required by processor 500.

In another related embodiment, an aggregated time may be calculated from activity identification information received from two or more tagging devices having activity indicator selection times within a predetermined time from each other, but having different activity types associated with one or more of the received activity identification information. For example, an activity indicator selection time from a first tagging device may indicate selection of a "goal" activity indicator at 5:04:44, indicating that a "goal" was scored, while an activity indicator selection time from a second tagging device may indicate selection of a "great play" activity indicator at 5:04:42. In this case, since the two selection times are within a predetermined time from each other (in this example, two seconds), server 804 calculates an aggregated time of 5:44:43 and creates only one media clip from a primary media recording received by a content capture device also at the same soccer game (also determined by server 804 using techniques discussed previously). The resultant media clip is stored in association with both the "goal" activity type and the "great play" activity type so that the media clip can be found by using search terms of either "homerun" or "great play". In one embodiment, the media clip is stored in an account associated with a user of the first tagging device in association with only the "homerun" activity type, while another copy of the media clip is stored in an account associated with a user of the second tagging device.

In a related embodiment, server 804 may receive activity identification information from a third tagging device comprising an activity indicator selection time within the a predetermined time from the aggregated time mentioned above, but having an activity type of either "goal", "great play", or "assist", for example. In this case, server 804 again does not create a new media clip (because the activity indicator selection time is within a predetermined time from the aggregated time, such as two seconds), but rather associates the media clip additionally to the "assist" activity type, indicating that the media clip can be referenced by using a search term of either "goal" or "great play", or "assist". The same media clip could be stored in accounts associated with each user of each respective tagging device, each one stored in association with the "goal", "great play", or "assist" activity type, respectively.

In any case, whether an aggregate time is calculated or not, processor 500 then identifies any primary media recordings of the same event having content recorded at or near the activity indicator selection time (or aggregated time), based on the timing information associated with each of the primary media recordings such as a video recording start/stop time and/or time duration. In this example, processor 500 identifies one of the primary media recordings from content capture device 800a, showing the goal from the fixed video camera (content capture device 800a), and the other from one of the primary media recordings provided by the smartphone (content capture device 800b), showing the goal scored from the perspective of the user of content capture device 800b.

In another embodiment, processor 500 processes each primary media recording to determine if any activity identification information has been tagged at a time encompassed by each primary media recording.

In either case, processor 500, in this example, creates two media clips, one from the identified, primary media recording provided by content capture device 800a, and the other from the identified primary media recording provided by content capture device 800b, by copying a portion of each primary media recording in accordance with the time attributes contained in the activity identification information and/or time attributes stored in memory 502, for example, a time duration and/or pre-activity time and/or post-activity time relative to when a respective activity indicator was selected by a user, in accordance with selection times provided in the activity identification information. For example, memory 502 may store a predefined "goal" time duration of 20 seconds, and a pre-activity goal start time of −12 seconds, indicating a media clip start time 12 seconds prior to when a "goal" activity indicator is selected by a user of a content tagging device. When creating the first media clip, processor 500 may first determine whether the activity identification information provided by content tagging device 802a indicates customized media clip time attributes, e.g., whether the user of content tagging device 802a has specified time attributes for the goal that was scored. If not, processor 500 may use the time attributes stored in memory 502 to create the first media clip, comprising 20 seconds of video content of the soccer game from the identified primary media recording provided by content capture device 800a, 12 seconds before the "goal" indicator was selected and lasting 20 seconds (or 12 seconds before an estimated average/median activity indicator selection time). For example, in this case, processor 500 uses the aggregated time of 1:32:12 pm, along with the "goal" time duration of 20 seconds, to create a first media clip from the primary media recording provided by content capture device 800a, showing Johnny Miller scoring the goal, beginning, 12 seconds prior to the aggregated time and lasting 20 seconds afterwards, from a view of the entire soccer field where content capture device 800a is located. Processor 500 then creates a second media clip from the primary media recording provided by content capture device 800b, showing Johnny Miller scoring the goal, beginning 12 seconds prior to the aggregated time and lasting 20 seconds afterwards, from a view of the user operating content capture device 802b near one of the goals.

In another embodiment, processor 500 creates one media clip for each activity identified in an event by any content tagging device. Thus, in the example above, processor 500 would create a first media clip from the primary media recording provided by content capture device 800a in accordance with the activity indicator selection time in the activity identification information from content tagging device 802a, a second media clip from the primary media recording provided by content capture device 800a in accordance with the activity indicator selection time in the activity identification information from content tagging device 802b, a third media clip from the primary media recording provided by content capture device 800b in accordance with the activity indicator selection time in the activity identification information from content tagging device 802a, and a fourth media clip from the primary media recording provided by content capture device 800b in accordance with the activity indicator selection time in the activity identification information from content tagging device 802b.

Processor 500 assigns a file name to each media clip created, and stores the media clips in memory 502, in one embodiment, in accounts associated with any of the users that provided either primary media recordings and/or activity identification information. Processor 500 determines which user accounts to store media clips from user identification information provided with the primary media recordings and/or activity identification information. The file name could be representative of the goal that occurred and information relating to it, such as the date and time that the goal was scored (or the (average/median) activity indicator selection time), the place where the goal was scored, one or more team names, the name of the person who scored and/or assisted with the goal, and/or other information contained in one or more activity identification information files that were used to create the media clips. In another embodiment, this information may be appended to the media clip itself, using well-known editing techniques, such as the audio and video editing software application known as "FFmpeg", described above at block 720 of FIG. 7. In yet another embodiment, media clips are given a generic name and indexed in storage device 502 based on at least some of the activity identification information associated with the activity identification information used to create each respective media clip. For example, media clips may be stored at a URL that is identified with the event and specific activity identification information either by the URL itself, or by means of cross-reference from another storage medium for the activity identification information, e.g. a database.

In one embodiment, media clips are stored in an account associated with users who either provided the primary media recording from which a media clip was created, and/or activity identification information from which the media clip was created. In this way, access to each user's files may be limited to only the user and others who have permission from the user to access the media clips. In another embodiment, media clips are stored in association with at least some of the related activity identification information, which may include event identification information.

Thus, two media clips are created in this example showing the same activity (the goal scored by Johnny Miller) from two different vantage points (one from the fixed camera and one near one of the goals).

Processor continues to create media clips based on any other primary media recordings and/or event/activity identification information that is received by server 804 and associated with the soccer game. For example, at some later point in time, another content tagging device may provide activity identification information to server 804, identifying a corner kick in the same soccer game. Upon receiving this activity identification information, processor 500 evaluates any primary media recordings that contain footage of the soccer game encompassing the activity indicator selection time of the new activity identification information, and creates additional media clips accordingly. In another example, at some later point in time, another content capture device may provide a primary media recording of the same soccer game at a different viewing vantage point than either content capture device 800a or 800b. Processor evaluates the new primary media recording and determines that it is associated with the soccer game (e.g., by evaluating an event code or other information associated with the primary media recording, or a manual association process performed by the operator/owner of the other content capture device), and then identifies any activity identification information associated with the soccer game. If any of activity identification information comprises an activity indicator selection time encompassed by the new primary media recording, processor 500 creates a new media clip in accordance with the activity identification information and/or timing information stored in memory 502. In one embodiment, as additional activity identification information is received, a new aggregated time may be calculated, and new media clips are created based on the new aggregated time. If the newly averaged or otherwise calculated indicator selection time is within a configurable interval of the existing clips' selection time however, server 804 may decide to associate the existing clip with the new activity indicator instead of creating a new media clip.

After the media clips have been created and stored, they may be viewed on a website provided by server 804 (or another server) by content consumption device 808, comprising a PC, smartphone, computer, tablet, wearable device, or other device, similar to content consumption and tagging device 100. For example, any of the users of content capture devices 800a and 800b or content tagging devices 802a and 802b, as well as any member of the general public, may wish to view media clips of the soccer game created by server 804.

To request media clips of the soccer game, at block 930, individuals may access a web site provided by server 804, or another server, that allows individuals to view media clips of certain events, such as sporting events, weddings, parties, graduations, etc. In another embodiment, individuals may each launch a media clip viewing application resident on content consumption device 808 such as the content capture application residing on content capture device 800a or 800b having additional capabilities of searching and displaying media clips, or the tagging application residing on content tagging device 802a or 802b having additional capabilities of searching and displaying media clips.

Individuals searching for media clips may be restricted to those associated with an individual, or friends or family of the individual, after receiving the necessary permission(s) to do so, as is known in the art. In other embodiments, individuals are permitted access to all, or a sub-set of all, media clips stored by server 804.

At block 930, the operator of content consumption device 808 may be presented with a search page, where the operator may enter search criteria for media clips of interest, as described above at block 626 of FIG. 6. Such search criteria may comprise an event code assigned to the soccer game by server 804 and/or one of the users who previously provided primary media recordings or activity identification information to server 804. The event code may have been received by email, text, or via the media clip viewing application, as explained previously. In another embodiment, the user may enter event-relevant terms in a free-text search field, such as a tournament name, an age group, a team name, a team member's name, or similar criteria.

At block 932, similar to block 736 in FIG. 7, server 804 may present one or more display options for the operator to view media clips associated with the soccer game. The display options may include presentation of media clips to the operator in one or more formats, described above at block 630 of FIG. 6, such as one or more "Game-Based" formats", one or more "Team-Based" formats, one or more "Timeline" formats, one or more "Contiguous" formats, one or more "Player-Based" formats, or other formats available for selection by the operator.

At block 934, processor 500 receives a display preference from the operator from selection of one of the display options provided to the user at block 932, the display preference indicating a preferred presentation of media clips to the user.

At block 934, processor 500 presents media clips matching the operator's search criteria in a manner as indicated by the operator's selected display options, by displaying still images, icons, thumbnail videos, hyperlinks, or some other way to indicate the availability of a media clips. Other information regarding the associated media clips may be displayed as well, such as the time the activity took place, a type of goal that was scored, an individual's name associated an activity, an identification of the user who provided the primary media recording associated with each clip, etc., as obtained from information associated with or found in each of the media clips. When more than one view of a particular activity is available, such as the two media clips created showing the goal scored by Johnny Miller, processor 500 may present an indication that multiple views are available to the individual. For example, processor 500 could present two still images, icons, thumbnail videos, or hyperlinks, one for each of the two views of the goal. Alternatively, processor 500 could present a selectable icon or similar user interface element indicating to the user that multiple views are available. Selecting such icon or similar element would present the user with another dynamic user interface element allowing to choose a specific view, e.g. a list of camera names.

At block 936, the operator may select one or more of the still images, icons, thumbnail videos, hyperlinks for viewing or listening. In response, a media clip associated with the selection is streamed, downloaded, or otherwise provided to content consumption device 808 from server 804.

Figure 10:
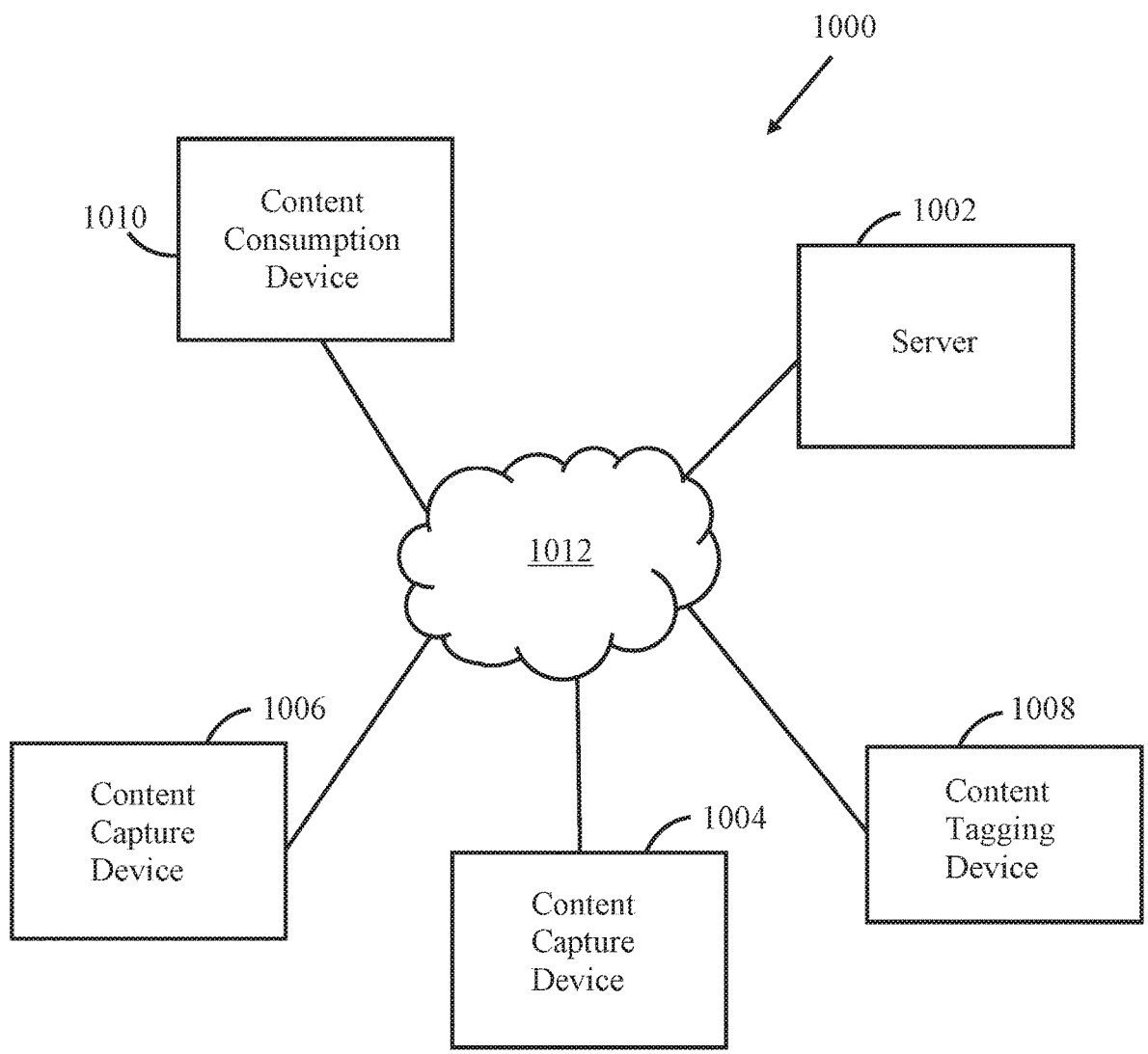
FIG. 10 illustrates another embodiment of a system for creating and distributing media clips, where the media clips are created by one or more content capture devices upon receipt of commands sent by the server of FIGS. 1, 5 and/or 8.

FIG. 10 illustrates another embodiment of a system 1000 for creating and distributing media clips, where the media clips are created by one or more content capture devices upon receipt of commands sent by server 1002. In this embodiment, one or more content tagging devices (and/or content capture and tagging devices, as described above) send "tag notifications" to server 1002 and, in response, server 1002 sends media clip creation commands to one or more content capture devices to create media clips based on information in the media clip creation command. The tag notifications act as a request, by a tagging device to server 1002, for a media clip to be created at the time the tag notification was generated. In this way, tag notifications are similar to "tagging information" and/or "activity identification information" described previously. After clips have been generated by the one or more content capture devices, they are uploaded to the server for distribution to one or more content consumption devices. Once uploaded, the media clips may be further processed or reformatted for further consumption or specific distribution requirements.

FIG. 10 illustrates server 1002, content capture devices 1004 and 1006, content tagging device 1008, content consumption device 1010, and one or more wide-area networks 1012. It should be understood that although FIG. 10 illustrates only two content capture devices and one content tagging device, in practice, a greater of fewer number of content capture devices may be used and/or a greater number of content tagging devices. The description of system 1000 shall be explained in terms of a single event, with content capture devices 1004 and 1006 recording all or portions of the event, and content tagging devices providing tag notifications to server 1002. It should be further understood that server 1002 typically manages clip creation for many other events simultaneously.

As the event occurs, content capture devices 1004 and 1006 record the entire event, or portions thereof. The content capture devices are functionally similar to content capture devices 100, 800a and 800b, described previously. They may also comprise content tagging capabilities. Content capture devices 1004 and 1006 may comprise fixed digital cameras strategically placed around an event location to capture the event as it occurs at several different vantage points. Alternative, or in addition, content capture devices 1104 and 1106 comprise smart phones operated by persons attending the event, such as spectators, parents, coaches, etc. Each content capture device is capable of recording all or portions of the event as one or more video and/or audio files. In one embodiment, content capture devices 1004 and 1006 record a rolling time window of footage of the event, such as a five minute rolling window. In this way, at any point during the event, the last five minutes of the event are available for media clip creation, as will be explained below.

Content tagging device 1108 is similar to content tagging devices 802a and 802b, and creates tag notifications, the same or similar to activity identification information, described previously. Content consumption device 1010 is functionally equivalent to content consumption device 808, also described previously. The content capture devices, content tagging device, content consumption device, all communicate with server 1002 via one or more wide-area networks 1012, also described above.

Figure 11A:
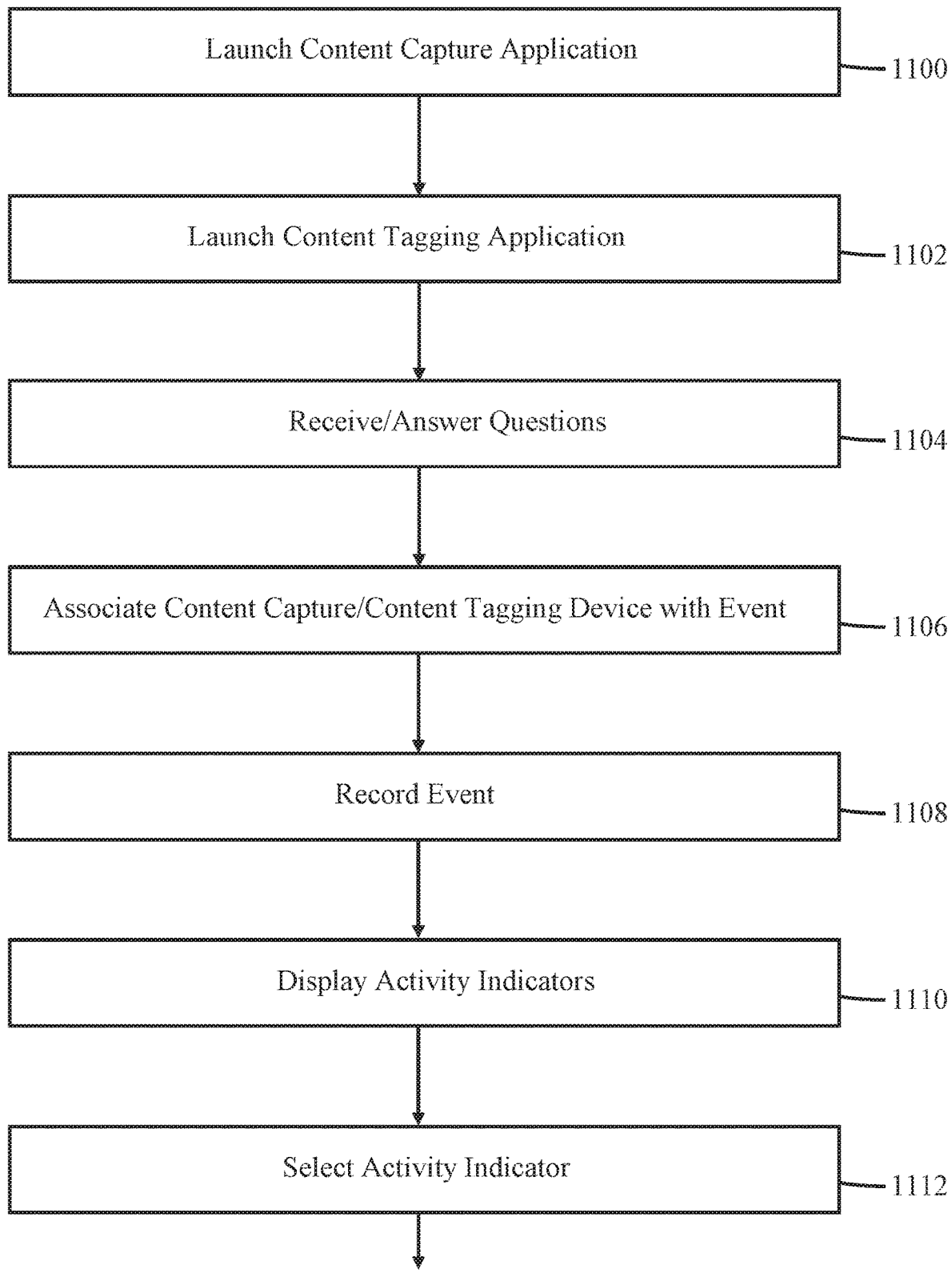
FIGS. 11A, 11B and 11C are flow diagrams illustrating one embodiment of a method, performed by the server shown in FIGS. 1, 5, 8, and/or 10 for managing media clip creation and distribution, using tag notifications from a content tagging device as an event occurs.
Figure 11B:
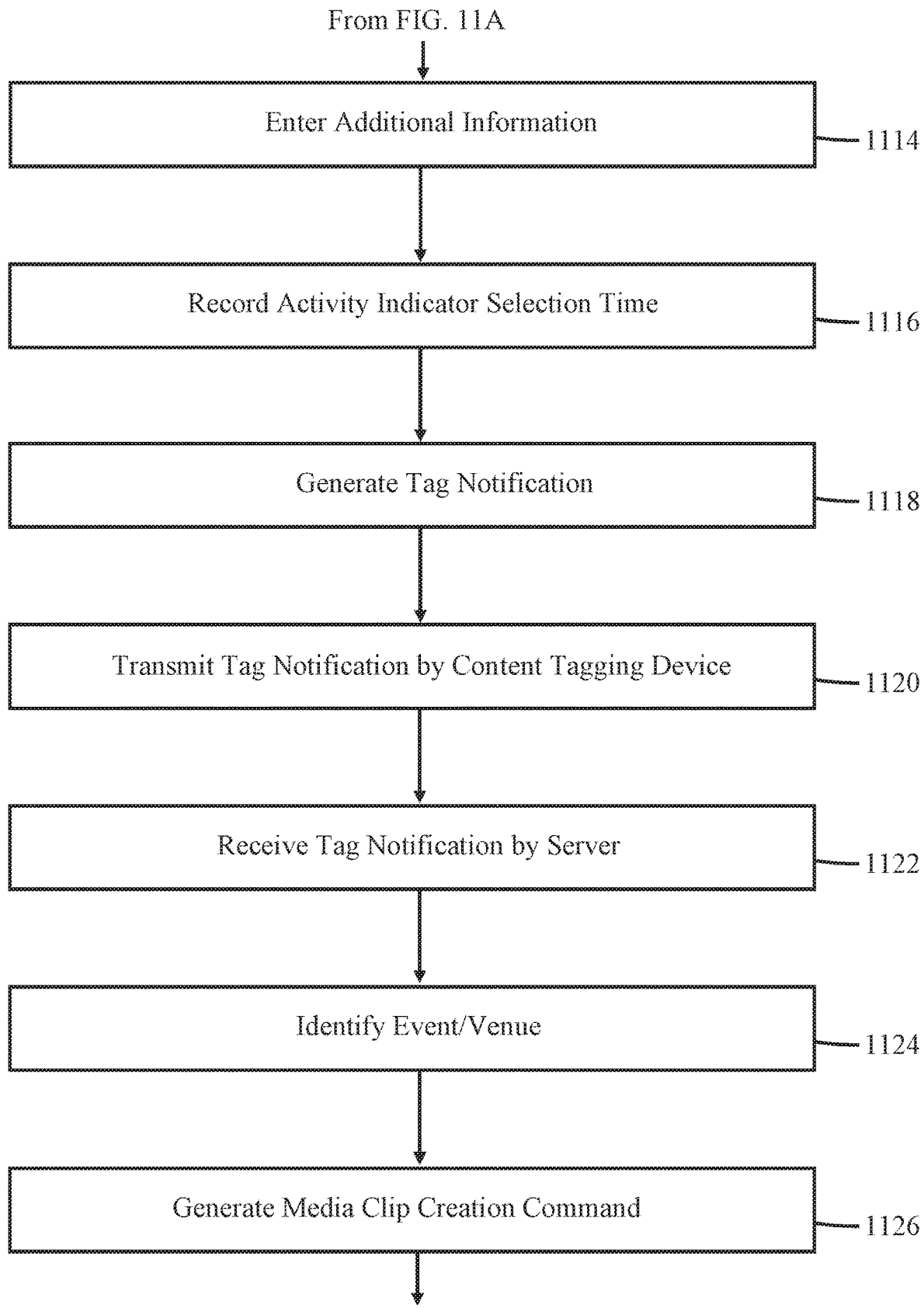
Figure 11C:
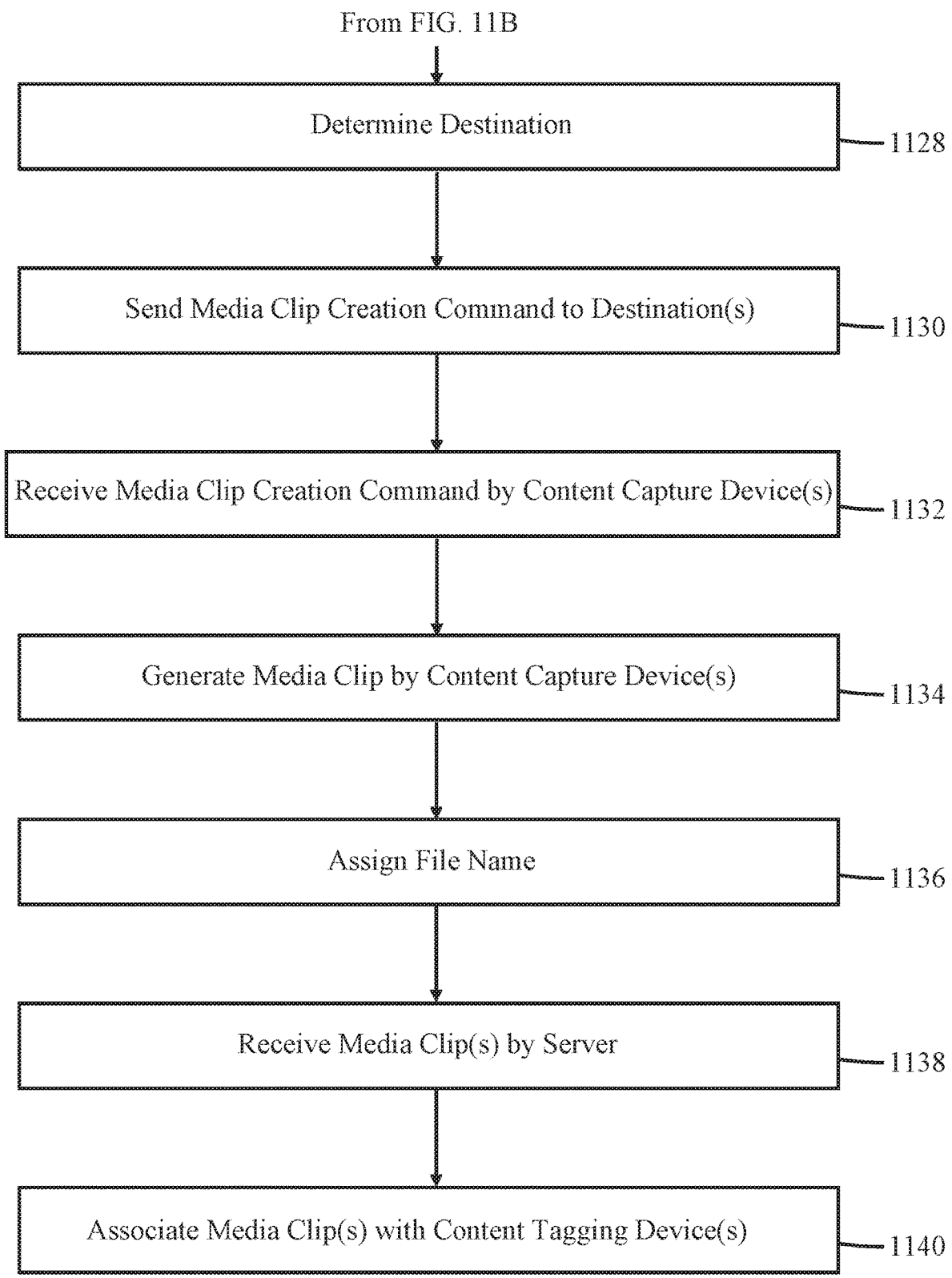

FIG. 11 is a flow diagram illustrating one embodiment of a method, performed by server 1002, for managing media clip creation and distribution, using tag notifications from content tagging device 1008 as an event occurs. In this example, the elements of system 1000 are used to describe the method, i.e., two content capture devices 1004 and 1006, one content tagging device 1008, one content consumption device 1010 and server 1002. It should be understood that the elements correspond to embodiments previously described, and that the previously-described functionality is equally applicable in the present embodiment. It should also be understood that in some embodiments, not all of the steps shown in FIG. 11 are performed and that the order in which the steps are performed may be different in other embodiments. It should be further understood that some minor method steps have been omitted, as they have been previously explained with respect to other embodiments described above.

At block 1100, a user of content capture device 1004 launches a content capture application resident on content capture device 1004, and a second user launches the same or similar content capture application on content capture device 1006, each application for allowing the respective content capture devices to record all or portions of the event, to create media clips when commanded to do so by server 1002, and to provide the media clips to server 1002 for distribution to content consumption device 1010. In one embodiment, launching the application causes the content capture devices to initiate communications with server 1002 in order, for example, to register each content capture device with server 1002 for purposes of associating a capture device with a particular event or venue. Such association is described below in block 1104.

At block 1102, a user of content tagging device 1008 launches a content tagging application resident on content tagging device 1008, the content tagging application for generating tag notifications related to interesting activities that occur during the event. In general, each tag notification comprises information that identifies a time during the event that an interesting activity occurred so that a media clip may be created from recordings created by content capture devices 1004 and 1006. In one embodiment, the tag notification comprises event identification information, an identification of content tagging device 1008 and an activity indicator selection time. In another embodiment, the event identification information is not used, as server 1002 determines the event based on information provided by content tagging device 1008 during the registration process. In other embodiments, an activity indicator is also included, identifying a type of activity that occurred. In yet another embodiment, a start time and an end time may be included, identifying desired clip start and end times, either on an actual or a relative basis, based on a time that a user requested creation of a media clip.

At block 1104, in one embodiment, content capture devices 1104 and 1106, and content tagging device 1008, may receive one or more questions from server 1002, or generated from information stored within a memory of each device, regarding the event, similar to the questions described above with respect to block 702 of FIG. 7, referencing block 602 of FIG. 6. The questions relate to the type of event, a date, time, and/or place of the event, team names, player names, kid's names, etc. for use by server 1002 in associating tag notifications with content capture devices recording the same event. In one embodiment, a user and/or server 1102 may create a unique event code for purposes of associating tag notifications and recordings. The event code may be included in each tag notification transmitted by content tagging device 1108. More details regarding event codes have been previously described and are applicable here as well.

At block 1106, server 1002 associates at least one content capture device with a particular event and at least one content tagging device with the same event, based on the interactions described in blocks 1102 and 1104.

At block 1108, each of the content capture devices begins to record the event, in this embodiment, using a five minute rolling time window. In other embodiments, at least one content capture device begins recording at a time suitable to the user operating the device. As the recordings progress, digital files are generated and stored in a respective memory of each content capture device. In the embodiment where multiple recordings are created during an event, a start time and end time (or a start time and duration) of each recording may be transmitted to server 1002.

At block 1110, in one embodiment, content tagging device 1008 displays one or more activity indicators associated with the event. In one embodiment, only a single, generic activity indicator is displayed, for providing an indication of general interest of any activity that may occur during the event.

At block 1112, an interesting activity occurs during the event. In response to the activity, an activity indicator may be selected by the user of content tagging device 1008, as described previously with respect to block 610 of the embodiment of FIG. 6. Selection of the activity indicator generally occurs shortly after the activity, for example, between zero and five seconds.

At block 1114, additional information pertaining to the activity may be entered by the user of content tagging device 1008, as described above with respect to block 612 of the embodiment of FIG. 6.

At block 1116, in one embodiment, an activity indicator selection time is recorded by content tagging device 1008 as a result of a user selecting the activity indicator, as described above with respect to block 614 of the embodiment of FIG. 6.

At block 1118, content tagging device 1108 generates a tag notification for transmission to server 1002, as described above.

At block 1120, the tag notification is transmitted to server 1002.

At block 1122, the tag notification is received by server 1002.

At block 1124, server 1002 identifies an event or venue associated with the tag notification by processing information in the tag notification. For example, the tag notification may comprise an event code, an event description, an event location or venue, or some other information identifying the event, or a location of the event, associated with the tag notification.

At block 1126, server 1002 generates a media clip creation command, comprising at least the activity indicator selection time. In other embodiments, other information is provided in the command, for example, a clip duration (indicating a desired duration of the media clip), a start time of the desired clip, an end time of the desired clip, a file name generated by server 1002 to uniquely identify the media clip, an identification of content tagging device 1008, and/or an activity type. In one embodiment, an "activity configuration table" contains predetermined clip times associated with various activities. When server 1002 determines the type of activity associated with a tag notification, the activity configuration table is used to determine a duration of a clip to be created, and may include clip pre-activity and post-activity times associated with each activity.

In another embodiment, server 1002 may generate only a single media clip creation command based on receipt of multiple tag notifications received from multiple content tagging devices. For example, multiple content tagging devices may each transmit a tag notification at an event when a universally-exited activity occurs, such as the scoring of a game-winning touchdown in a football game. Rather than generate a media clip creation command for each tag notification received from the multiple content tagging devices, server 1002 aggregates these requests and generates only a single media clip creation command to one or more active content capture devices recording the event. The command may comprise an identification of each content tagging device that sent a tag notification of the same activity, so that resultant media clips can be later associated with accounts belonging to users/owners of each content tagging device that sent a tag notification. In another embodiment, server 1002 generates and includes a file name or some other indicator in the media clip creation command to identify one or more resultant media clips created by one or more content capture devices. Additionally, server 1002 stores an indication of each content tagging device associated with the media clip creation command that was sent on behalf one or more content tagging devices that submitted a tag notification of the same activity. Then, when server 1002 receives the media clip(s), server 1002 associates one or more resulting media clips with each content tagging device, or associated owner, user, or account, that provided a tag notification of the same activity at the same event.

Specifically, when server 1002 receives two or more tag notifications from different content tagging devices from the same event within a predetermined time period, for example fifteen seconds, server 1002 may determine that the two or more media clip requests pertain to the same, observed activity by two or more persons at the event. In response, server 1002 generates a single media clip creation command and transmits the command to any active content capture devices recording the event or portions thereof.

At block 1128, server 1002 determines where to send the media clip creation command. In one embodiment, server 1002 determines that content capture devices 1004 and 1006 are currently registered as recording the same event or venue as identified in the tag notification. This information may be stored in a memory of server 1002 as an "active device table". The active device table associates events or venues with content capture devices that record each event, or located at a venue. In another embodiment, where recording start and stop times are provided to server 1002 by content capture devices that periodically record portions of the event, server 1102 compares the activity indicator selection time with the start and end times previously reported by the one or more content capture devices that are sporadically recording the event. Server 1002 identifies when the activity indicator selection time falls between such start and end times, indicating that a content capture device has recorded the event encompassing the activity indicator selection time.

At block 1130, server 1002 provides the media clip creation command to the content capture devices identified in block 1126. This typically occurs within seconds of receipt of the tag notification by server 1002.

At block 1132, the media clip creation command is received by the content capture devices identified in block 1126.

At block 1134, each content capture device that received the media clip creation command generates a media clip in accordance with the information in the media clip creation command. In an embodiment where a content capture device records a rolling time window, the content capture device creates a media clip from the recording at times specified in the media clip creation command. In another embodiment, the content capture device comprises a table similar to the activity configuration table and creates a media clip using timing information stored locally within a memory of the content capture device. In an embodiment where multiple recordings have been stored in the memory, the content capture device determines which recording to use to create the media clip based on the activity indicator selection time in the media clip creation command.

At block 1136, after the media clip has been generated, the content capture device may assign a file name to the media clip, typically based on a file name provided in the media clip creation command. The file name may include a modifier to identify the particular content capture device that created the media clip. The media clip is then uploaded to server 1002, or to another server for storage and later retrieval by server 1002. In addition, an indication that the media clip has been successfully completed is also sent to server 1002.

At block 1138, server 1002 receives the media clips created by the content capture devices, or the indication that the media clip has been successfully completed.

At block 1140, in one embodiment, the media clip is associated with a content tagging device that sent the corresponding tag notification, in this example content tagging device 1008. The media clip may then be presented to a user/owner/account holder of content tagging device 1008, as well as friends and family, as previously described.

Figure 12A:
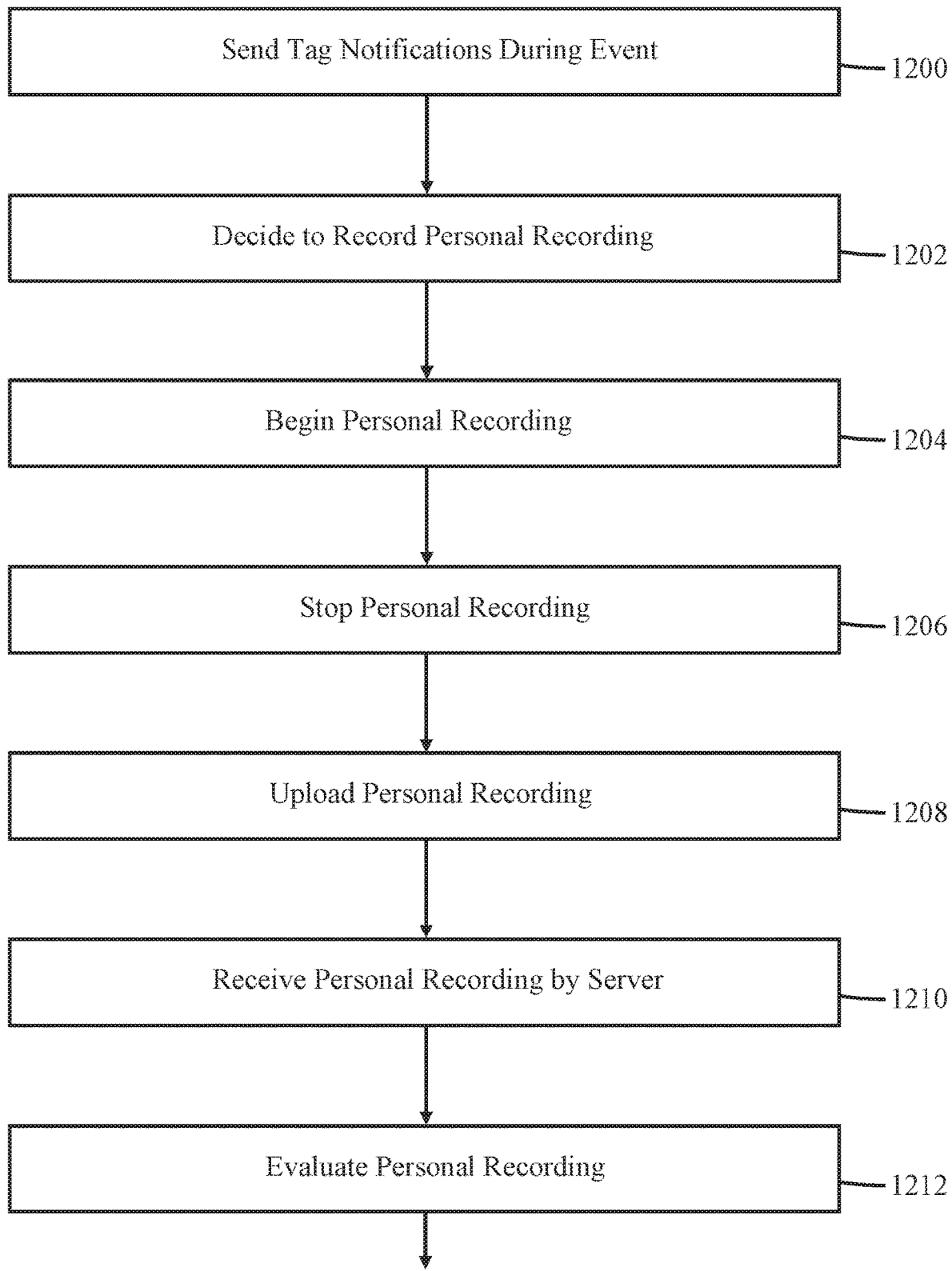
FIGS. 12A and 12B are flow diagrams illustrating one embodiment of a method, performed by the server shown in FIGS. 1, 5, 8, and/or 10, for associating media clips generated by any of the methods shown in FIG. 6, 7, or 9 with "personal recordings" created by any of the content tagging devices or content capture and tagging devices shown in FIGS. 1, 5 8, and/or 10.
Figure 12B:
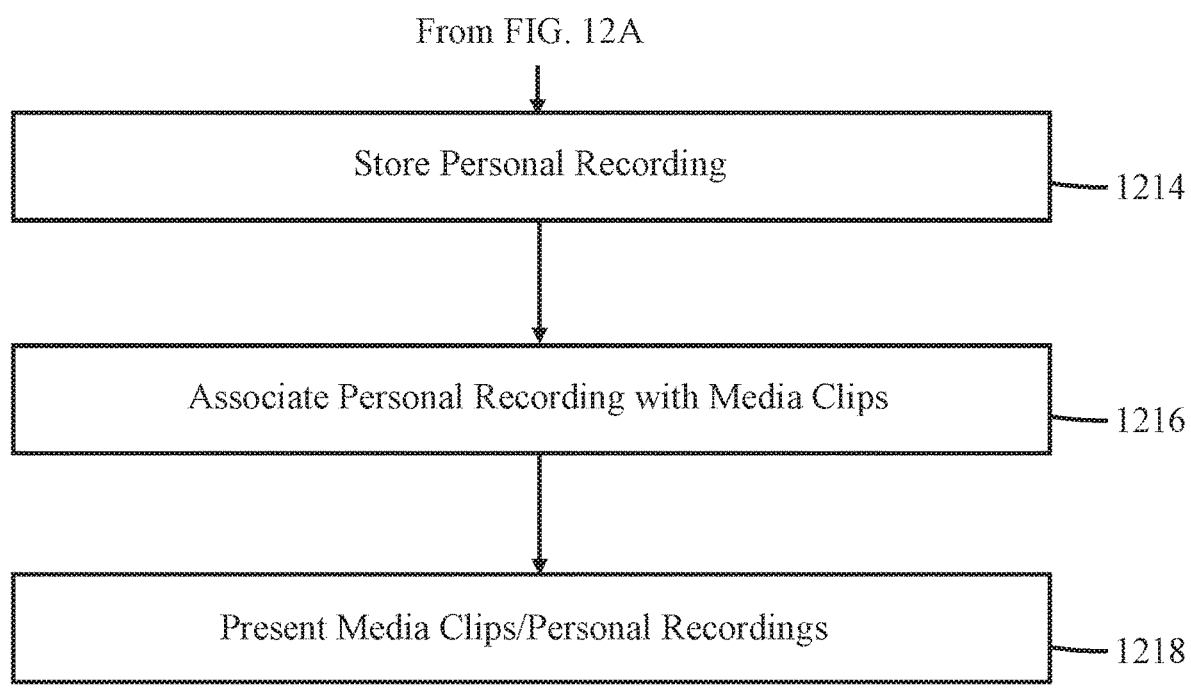

FIG. 12 is a flow diagram illustrating one embodiment of a method, performed by server 1002, for associating media clips generated by any of the methods described previously with "personal recordings" created by any of the content tagging devices or content capture and tagging devices described previously. Personal recordings refer to recordings created by a user of a content tagging device (or content tagging and recording device) to show, for example, reactions of friends and family to activities when they occur, individual/team celebrations, or any other aspect of an event that a user might find interesting, funny or otherwise enjoyable, that may or may not be tied to an activity. Such personal recordings are generally only available to the user who created such recordings, as opposed to media clips created by content capture devices, which are generally available to anyone. By combining or associating personal recordings with media clips, the media clips become more enjoyable to watch.

The method will be described using some of the elements of system 1000, specifically content capture device 1004, content tagging device 1008 with content capture capabilities, content consumption device 1010 and server 1002. It should be understood that the elements correspond to embodiments previously described, and that the previously-described functionality is equally applicable in the present embodiment. It should also be understood that in some embodiments, not all of the steps shown in FIG. 12 are performed and that the order in which the steps are performed may be different in other embodiments. It should be further understood that some minor method steps have been omitted, as they have been previously explained with respect to other embodiments described above.

At block 1200, a user of content tagging device 1008 has been attending an event, and has logged onto the user's account that is maintained by server 1002, as described previously. During the event, the user has been creating media clips of activities that have been occurring during the event by transmitting tag notifications to server 1002, which cause media clips to be generated by one or more content capture devices 1004/1006.

At block 1202, sometime during the event, a user of content tagging device 1008 decides to use content tagging device 1008 to record a personal recording of the user and friends and family nearby watching the event with the user. The personal recording captures the reactions of the user, friends and family just before an anticipated activity occurs (such as when a football team lines up on the one yard line with 2 seconds left in the game, to win the game if a touchdown is scored) or just after an activity has occurred (e.g., after a soccer goal is scored). Personal recordings may not be tied to any particular activity during an event, for example, an individual or team celebrating a win, a cheerleading squad, teams congratulating each other after a game, a coach telling his team what an outstanding job they did on the field, interviews with players, coaches, friends and family of their reaction to the event, and anything else that a user might find interesting, funny, or useful that is associated with the event. In general, personal recordings can be of anything a user decides to associate with an event.

Thus, at block 1204, the user of content tagging device 1008 begins a personal recording by pressing a button, switch, icon or some other input on a user interface of content tagging device. Content tagging device 1008, in response, begins a video and/or audio recording and typically records a start time of when the recording began.

At block 1206, the user of content tagging device 1008 stops the personal recording, again by pressing a button, switch, actuating element, etc. on the user interface. The personal recording is generally stored in a memory of content tagging device 1008. The stop time may also be recorded.

At block 1208, content tagging device 1008 automatically uploads the personal recording to server 1002. In another embodiment, the personal recording is uploaded only after the user instructs content capture device 1008 to do so. In yet another embodiment, after the personal recording has been created, the user may enter information pertaining to the personal recording, such as the names of people in the recording, team names, comments, or just about anything the user chooses. The uploaded personal recording typically comprises an identification of content tagging device 1008 or an associated name, account number, or some other identification information of content capture device 1008 or its owner/user, an event identification (i.e., an event name, location, venue), and an actual or relative time that the personal recording was created (generally the start time). Additional information may include any user comments or information entered after the personal recording was created.

At block 1210, server 1002 receives the personal recording.

At block 1212, server 1002 evaluates the personal recording to determine which event, user, content tagging device, and/or location the personal recording is associated with, so that server 1002 can store the personal recording along with media clips created by the user of content tagging device 1008.

At block 1214, server 1002 stores the personal recording in association with media clips created by one or more content capture devices 1004/1006 in response to tag notifications sent by content tagging device 1008. The clips/recordings are stored in association with an account generally held by the owner/user of content tagging device 1008.

At block 1216, server 1002 associates at least some of the media clips and personal recordings with each other. For example, server 1002 may associate one or more media clips with one or more personal recordings based on one or more times associated with each clip/recording. For example, server 1002 may associate a personal recording with a media clip when the start or stop time of a personal recording is within 30 seconds of the start or stop time of a media clip. Personal recordings may not be associated with any particular media clip, such as personal clips of post-event interviews or celebrations. In this case, these recordings may be grouped by server 1002 as "Pre-Event Recordings", "Half Time", Post-Event Recordings", "Miscellaneous Recordings", etc.

At block 1218, server 1002 presents the icons/thumbnails representing the media clips and recordings in a predetermined, default view, or in a view desired by a user of content consumption device 1010 (or content tagging device 1008, when content tagging device 1008 comprises viewing functionality). The icons/thumbnails are typically provided on a website associated with an account of the owner/user of content tagging device 1008. For example, in a default view, server 1002 presents icons/thumbnails of the media clips and recordings in chronological order in which they were created, or some other time, such as an activity indicator selection time, a media clip request time, the personal recording start time, or some other time associated with clips/recordings. Server 1002 uses the time value associated with each media clip/personal recording to determine the chronological order. A user of content consumption device may then view each media clip and personal recording simply by selecting each icon or thumbnail.

In another view, server 1002 may display icons/thumbnails of the media clips only, with associated personal recordings added so that a continuous media stream is presented to a user of content consumption device 1010 containing both the media clip and associated personal recording.

In another embodiment, server 1002 may display icons/thumbnails of the media clips as a continuous media stream, and display a UI indicator when the media clip currently played has an associated personal event. The UI would further include a mechanism to trigger playback of said personal clip, e.g. via a user action of tapping said indicator.

Server 1002 may, alternatively or additionally, create a highlight reel, presenting the media clips and personal recordings as a continuous media stream, in chronological order, based on times associated with each clip/recording.

In another embodiment, server 1002 may present icons/thumbnails of the media clips and personal recordings along with a "check box" associated with each icon/thumbnail. An account holder may view the icons/thumbnails and select one or more of the media clips and/or personal recordings for use, for example, in creating a customized highlight reel including only the media clips and recordings chosen by the account holder. In another example, the check boxes are used to determine which clips/recordings to provide to other people, such as friends or family, or for public display on a social media site, for example. In this embodiment, server 1002 uses only the clips/recordings selected by the account holder via the check boxes to create the customized highlight reel or to otherwise distribute or make available only certain clips/recordings to others.

Figure 13:
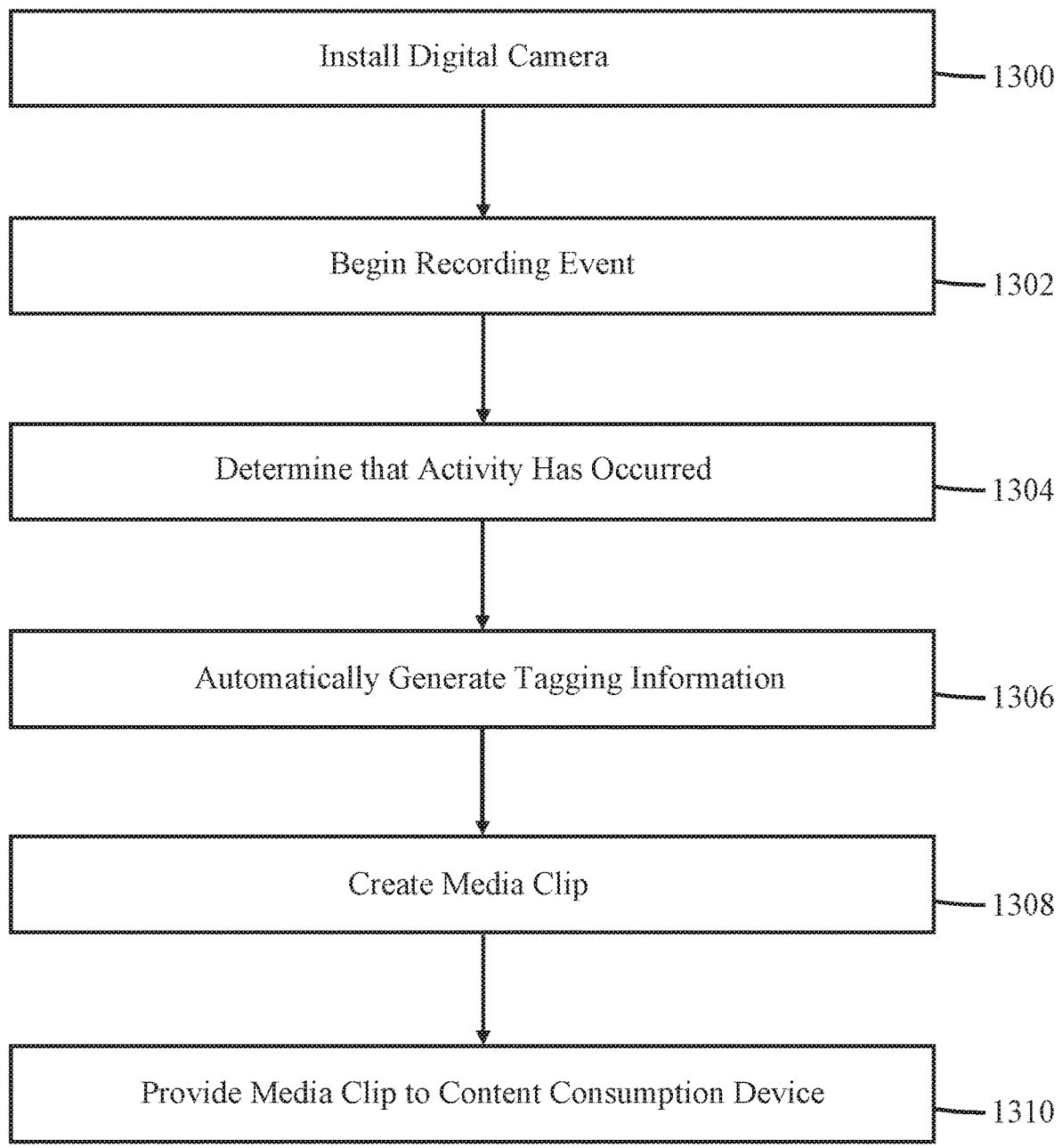
FIG. 13 is a flow diagram illustrating one embodiment of a method, performed by one of the servers shown in FIGS. 1, 5, 8, and/or 10, or one of the content tagging devices or content capture and tagging devices shown in 1, 5, 8, and/or 10, for automatically generating tagging information for use in generating media clips.

FIG. 13 is a flow diagram illustrating one embodiment of a method, performed by one of the servers described previously, or one of the content tagging devices or content capture and tagging devices also previously described, for automatically generating tagging information for use in generating media clips. In this embodiment, attributes of a ball and/or players/participants of an event are evaluated and tagging information automatically generated so that media clips can be generated using any of the techniques previously described. It should be understood that the devices described in this embodiment correspond to the devices previously described and may possess the same functionality. It should also be understood that in some embodiments, not all of the steps shown in FIG. 13 are performed and that the order in which the steps are performed may be different in other embodiments. It should be further understood that some minor method steps have been omitted, as they have been previously explained with respect to other embodiments described above.

At block 1300, a digital camera is installed to monitor an event. The digital camera is used to provide visual information pertaining to the event to a server or device proximate to the event, such as a content tagging device or content capture and tagging device. In one embodiment, the digital camera may comprise a processor, a memory and processor-executable instructions stored in the memory that allows the digital camera to automatically determine when an activity of interest has occurred during the event, and to automatically generate tagging information for use in creating one or more media clips from the digital camera and/or from other content capture devices.

At block 1302, the event begins, and the digital camera records the action occurring during the event. The digital camera may stream video information to a server via one or more wide-area networks and/or to a device proximate to the event, such as a content tagging device or content capture and tagging device.

At block 1304, tagging information is automatically generated by the digital camera, one of the proximate devices, or the server, based on the video information generated by the digital camera. Using techniques generally known in the art, any of these devices may determine when certain, predefined activities have occurred during the event, simply be evaluating the video information generated by the digital camera. In other embodiments, additional information is used from other devices to aid in determining whether an activity of interest has occurred, such as a sensor disposed on or within a ball and/or sensors worn by players/participants of the event. In another embodiment, tagging information from content tagging devices is used to confirm the occurrence of an activity when such tagging information is received near the time of a suspected activity as determined by the digital camera, one of the proximate devices, or the server.

Tagging information is automatically generated when certain predefined criteria stored in memory are observed/sensed such as a position, velocity and/or acceleration of a ball (e.g., volleyball experiences an acceleration greater than a predetermined amount, signifying a spike, basketball experiences a downward trajectory and speed associated with a basket, etc.), boundary violations (i.e., puck crosses goal line, baseball crosses outfield fence, soccer ball crosses goal line, football crosses goal line), and/or a predetermined number of players in proximity to certain, predetermined areas on a field or court, such as proximity to a goal or goalie in soccer or hockey, proximity to a basket in basketball, proximity to a goal line in football, etc. Any of these criteria may be determined visually by the digital camera and/or sensors.

A number of activities may be defined by the criteria and stored in memory. For example, a volleyball spike may be determined when a volleyball experiences an acceleration greater than a predefined acceleration, in a downward direction, when the volleyball crosses a volleyball net. A homerun in baseball may be determined when a baseball is visually determined to have crossed an outfield fence.

At block 1306, when one of the devices mentioned above determines that an activity has occurred, the device generates tagging information that is used by one of the devices to create a media clip around the time that the activity occurred, using techniques already discussed, above. As before, the tagging information may comprise a time that the activity occurred, event information, user identification, account information, and/or other information that allows a media clip to be associated with the event, a team, or a location/venue.

At block 1308, a media clip is created by one of the afore-mentioned devices, based on the automatic tagging information provided also by one of the afore-mentioned devices. The media clip is stored in association with an event name, location, time, teams, players, activity type, and/or other information related to event and the activity that was determined to have occurred.

Figure 14:
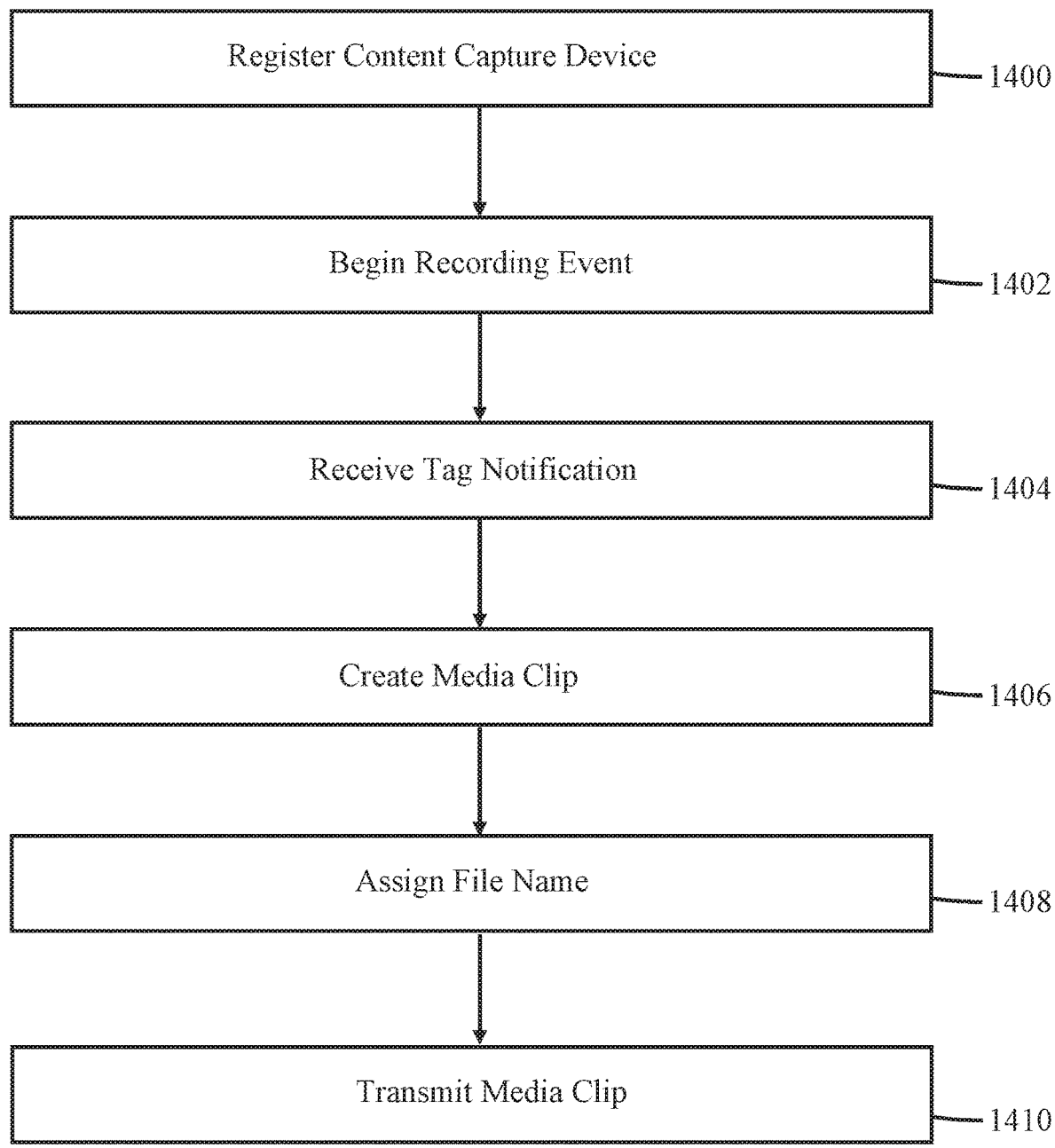
FIG. 14 is a flow diagram illustrating one embodiment of a method, performed by a content capture device or content capture and tagging device shown in FIGS. 1, 4, 8, and/or 10 for generating media clips.

At block 1310, a user of a content consumption device may wish to view media clips pertaining to the event that was automatically generated, as described previously FIG. 14 is a flow diagram illustrating one embodiment of a method, performed by a content capture device or content capture and tagging device (such as the ones shown in FIGS. 1, 4, 8, and/or 10), for generating media clips. It should also be understood that in some embodiments, not all of the steps shown in FIG. 14 are performed and that the order in which the steps are performed may be different in other embodiments. It should be further understood that some minor method steps have been omitted, as they have been previously explained with respect to other embodiments described above.

At block 1400, a content capture device registers with server 1002 to provide notification to server 1002 that the content capture device is present at an event, venue or location, ready to generate media clips based on commands from server 1002. Determination of the event, venue or location of the content capture device is the same or similar to other registration methods described above.

At block 1402, the content capture device begins recording an event or portions of an event, as the event occurs. As a result of the recording, a digital media file is created and stored in a memory of the content capture device. In one embodiment, the content capture device records a rolling time window of the event, e.g., a continuously-updated recording of the last X minutes of the event, where X is a predetermined time period, for example three minutes. In another embodiment, the content capture device creates and stores one or more media files, each media file having a start time and an end time.

At block 1404, the content capture device receives a media clip creation command from server 1002 via wide-area network 106 or 1012. The media clip creation command is generated by server 1002 in response to receiving a tag notification from a content tagging device or a content capture and tagging device. The media clip creation command comprises at least a time that a user of the content tagging device or content capture and tagging device desires a media clip of the event being recorded (i.e., an activity indicator selection time) by the content capture device. In other embodiments, the media clip creation command comprises timing information for use by the content capture device to create a media clip. For example, the timing information may comprise a start time and a duration, a start time and a stop time, or a stop time and duration, defining a desired start time, stop time, and/or duration of a media clip from the rolling recording or from the one or more media files stored in its memory.

The media clip creation command may further comprise an identification of one or more content tagging devices or content capture and tagging devices that requested a media clip. In one embodiment, the media clip creation command comprises an activity type associated with a type of activity that occurred during the event and which the tag notification is based. In this embodiment, the content capture device stores a table of media clip timing information in memory related to each type of activity, for example clip durations, pre-activity times and post-activity times associated with each activity type. When the content capture device receives the activity type in a media clip creation command, it consults the table to determine a duration of a media clip to be created, as well as, in one embodiment, a post-activity time or pre-activity time, as described previously. The content capture device then uses this information to create the media clip at a time during the media file recording corresponding to the activity indicator selection time.

The media clip creation command may further comprise a file name generated by server 1002 for the content capture device to name a resultant media clip.

At block 1406, the content capture device creates the media clip from the rolling recording or from the one or more media files stored in its memory.

At block 1408, after the content capture device had created the media clip, the content capture device assigns a file name to the media clip. In one embodiment, the file name is the same file name provided by server 1002 in the media clip creation command.

At block 1410, the content capture device transmits the media clip to server 1002 or, in another embodiment, to another location as indicated in the media clip creation command. In one embodiment, transmission of the media clip comprises transmitting an identification of the content capture device for identification purposes by server 1002.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory machine-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A user-wearable content tagging device for generating a tagging signal when a user performs a predetermined action, comprising:
    a motion-sensitive device for providing signals indicative of user motion;
    a memory for storing processor-executable instructions;
    a transmitter for transmitting the tagging signal; and
    a processor, coupled to the motion-sensitive device, the memory, and the transmitter, for executing the processor-executable instructions that causes the tagging device to:
    determining, by the processor, that the signals from the motion-sensitive device indicate the predetermined action by the user; and
    generating, by the processor, the tagging signal when the processor determines that the predetermined action has occurred; and
    transmitting, by the processor, the tagging signal to a receiver;
    wherein the receiver uses the tagging signal to create a media clip of the user performing the predetermined action.

* * * * *